US012572708B2

(12) United States Patent (10) Patent No.: US 12,572,708 B2
Narayanan et al. (45) **Date of Patent: \*Mar. 10, 2026**

(54) TRANSCEIVER DEVICE SECURITY SYSTEM

(71) Applicant: Dell Products L.P., Round Rock, TX (US)

(72) Inventors: Padmanabhan Narayanan, Chennai (IN); Ming Chung Chow, Pleasanton, CA (US); Shree Rathinasamy, Round Rock, TX (US); Victor Teeter, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 181 days.

This patent is subject to a terminal disclaimer.

(21) Appl. No.: 18/370,988

(22) Filed: Sep. 21, 2023

(65) Prior Publication Data

US 2024/0169101 A1 May 23, 2024

Related U.S. Application Data

(63) Continuation-in-part of application No. 17/993,075, filed on Nov. 23, 2022, now Pat. No. 12,284,277.

(51) Int. Cl.
*H04L 9/08* (2006.01)
*G06F 21/73* (2013.01)
*G06F 21/85* (2013.01)

(52) U.S. Cl.
CPC .............. *G06F 21/85* (2013.01); *G06F 21/73* (2013.01); *H04L 9/0825* (2013.01)

(58) Field of Classification Search
CPC ......... H04L 9/088; H04L 9/30; H04L 9/3247; H04L 9/3263; H04L 9/3271
See application file for complete search history.

(56) References Cited

U.S. PATENT DOCUMENTS

2011/0029775 A1* 2/2011 Sakai .................... G06F 21/566
713/171
2013/0198834 A1* 8/2013 Kirsch .................... H04L 63/12
726/17
2015/0338917 A1* 11/2015 Steiner .............. H04M 1/72412
345/156

* cited by examiner

*Primary Examiner* — Khoi V Le
(74) *Attorney, Agent, or Firm* — Joseph Mencher

(57) ABSTRACT

A transceiver device security system includes a computing device and a transceiver device that is locked for use with computing device(s) in transceiver device use group(s). The transceiver device generates challenge information in response to connecting to the computing device, and causes an interrupt to be transmitted to the computing device to cause it to retrieve the challenge information. Subsequently, the transceiver device receives an encrypted response communication from the computing device that is encrypted with a transceiver device use group private key associated with one of the transceiver device use group(s), and decrypts it with a transceiver device use group public key associated with the one of the transceiver device use group(s) to generate a decrypted response communication. If the transceiver device determines that response information in the decrypted response communication matches the challenge information, it unlocks the transceiver device for use with the computing device.

20 Claims, 44 Drawing Sheets

MANAGEMENT ENGINE 206

TRANSCEIVER DEVICE 300

ModPrsL/interrupt

Management engine reads lock-status, locks, challenge $E_{Groups[ti]priv}$ (Nonce), $Groups[ti]_{ti \in t}$ Firmware Boot up
Disable Tx/Rx lock-status: GROUP-LOCKED
locks: $\{Groups[t]_{pub}\}_{t \in G}$
Challenge: Nonce

Response
Verify Nonce with $Groups[ti]_{pub}$
Enable Tx/Rx

AUTHENTICATION
SYSTEM
700

MANAGEMENT
ENGINE
206

$E_{Platformpub}(UNBIND, \{Groups[p]_{p \in G}\})$ groups: NULL

TRANSCEIVER DEVICE SECURITY SYSTEM

CROSS-REFERENCE TO RELATED APPLICATION

The present disclosure is a continuation-in-part of U.S. patent application Ser. No. 17/993,075, filed Nov. 23, 2022, the disclosure of which is incorporated by reference herein in its entirety.

BACKGROUND

The present disclosure relates generally to information handling systems, and more particularly to securing transceiver devices to only allow their use with authorized information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, switch devices, server devices, and/or other computing devices known in the art, utilize transceiver devices for data communications. For example, fiber optic transceiver devices are often used with switch devices and operate to convert electrical signals from the switch device to optical signals that are then transmitted via fiber optic cables over relatively long distances and at relatively high speeds. However, computing devices like those described above are increasingly being deployed in remote and unsecure locations (e.g., edge locations in telecommunications applications), and while the computing devices are often physically secured/mounted to racks, the transceiver devices connected to them are often unsecured. As such, the theft of these relatively expensive transceiver devices is an issue, and conventional solutions to such issues rely on cumbersome physical security systems (e.g., mechanical locks) that are not popular with most users.

Some of the inventors of the present disclosure have developed systems and methods that allow a device manufacturer that manufactures and provides computing devices and transceivers to organizations and/or other customers to lock those transceivers for use only with those computing devices in order to, for example, allow the device manufacturer to sell those transceivers at a discount with those computing devices, and those systems and methods are described in U.S. patent application Ser. No. 17/993,075, filed on Nov. 23, 2022, the disclosure of which is incorporated by reference herein in its entirety. However, such systems and methods require that the transceiver/computing device locking process be managed by the device manufacturer, thus limiting the transceiver/computing device security to systems purchased from that device manufacturer.

Accordingly, it would be desirable to provide a transceiver device security system that addresses the issues discussed above.

SUMMARY

According to one embodiment, a transceiver device includes a transceiver data communication system that is locked for use only with at least one transceiver device use group that includes at least one computing device; a transceiver processing system that is coupled to the transceiver data transmission system; and a transceiver memory system that is coupled to the transceiver processing system and that includes instructions that, when executed by the transceiver processing system, cause the transceiver processing system to provide a transceiver engine that is configured to: generate, in response to being connected to a first computing device, first challenge information; causes a first interrupt to be transmitted to the first computing device that is configured to cause the first computing device to retrieve the first challenge information; receive, subsequent to causing the first interrupt to be transmitted to the first computing device, a first encrypted response communication from the first computing device that is encrypted with a first transceiver device use group private key that is associated with a first transceiver device use group that is included in the at least one transceiver device use group; decrypt the first encrypted response communication with a first transceiver device use group public key that is associated with the first transceiver device use group to generate a first decrypted response communication; determine that first response information in the first decrypted response communication matches the first challenge information; and allow, in response to determining that the first response information matches the first challenge information, the transceiver data communication system to be used with the first computing device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
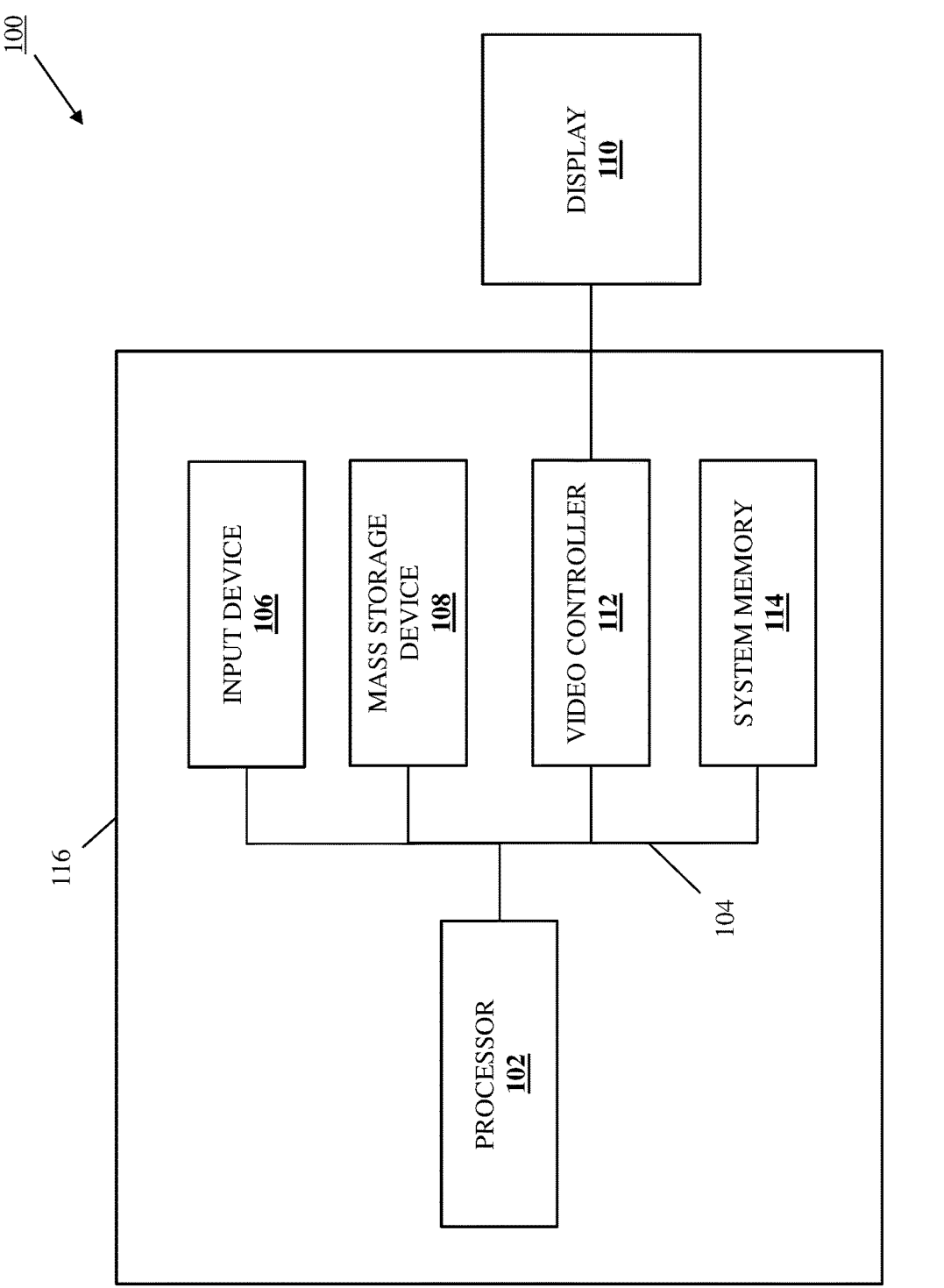
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
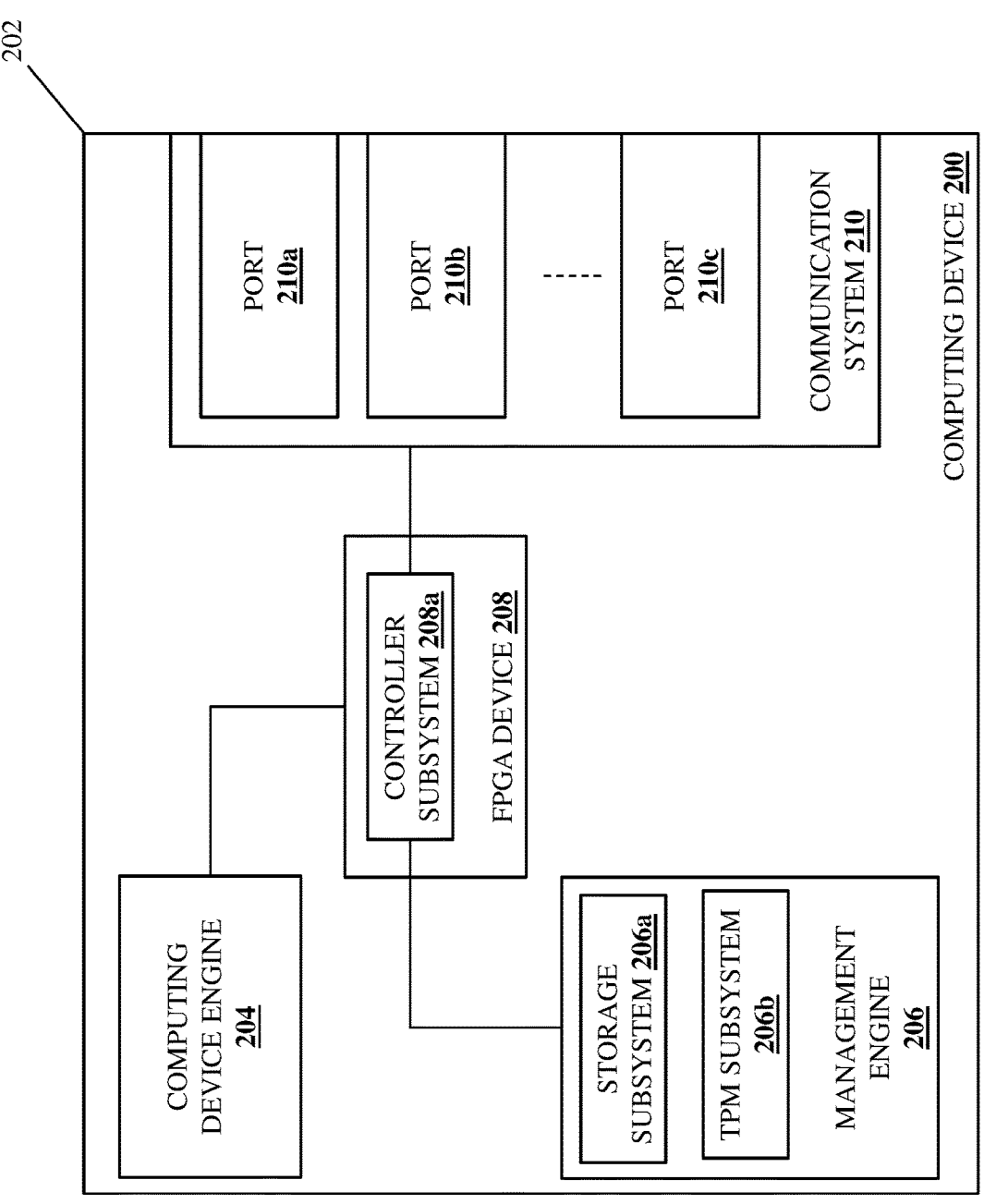
FIG. 2 is a schematic view illustrating an embodiment of a computing device that may provide the transceiver device security system of the present disclosure.

Referring now to FIG. 2, an embodiment of a computing device 200 is illustrated that may provide the transceiver device security system of the present disclosure. In an embodiment, the computing device 200 may be provided by the IHS 100 discussed above with reference to FIG. 1 and/or may include some or all of the components of the IHS 100, and in specific examples may be provided by a switch device or a server device. However, while illustrated and discussed as being provided by a switch device or server device, one of skill in the art in possession of the present disclosure will recognize that the functionality of the computing device 200 discussed below may be provided by any computing device that is configured to operate similarly as the computing device 200 discussed below. In the illustrated embodiment, the computing device 200 includes a chassis 202 that houses the components of the computing device 200, only some of which are illustrated and described below.

For example, the chassis 202 may house a primary processing system (not illustrated, but which may include the processor 102 discussed above with reference to FIG. 1 such as a Central Processing Unit (CPU), Networking Processing Unit (NPU), System on Chip (SoC), and/or other processing systems that would be apparent to one of skill in the art in possession of the present disclosure) and a primary memory system (not illustrated, but which may include the memory 114 discussed above with reference to FIG. 1) that is coupled to the primary processing system and that includes instructions that, when executed by the primary processing system, cause the primary processing system to provide a computing device engine 204 that is configured to provide a primary operating system (e.g., a Networking Operating System (NOS) in embodiments in which the computing device is provided by a switch device) and/or otherwise perform the functionality of the computing device engines, computing device subsystems, and/or computing devices discussed below.

The chassis 202 may also house a management processing system (not illustrated, but which may be similar to the processor 102 discussed above with reference to FIG. 1) and a management memory system (not illustrated, but which may include the memory 114 discussed above with reference to FIG. 1) that is coupled to the management processing system and that includes instructions that, when executed by the management processing system, cause the management processing system to provide a management engine 206 that is configured to provide a management operating system and/or otherwise perform the functionality of the management engines and/or computing devices discussed below. To provide a specific example, the chassis 202 of the computing device 200 (e.g., a switch device in this example) may house a Platform Management Controller (PMC) device that includes the management engine 206 that is configured to provide a PMC operating system, and that may operate as a Root of Trust (RoT) for the computing device 200. However, one of skill in the art in possession of the present disclosure will appreciate how the management engine 206 may be included in a Baseboard Management Controller (BMC) device such as the integrated DELL® Remote Access Controller (iDRAC) device available in server devices provided by DELL® Inc. of Round Rock, Texas, United States, a Field Programmable Gate Array (FPGA)-based controller device, and/or any other hardware that one of skill in the art in possession of the present disclosure would recognize as providing the management engine/management subsystem/management functionality described below.

In the illustrated embodiment, the management engine 206 includes a storage subsystem 206a that may be provided by one or more flash-based memory devices and/or other storage subsystems that would be apparent to one of skill in the art in possession of the present disclosure. Furthermore, the management engine 206 is also illustrated as including a Trusted Platform Module (TPM) subsystem 206b that one of skill in the art in possession of the present disclosure will recognize may be provided by a specialized hardware component, microcontroller, and/or other subsystem that is configured to enable security-related tasks for the computing device 200 via the provisioning of a secure environment for cryptographic operations, key management, and/or other security functionality that would be apparent to one of skill in the art in possession of the present disclosure.

The chassis 202 may also house an FPGA device 208 that is coupled to the computing device engine 204 (e.g., via a Peripheral Component Interconnect express (PCIe) coupling or other connections between the FPGA device 208 and the primary processing system discussed above), as well as to the management engine 206 (e.g., via an Inter-Integrated Controller (I2C) coupling or other connections between the FPGA device 208 and the management processing system discussed above). In the illustrated embodiment, the FPGA device 208 includes a controller subsystem 208a that couples the FPGA device 208 to the management engine 206 (e.g., via an I2C coupling or other connections between the controller subsystem 208a and the management processing system discussed above), and in a specific example that controller subsystem 208a may provide an I2C controller/block arbiter subsystem that is configured to provide the management engine 206 direct access to the ports described below.

The chassis 202 may also house a communication system 210 that is coupled to the FPGA device and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. In the illustrated embodiment, the communication system 210 includes a plurality of ports 210a, 210b, and up to 210c, and the controller subsystem 208a in the FPGA device 208 may be coupled to any or all of the ports 210a-210c in order to provide the management engine 206 direct access to those ports as described above. As described below, the ports 210a-210c may include "primary data" ports to which the transceiver device of the present disclosure may be connected, Out-Of-Band (OOB) management ports that may connect to the authentication system discussed below, as well as any other ports that would be apparent to one of skill in the art in possession of the present disclosure. However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the transceiver device security functionality discussed below, while remaining within the scope of the present disclosure as well.

Figure 3:
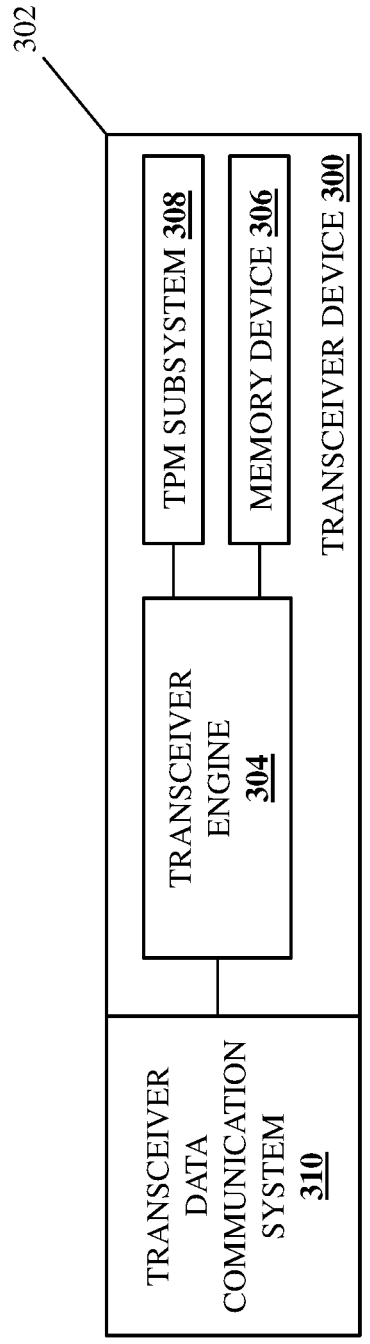
FIG. 3 is a schematic view illustrating an embodiment of a transceiver device that may be provide the transceiver device security system of the present disclosure.

Referring now to FIG. 3, an embodiment of a transceiver device 300 is illustrated that may provide the transceiver device security system of the present disclosure. In an embodiment, the transceiver device 300 may be connected to the IHS 100 discussed above with reference to FIG. 1, and may be provided by a fiber-optic transceiver device that is configured to convert electrical data from the IHS 100 to optical data for transmission via a network, as well as convert optical data received via a network to electrical data for transmission to the IHS 100. However, while discussed as being provided by a fiber optic transceiver device, one of skill in the art in possession of the present disclosure will recognize that the functionality of the transceiver device 300 discussed below may be provided by other types of transceiver devices (e.g., "Ethernet" transceiver devices) that are configured to operate similarly as the transceiver device 300 discussed below.

In the illustrated embodiment, the transceiver device 300 includes a chassis 302 that houses the components of the transceiver device 300, only some of which are illustrated and described below. For example, the chassis 302 may house a transceiver processing system (not illustrated, but which may be similar to the processor 102 discussed above with reference to FIG. 1 and may be provided by a transceiver microcontroller device or other transceiver processors that would be apparent to one of skill in the art in possession of the present disclosure) and a transceiver memory system (not illustrated, but which may be similar to the memory 114 discussed above with reference to FIG. 1 and may be provided by a transceiver microcontroller device or other transceiver memory that would be apparent to one of skill in the art in possession of the present disclosure) that is coupled to the transceiver processing system and that includes instructions that, when executed by the transceiver processing system, cause the transceiver processing system to provide a transceiver engine 304 that is configured to perform the functionality of the transceiver engines, transceiver subsystems, and/or transceiver devices discussed below.

The chassis 302 may also house a memory device 306 that is coupled to the transceiver engine 304 (e.g., via a coupling between the memory device 306 and the transceiver processing system discussed above) and that may be provided by an Electronically Erasable Programmable Read-Only Memory (EEPROM) device and/or other memory devices that would be apparent to one of skill in the art in possession of the present disclosure. As described below, an EEPROM device that provides the memory device 306 may be read/write capable and may include a user-defined page that allows information to be exchanged with the transceiver engine 304.

As illustrated, the chassis 302 may also house a Trusted Platform Module (TPM) subsystem 308 that is coupled to the transceiver engine 304 (e.g., via a coupling between the TPM subsystem 308 and the transceiver processing system discussed above) and that one of skill in the art in possession of the present disclosure will recognize may be provided by a specialized hardware component, microcontroller, and/or other subsystem that is configured to enable security-related tasks for the transceiver device 300 via the provisioning of a secure environment for cryptographic operations, key management, and/or other security functionality that would be apparent to one of skill in the art in possession of the present disclosure. However, while the transceiver device 300 is illustrated and described below as including a TPM subsystem 308 (e.g., for use in storing the organization public key discussed below), one of skill in the art in possession of the present disclosure will appreciate how transceiver devices that do not include TPM subsystems may store the organization public key discussed below in a secure portion of its memory device (e.g., a secure portion of an EEPROM in that transceiver device) while remaining within the scope of the present disclosure as well.

The chassis 302 may also include a transceiver data communication system 310 that is coupled to the transceiver engine 304 (e.g., via a coupling between the transceiver data communication system 308 and the transceiver processing system discussed above) and that may include computing device connectors, cabling connectors, data transmission conduits, data transmit/receive (TX/RX) controllers, SERializer/DESerializer (SERDES) device(s), and/or any other transceiver data communication components that would be apparent to one of skill in the art in possession of the present disclosure. However, while a specific transceiver device 300 has been illustrated and described, one of skill in the art in possession of the present disclosure will recognize that transceiver devices (or other devices operating according to the teachings of the present disclosure in a manner similar to that described below for the transceiver device 300) may include a variety of components and/or component configurations for providing conventional transceiver device functionality, as well as the transceiver device security functionality discussed below, while remaining within the scope of the present disclosure as well.

Figure 4:
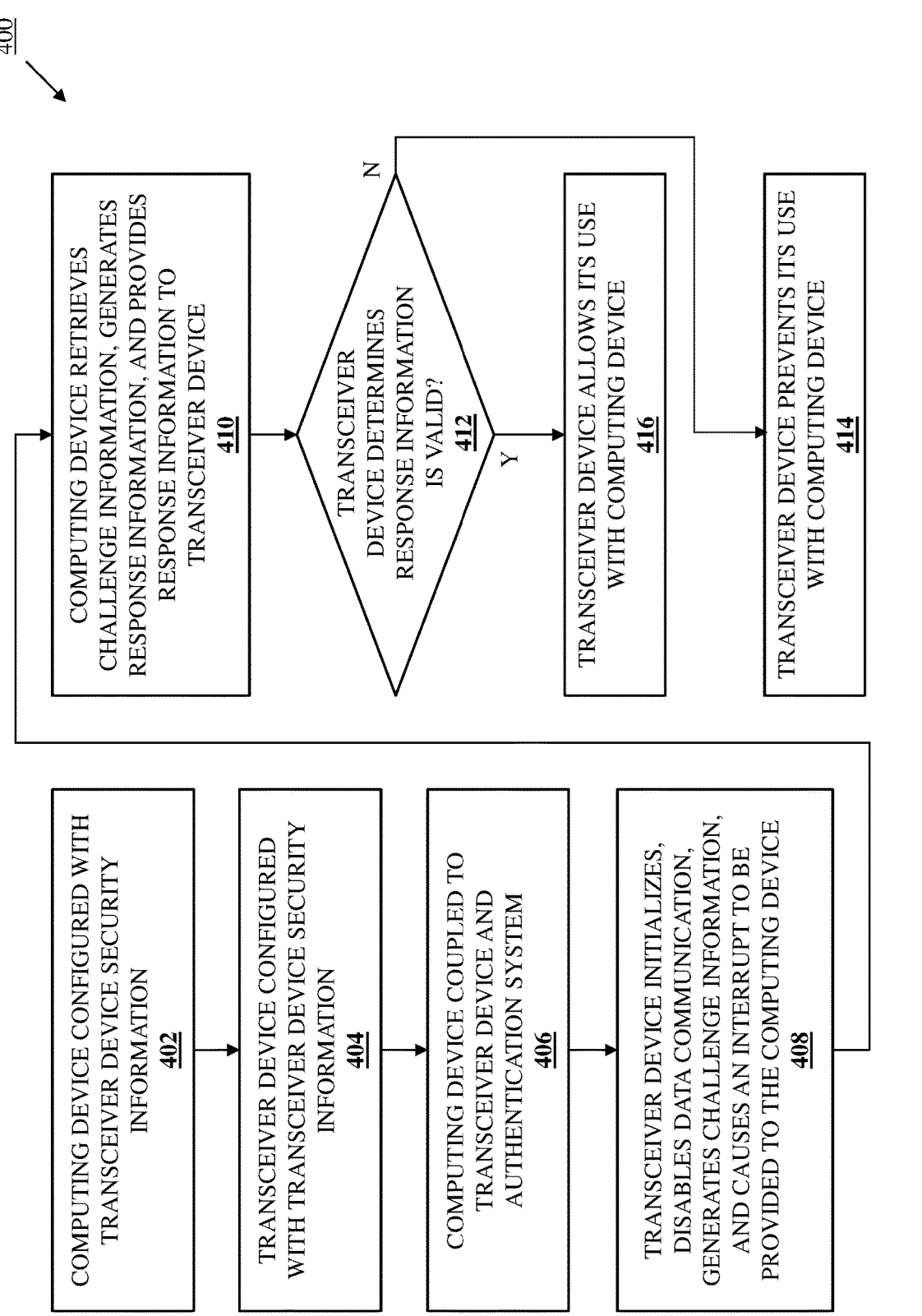
FIG. 4 is a flow chart illustrating an embodiment of a method for providing transceiver device security.

Referring now to FIG. 4, an embodiment of a method 400 for providing transceiver device security by allowing the transceiver device of the present disclosure to initially be used with a computing device is illustrated. As discussed below, the systems and methods of the present disclosure provide for the locking of a transceiver device for use only with one or more transceiver device use groups, and the method 400 may be performed to allow the initial use of such a transceiver device with a computing device so that the transceiver device may subsequently be locked for use only with those transceiver device use group(s). In the transceiver device security system described below, the computing device and transceiver device may be manufactured by one or more devices manufacturers (e.g., DELL® Inc. of Round Rock, Texas, United States), and may then be purchased and utilized by an "organization" and/or other customer that will then operate to manage the transceiver device security system to define transceiver device use groups, lock any transceiver device for use with computing device(s) included in those transceiver device use groups, and/or perform any of the other transceiver device functionality described below. Furthermore, as described below, the systems and methods of the present disclosure also allow the organization to unlock such transceiver devices in order to allow those transceiver devices to be resold. As described below, the organization may include an organization public-private key pair ($ORG_{pub}$, $ORG_{priv}$) that are utilized as described below.

As discussed above, some of the inventors of the present disclosure have developed systems and methods that allow a device manufacturer that manufactures and provides computing devices and transceivers to organizations and/or other customers to lock those transceivers for use only with those computing devices (i.e., "Original Equipment Manufacturer (OEM)-based service locking") in order to, for example, allow the device manufacturer to sell those transceivers at a discount with those computing devices, and those systems and methods are described in U.S. patent application Ser. No. 17/993,075, filed on Nov. 23, 2022, the disclosure of which is incorporated by reference herein in its entirety. However, as also discussed above, such systems and methods require that the transceiver/computing device locking process be managed by the device manufacturer, thus limiting the transceiver/computing device security to systems purchased from that device manufacturer. As will be appreciated by one of skill in the art in possession of the present disclosure, the systems and methods detailed below allow the organization or other customer to manage the transceiver/computing device locking process (i.e., "OEM-independent transceiver-locking-as-a-service"), thus enabling the transceiver/computing device security for transceiver devices purchased from device manufacturers that are not necessarily the same as the device manufacturers that provided their computing devices.

As discussed in further detail below, the organization may enable the locking of any transceiver device for use with computing device(s) by defining one or more transceiver device use groups g1, g2, and up to gG, each of which may be associated with one or more computing devices, and any of which may be associated with a transceiver device. In an embodiment, each of the transceiver device use groups may correspond to a device deployment use case. To provide a datacenter-specific example, any particular transceiver device use group may be associated with computing devices in a rack included in a datacenter, computing devices including in a pod in a datacenter, computing device included in a floor in a datacenter, computing devices included in any particular datacenter that is included in a plurality of datacenters, and/or any other datacenter groups that would be apparent to one of skill in the art in possession of the present disclosure.

To provide a telecom-specific example, any particular transceiver device use group may be associated with computing devices located on a street, computing device located in a county, computing device located in a city, computing device located in a district, and/or any other telecom groups that would be apparent to one of skill in the art in possession of the present disclosure. However, while a few examples of transceiver device use group categories have been described, one of skill in the art in possession of the present disclosure will appreciate a one or more computing devices may be associated with a transceiver device user group for any of a variety of purposes that will fall within the scope of the present disclosure as well. For each transceiver device use group, the organization may generate a respective public-private key pair $\{(Groups[g1]_{pub}, Groups[g1]_{priv}), (Groups[g2]_{pub}, Groups[g2]_{priv}), . . . (Groups[gG]_{pub}, Groups[gG]_{priv})\}$, which is abbreviated below as $\{(Groups[g]_{pub}, Groups[g]_{priv})\}_{g \in G}$.

Figure 5:
FIG. 5 is a schematic view illustrating an embodiment of the computing device of FIG. 2 operating during the method of FIG. 4.

The method 400 begins at block 402 where a computing device is configured with transceiver device security information. With reference to FIG. 5, in an embodiment of block 402, the management engine 206 in the computing device 200 may be configured with transceiver device security information. For example, the organization discussed above that has acquired the computing device 200 (also referred to as a "platform" herein) from the device manufacturer discussed above may generate a platform public-private key pair ($Platform_{pub}$, $Platform_{priv}$) for the computing device 200/platform, and one of skill in the art in possession of the present disclosure will appreciate how the platform public-private key pair may be generated in the computing device 200 (e.g., using the TPM subsystem 206*b*), or outside of the computing device 200 by a secure server device, while remaining within the scope of the present disclosure.

The organization may then provide the platform private key $Platform_{priv}$ in the TPM subsystem 206*a* in the management engine 206, may use a secure server device to sign the platform public key $Platform_{pub}$ with its organization private key $ORG_{priv}$ in an X.509 format to generate an X.509 organization-private-key-signed platform public key certificate $X.509_{ORGpriv}(Platform_{pub})$ that it provides in the storage subsystem 206*a* in the management engine 206 (e.g., during an initial boot of the computing device 200 by the organization), and may generate an X.509 organization public key certificate $X.509_{ORGpub}$ that includes its organization public key $ORG_{pub}$ in an X.509 format, and provide that X.509 organization public key certificate $X.509_{ORGpub}$ in the storage subsystem 206*a* in the management engine 206 as well. However, while specific transceiver device security information and techniques for providing that transceiver device security information in the computing device 200 have been described, one of skill in the art in possession of the present disclosure will appreciate how other transceiver device security information may be provided in the computing device 200 using other techniques while remaining within the scope of the present disclosure as well.

Figure 6:
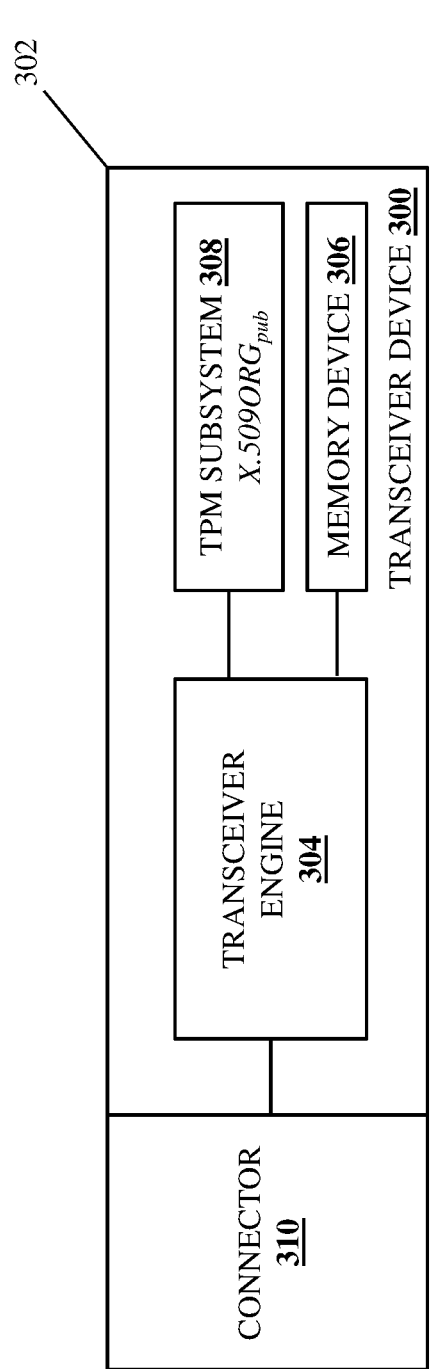
FIG. 6 is a schematic view illustrating an embodiment of the transceiver device of FIG. 3 operating during the method of FIG. 4.

The method 400 proceeds at block 404 where a transceiver device is configured with transceiver device security information. With reference to FIG. 6, in an embodiment of block 404, the TPM subsystem 308 in the transceiver device 300 may be configured with transceiver device security information. For example, the device manufacturer of the transceiver device 300 discussed above (which may or may not be the device manufacturer of the computing device 200) may retrieve an X.509 organization public key certificate X.509$_{ORGpub}$ from the organization that includes the organization public key ORG$_{pub}$ in an X.509 format, may provide it in firmware, and then, during manufacturing of the transceiver device 300, may load that firmware on the transceiver device 300 (e.g., the transceiver engine 304), to allow that firmware to provide that X.509 organization public key certificate X.509$_{ORGpub}$ in the TPM subsystem 308 included in the transceiver device 300. However, while the X.509 organization public key certificate X.509$_{ORGpub}$ is illustrated and described as being provided in the TPM subsystem 308 in the transceiver device 300, as discussed above some transceiver devices do not include a TPM subsystem, and the X.509 organization public key certificate X.509$_{ORGpub}$ may instead be provided in an EEPROM device or other memory system in such transceiver devices while remaining within the scope of the present disclosure as well. The device manufacturer of the transceiver device 300 may then provide the transceiver device 300 to the organization discussed above.

Figure 7:
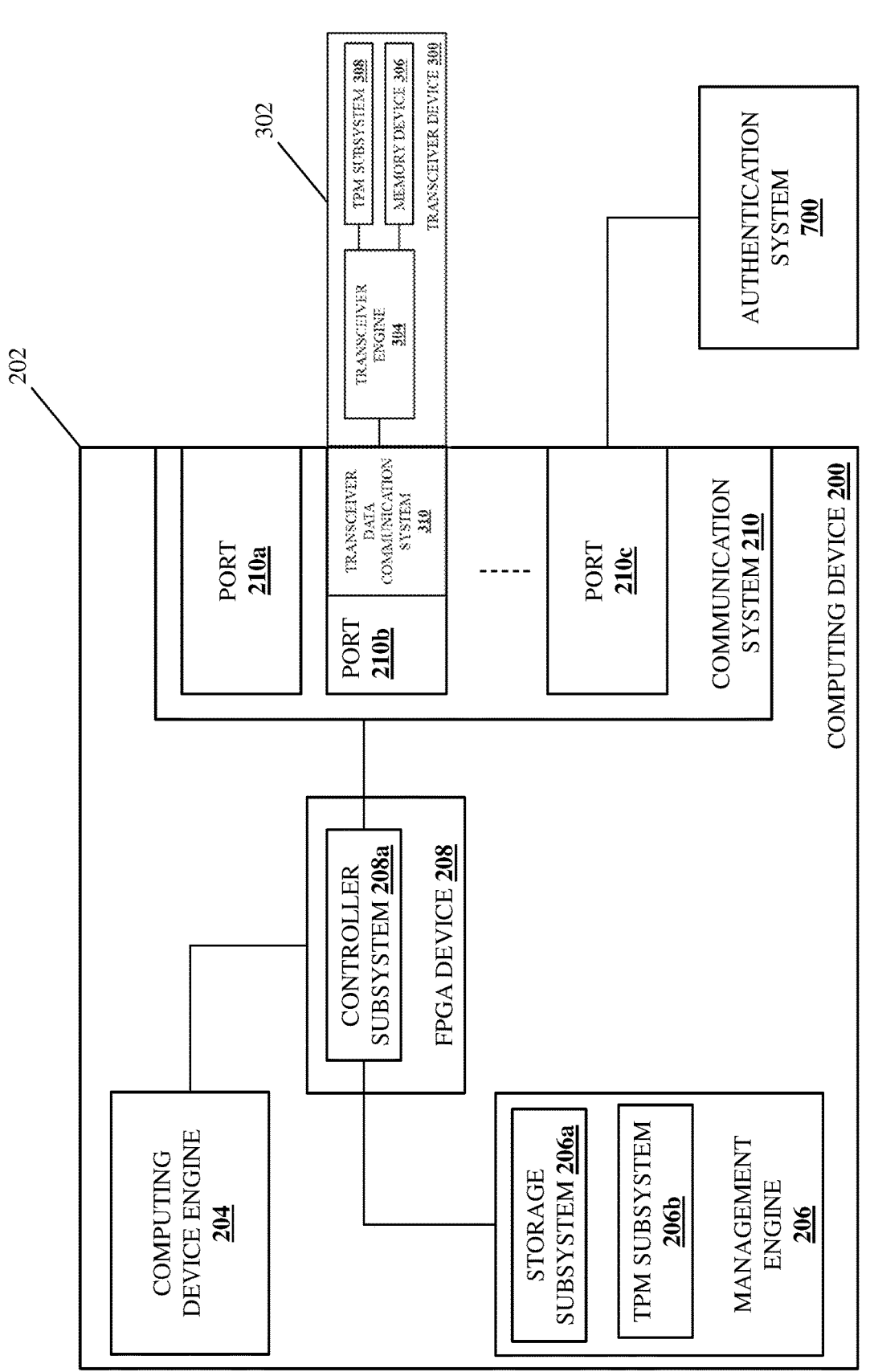
FIG. 7 is a schematic view illustrating an embodiment of the computing device of FIG. 5 coupled to an authentication system and the transceiver device of FIG. 6 to provide a transceiver device security system during the method of FIG. 4.

The method 400 then proceeds to block 406 where the computing device is coupled to the transceiver device and an authentication system. With reference to FIG. 7, in an embodiment of block 406, the transceiver device 300 may be connected to the computing device 200 by connecting a connector that is included in the transceiver data communication system 310 to the port 210b on the computing device 200 (e.g., one of the primary data ports discussed above). Furthermore, FIG. 7 also illustrates how the computing device 200 may be coupled to an authentication system 500 via the port 210c (e.g., the GOB management port discussed above). In an embodiment, the authentication system 500 may be provided by the IHS 100 discussed above with reference to FIG. 1 and/or may include one or more components of the IHS, and in specific examples may be provided by one or more server devices. However, while illustrated and described as being provided by an authentication system, one of skill in the art in possession of the present disclosure will appreciate that the functionality of the authentication system 500 may be provided by an administration computing system, a Zero Touch Provisioning (ZTP) computing system, and/or other systems that one of skill in the art in possession of the present disclosure will appreciate are configured to provide the functionality of the authentication system 700 discussed below.

Figure 8:
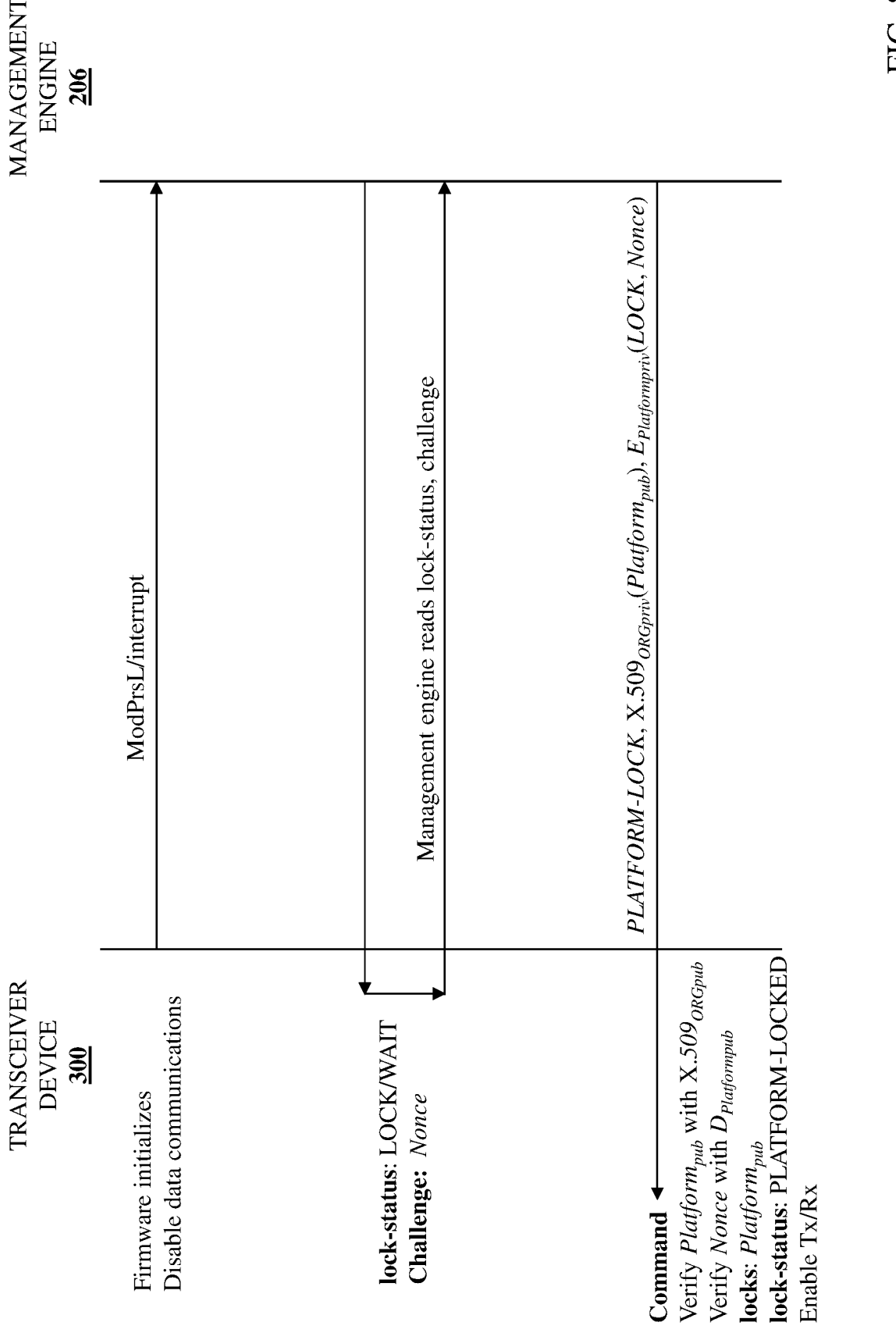
FIG. 8 is a swim lane diagram illustrating an embodiment of communications between the transceiver device and the computing device of FIG. 7 during the method of FIG. 4.

The method 400 then proceeds to block 408 where the transceiver device initializes, disables data communication, generates challenge information, and causes an interrupt to be provided to the computing device. In an embodiment, at block 408, the computing device 200 may be powered on or otherwise initialized and, in response, the transceiver device 300 will initialize as well. With reference to FIG. 8, a swim lane diagram is provided that illustrates communications between the transceiver device 300 and the management engine 206 in the computing device 200 during the remainder of the method 400, and will be referenced below to discuss those communications. In an embodiment, and as illustrated in FIG. 8, the transceiver engine 304 (e.g., provided by firmware loaded on the transceiver device 300 by the device manufacturer as described above) may initialize and, in response, may disable data communications by, for example, disabling SERDES device(s) and/or any other transceiver data communication components in the transceiver data communication system 310 or that transceiver device 300 that one of skill in the art in possession of the present disclosure would recognize as preventing "line-side" data communications via the transceiver device 300 by the computing device engine 204 in the computing device 200 (but while allowing the "management" data communications with the management engine 206 in the computing device 200 described below via, for example, the I2C couplings and the controller subsystem 208a in the FPGA device 208).

Figure 9A:
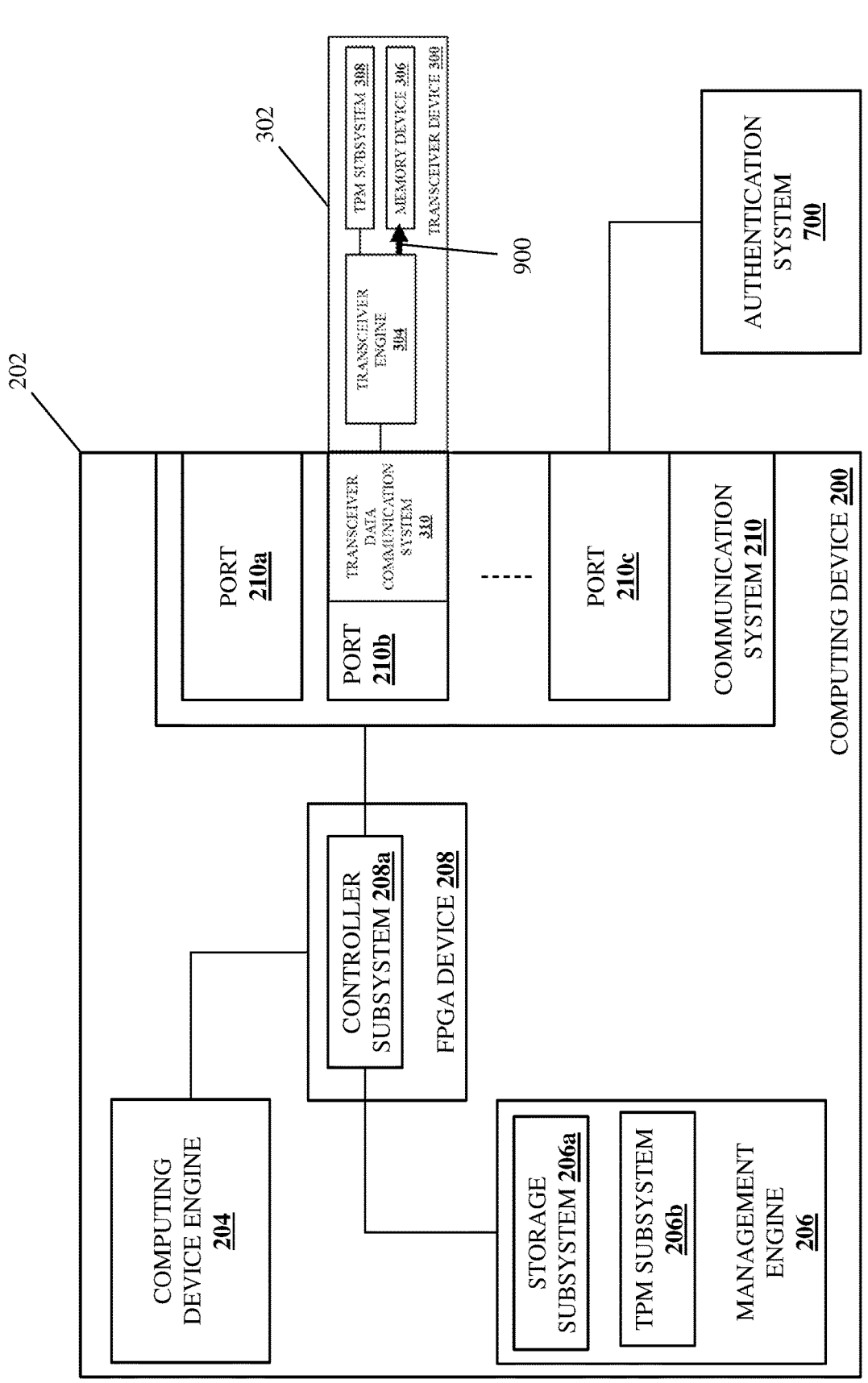
FIG. 9A is a schematic view illustrating an embodiment of the transceiver device security system of FIG. 7 performing the communications of FIG. 8 during the method of FIG. 4.

Furthermore, as also illustrated in FIGS. 8 and 9A, the transceiver engine 304 may perform memory device access operations 900 that may include providing a "LOCK-WAIT" lock status in a lock status field in the memory device 306 (e.g., in the user-defined page of the EEPROM device discussed above) of the transceiver device 300. As will be appreciated by one of skill in the art in possession of the present disclosure, the transceiver engine 304 may be configured to provide the "LOCK-WAIT" lock status upon a first initialization of the transceiver device 300 in order to indicate that the transceiver device 300 is not yet locked to a platform/computing device/transceiver device use group (e.g., the transceiver device 300 is in a factory default state).

Figure 9B:
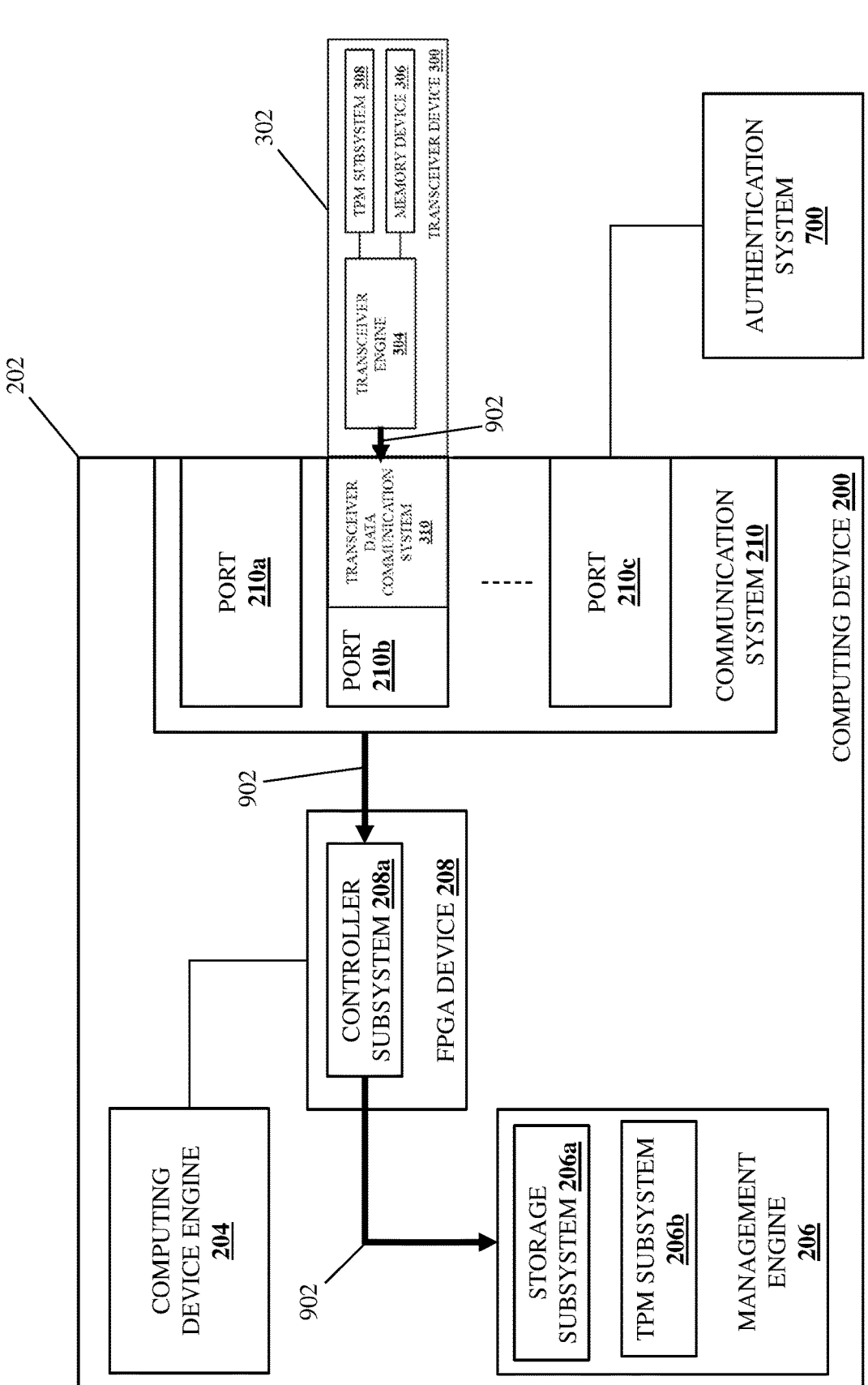
FIG. 9B is a schematic view illustrating an embodiment of the transceiver device security system of FIG. 7 performing the communications of FIG. 8 during the method of FIG. 4.

With continued reference to FIGS. 8 and 9A, the memory device access operations 900 at block 408 may also include the transceiver engine 304 randomly generating a nonce or other challenge information that would be apparent to one of skill in the art in possession of the present disclosure, and providing that challenge information in the memory device 306 (e.g., in the user-defined page of the EEPROM device discussed above) of the transceiver device 300. With reference to FIGS. 8 and 9B, at block 408 the transceiver engine 304 may also operate with the FPGA device 208 to perform interrupt operations 902 that may include the transceiver engine 304 generating a ModulePresentLow (ModPrsL) signal or other interrupt signal that would be apparent to one of skill in the art in possession of the present disclosure and, in response to detecting the interrupt signal via the port 210b in the communication system 210, the controller subsystem 208a in the FPGA device 208 transmitting an interrupt to the management engine 206 in the computing device 200 to indicate the presence of the transceiver device 300 in the port 210b.

Figure 9C:
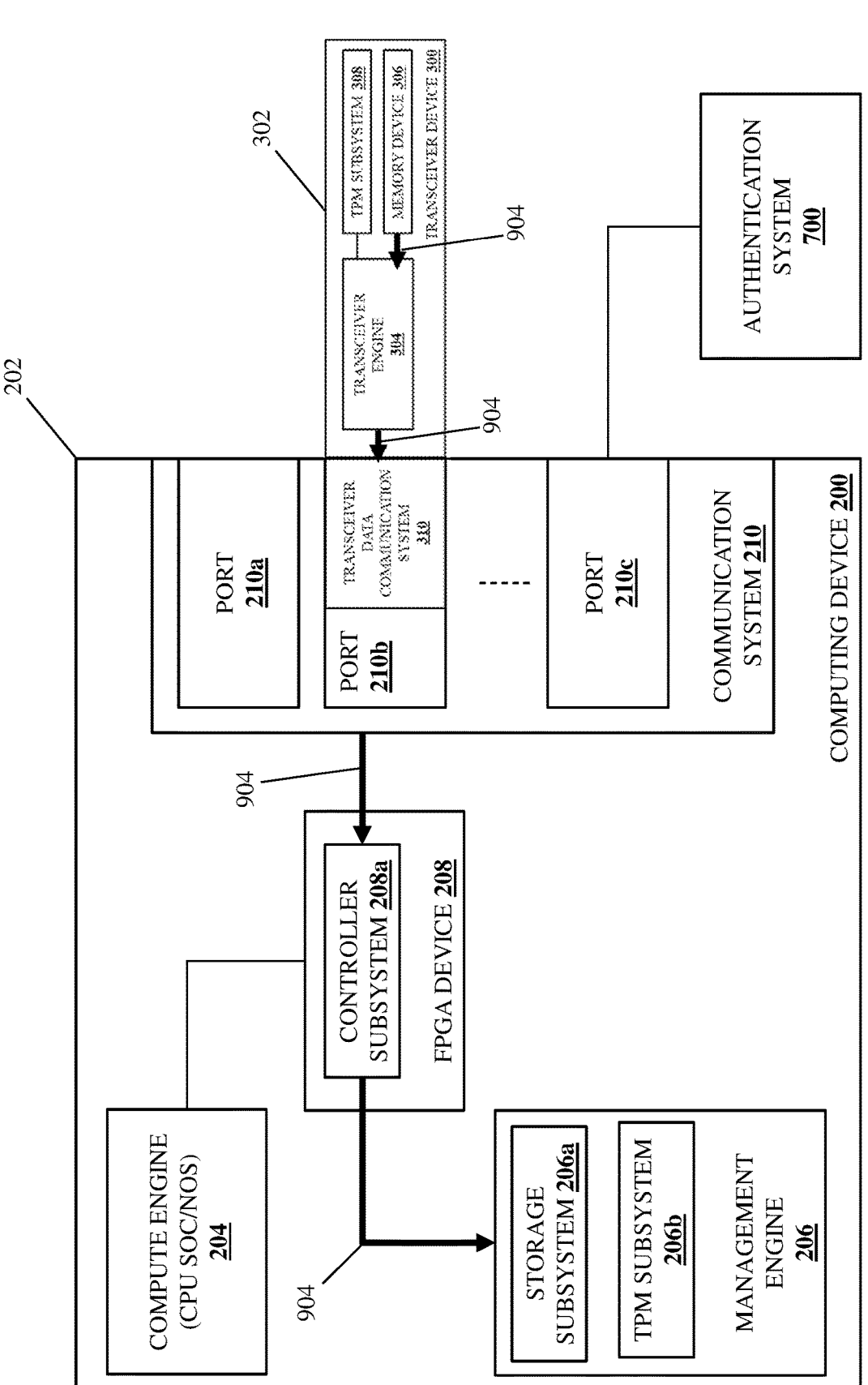
FIG. 9C is a schematic view illustrating an embodiment of the transceiver device security system of FIG. 7 performing the communications of FIG. 8 during the method of FIG. 4.

The method 400 then proceeds to block 410 where the computing device retrieves challenge information, generates response information, and provides the response information to the transceiver device. With reference to FIG. 9C, in an embodiment of block 410 and in response to receiving the interrupt at block 408, the management engine 206 in the computing device 200 may perform challenge information retrieval operations 904 by, for example, accessing the memory device 306 in the transceiver device 300 via the port 210b in the communication system 210 and the controller subsystem 208a in the FPGA device 208 (e.g., accessing the user-defined page in the EEPROM device discussed above using any of a variety of transceiver device EEPROM access techniques that would be apparent to one of skill in the art in possession of the present disclosure), identifying the "LOCK-WAIT" lock status of the transceiver device 300 in the lock status field and, in response, reading the challenge information (e.g., the randomly generated nonce) provided in the memory device 306 by the transceiver engine 304.

In response to retrieving the challenge information, the management engine 206 may generate a "PLATFORM-LOCK" command that includes the challenge information as response information. In the specific example illustrated in FIG. 8, the management engine 206 may encrypt a "LOCK" instruction and the nonce that provides the response information with its platform private key Platform$_{priv}$ (which is stored in the TPM subsystem 206b as discussed above) to provide an encrypted lock instruction/challenge information E$_{Platformpriv}$(LOCK, Nonce). The management engine 206 may then generate the "PLATFORM-LOCK" command that includes the X.509 organization-private-key-signed platform public key certificate X.509$_{ORGpriv}$(Platform$_{pub}$) (which is stored in its storage subsystem 206a as discussed above) and the encrypted lock instruction/challenge information E$_{Platformpriv}$(LOCK, Nonce) (i.e., the "PLATFORM-LOCK, X.509$_{ORGpriv}$(Platform$_{pub}$), E$_{Platformpriv}$(LOCK, Nonce) illustrated in FIG. 8).

Figure 9D:
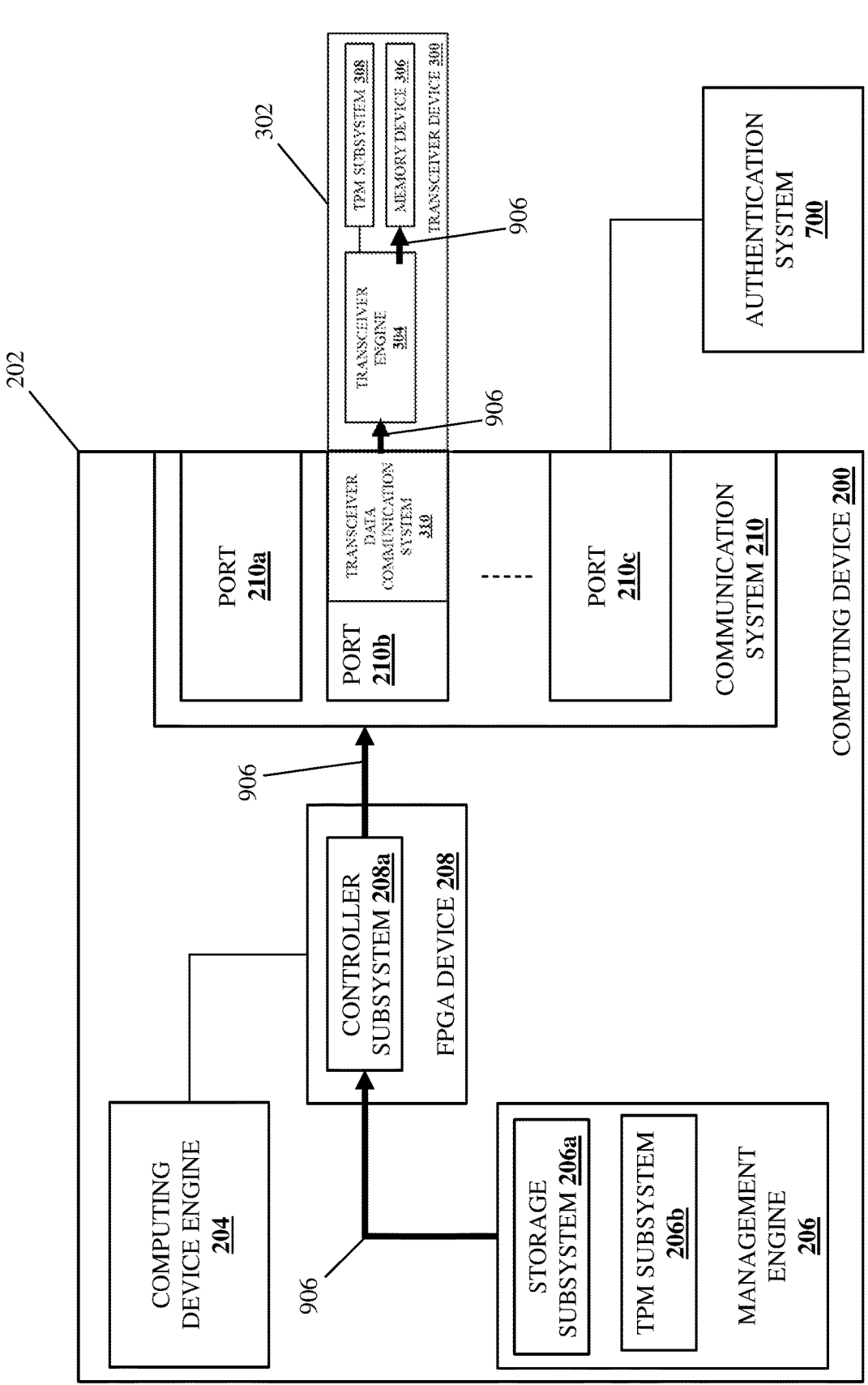
FIG. 9D is a schematic view illustrating an embodiment of the transceiver device security system of FIG. 7 performing the communications of FIG. 8 during the method of FIG. 4.

With reference to FIGS. 8 and 9D, the management engine 206 may then perform platform-lock command provisioning operations 906 that include providing the "PLATFORM-LOCK" command to the transceiver device 300 by writing that the "PLATFORM-LOCK" command in a command field in the memory device 306 in the transceiver device 300 via the port 210b in the communication system 210 and the controller subsystem 208a in the FPGA device 208 (e.g., by accessing the user-defined page in the EEPROM device discussed above using any of a variety of transceiver device EEPROM access techniques that would be apparent to one of skill in the art in possession of the present disclosure).

Figure 9E:
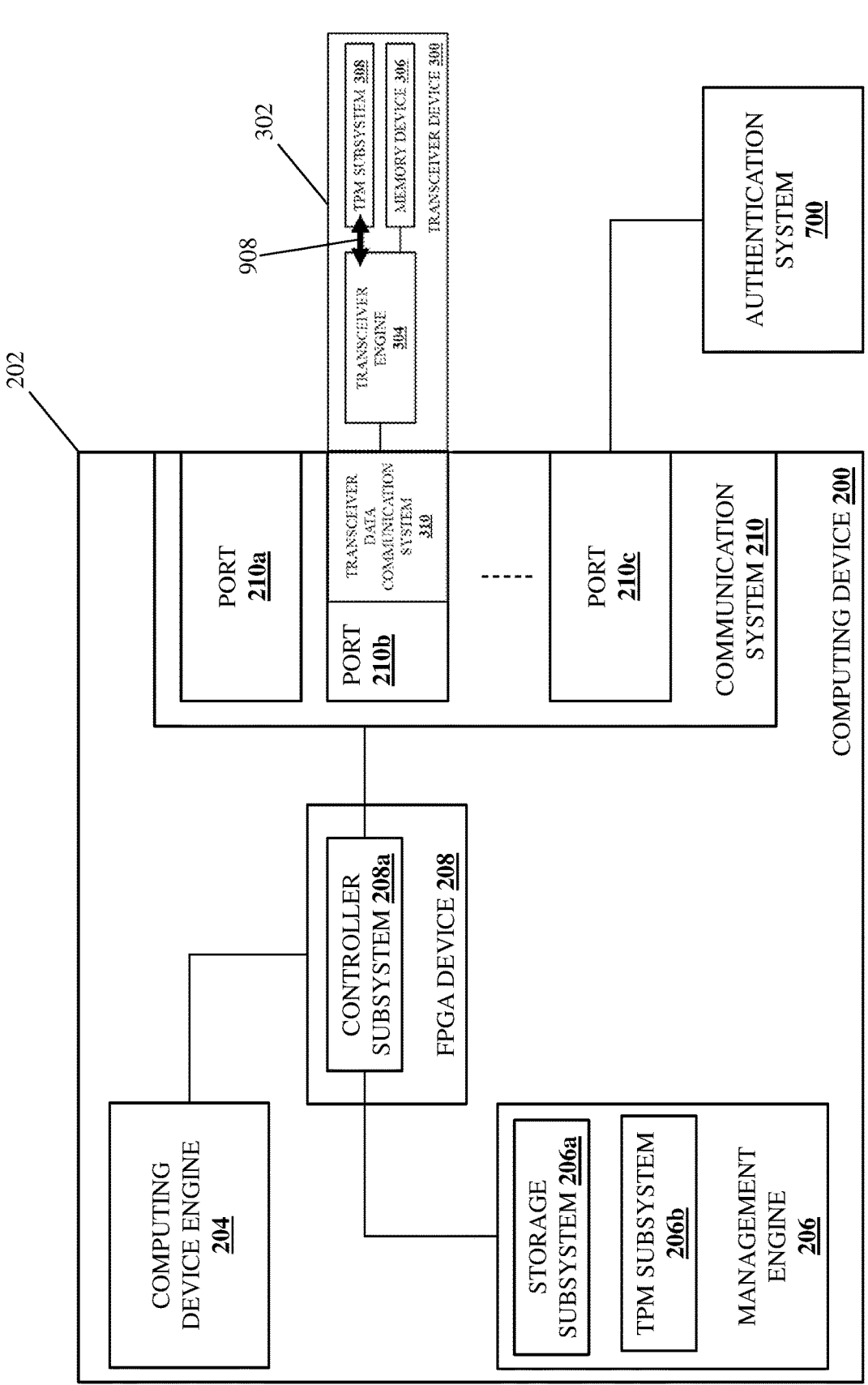
FIG. 9E is a schematic view illustrating an embodiment of the transceiver device security system of FIG. 7 performing the communications of FIG. 8 during the method of FIG. 4.

The method 400 then proceeds to decision block 412 where the transceiver device determines whether the response information received from the computing device is valid. With reference to FIGS. 8 and 9E, in an embodiment of block 412 and in response to the management engine 206 providing the "PLATFORM-LOCK" command in a command field in the memory device 306, the transceiver engine 304 may perform platform lock command verification operations 908. For example, at decision block 412, the transceiver engine 304 may use the X.509 organization public key certificate X.509$_{ORGpub}$ (which is stored in its TPM subsystem 308 as discussed above) to verify that the platform public key Platform$_{pub}$ in the X.509 organization-private-key-signed platform public key certificate X.509$_{ORGpriv}$(Platform$_{pub}$) included in the "PLATFORM-LOCK" command is from the organization, and if so, the transceiver engine 304 may use that platform public key Platform$_{pub}$ to decrypt the "LOCK" instruction and the nonce that provides the response information in the encrypted lock instruction/challenge information E$_{Platformpriv}$(LOCK, Nonce) that is included in the "PLAT-FORM-LOCK" command, and then determine whether that nonce that is included in the "PLATFORM-LOCK" command (i.e., the response information) matches the nonce it generated at block 408 (i.e., the challenge information).

As such, one of skill in the art in possession of the present disclosure will appreciate how decision block 412 involves the transceiver device 300 verifying that the "PLATFORM-LOCK" command is from the organization (i.e., via the verification of the platform public key Platform$_{pub}$ using the X.509 organization public key certificate X.509$_{ORGpub}$) and includes the challenge information it generated at block 408 encrypted with a platform private key generated by the organization and, thus, whether the response information in the "PLATFORM-LOCK" command is valid. If, at decision block 412, the transceiver device determines that the response information is not valid, the method 400 proceeds to block 414 where the transceiver device prevents its use with the computing device. In an embodiment, at block 414 and in response to determining that the response information in the "PLATFORM-LOCK" command is not valid, the transceiver engine 304 may not enable the data communications that were disabled at block 408, thus preventing the computing device engine 204 in the computing device 200 from performing "line-side" data communications using the transceiver device 300.

If, at decision block 412, the transceiver device determines that the response information is valid, the method 400 proceeds to block 414 where the transceiver device allows its use with the computing device. In an embodiment, at block 416 and in response to determining that the response information in the "PLATFORM-LOCK" command is valid, the transceiver engine 304 may enable the data communications that were disabled at block 408 by, for example, enabling SERDES device(s) and/or any other transceiver data communication components in the transceiver data communication system 310 or that transceiver device 300 that were disabled at block 408 in order to allow "line-side" data communications via the transceiver device 300 by the computing device engine 204 in the computing device 200.

Figure 9F:
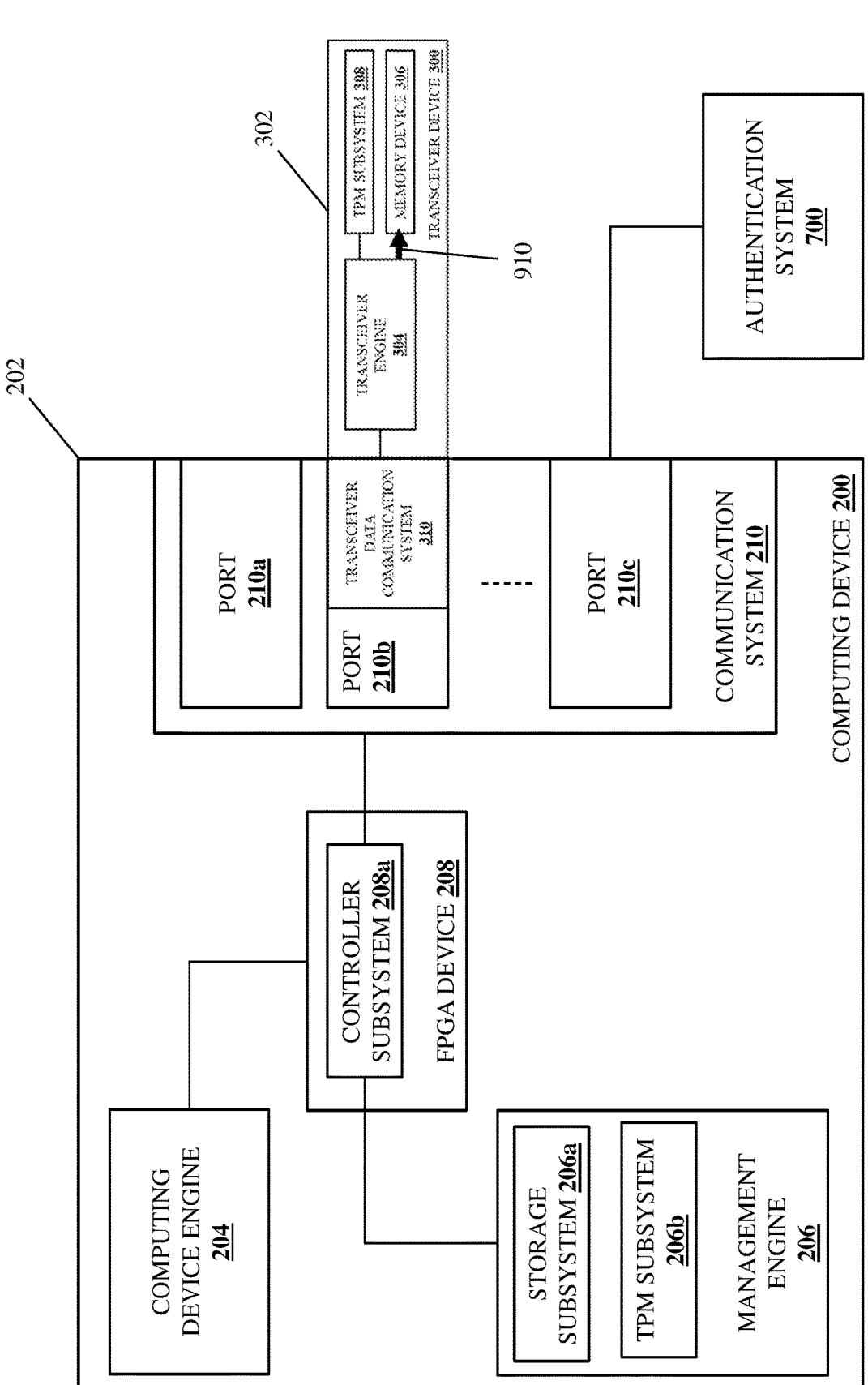
FIG. 9F is a schematic view illustrating an embodiment of the transceiver device security system of FIG. 7 performing the communications of FIG. 8 during the method of FIG. 4.

With reference to FIG. 9F, at block 416 the transceiver engine 304 may also perform memory device access operations 910 that include accessing the memory device 306 and providing a "PLATFORM-LOCKED" lock status in a lock status field in the memory device 306 (e.g., in the user-defined page of the EEPROM device discussed above) of the transceiver device 300 and a "Platform$_{pub}$" locks indicator in a locks field in the memory device 306 (e.g., in the user-defined page of the EEPROM device discussed above) of the transceiver device 300 in order to indicate that the transceiver device 300 is locked for use to a computing device/ platform identified by the platform public key Platform$_{pub}$, and one of skill in the art in possession of the present disclosure will appreciate how each of the lock status and the locks indicator may be read-only by the computing device 200 and its management engine 206). Following block 416, the transceiver device 300 is locked for use with the computing device 200 for "line-side" data communications, and the computing device engine 204 may take control of the transceiver device 300 for any of a variety of data communications that would be apparent to one of skill in the art in possession of the present disclosure.

Figure 10:
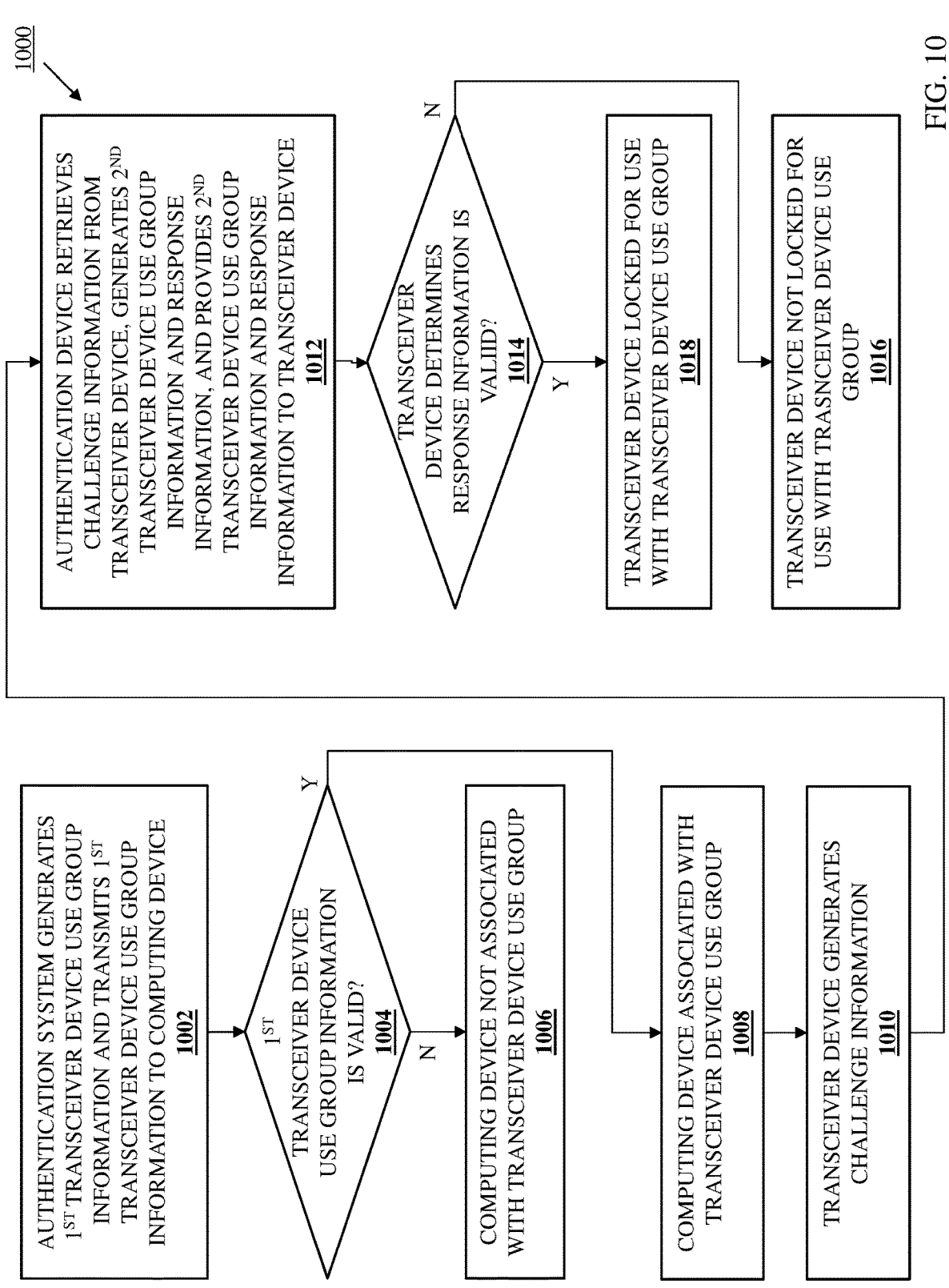
FIG. 10 is a flow chart illustrating an embodiment of a method for providing transceiver device security.

Referring now to FIG. 10, an embodiment of a method 1000 for providing transceiver device security by associating a transceiver device with a transceiver device use group that includes one or more computing devices with which that transceiver device may be used is illustrated. As discussed below, the systems and methods of the present disclosure provide for the locking of a transceiver device for use only with one or more transceiver device use groups, and the method 1000 may be performed to associate the transceiver device with a transceiver device use group via the computing device it was locked for use with via the method 400.

Figure 11:
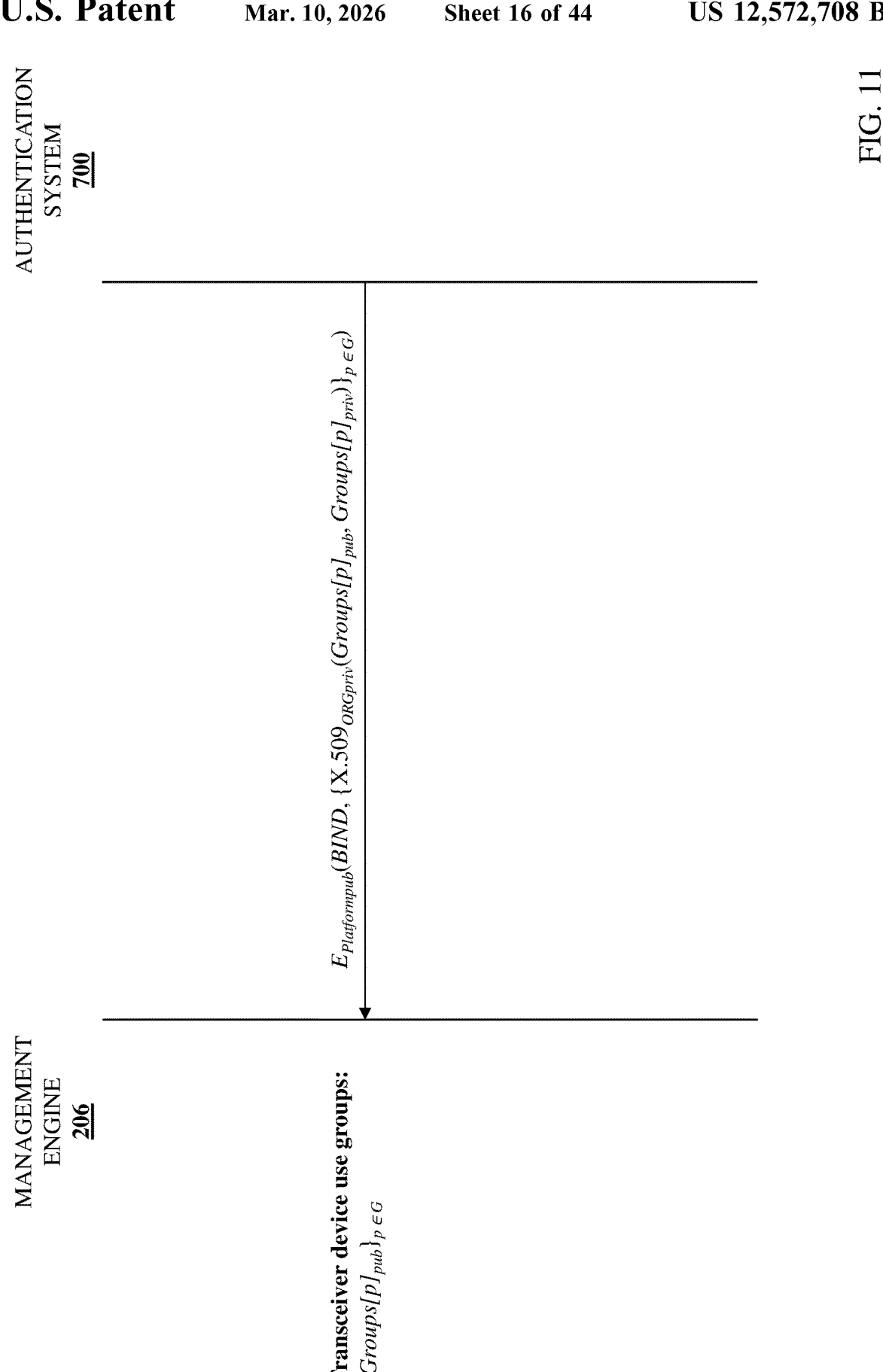
FIG. 11 is a swim lane diagram illustrating an embodiment of communications between the computing device and the authentication system of FIG. 7 during the method of FIG. 10.
Figure 12:
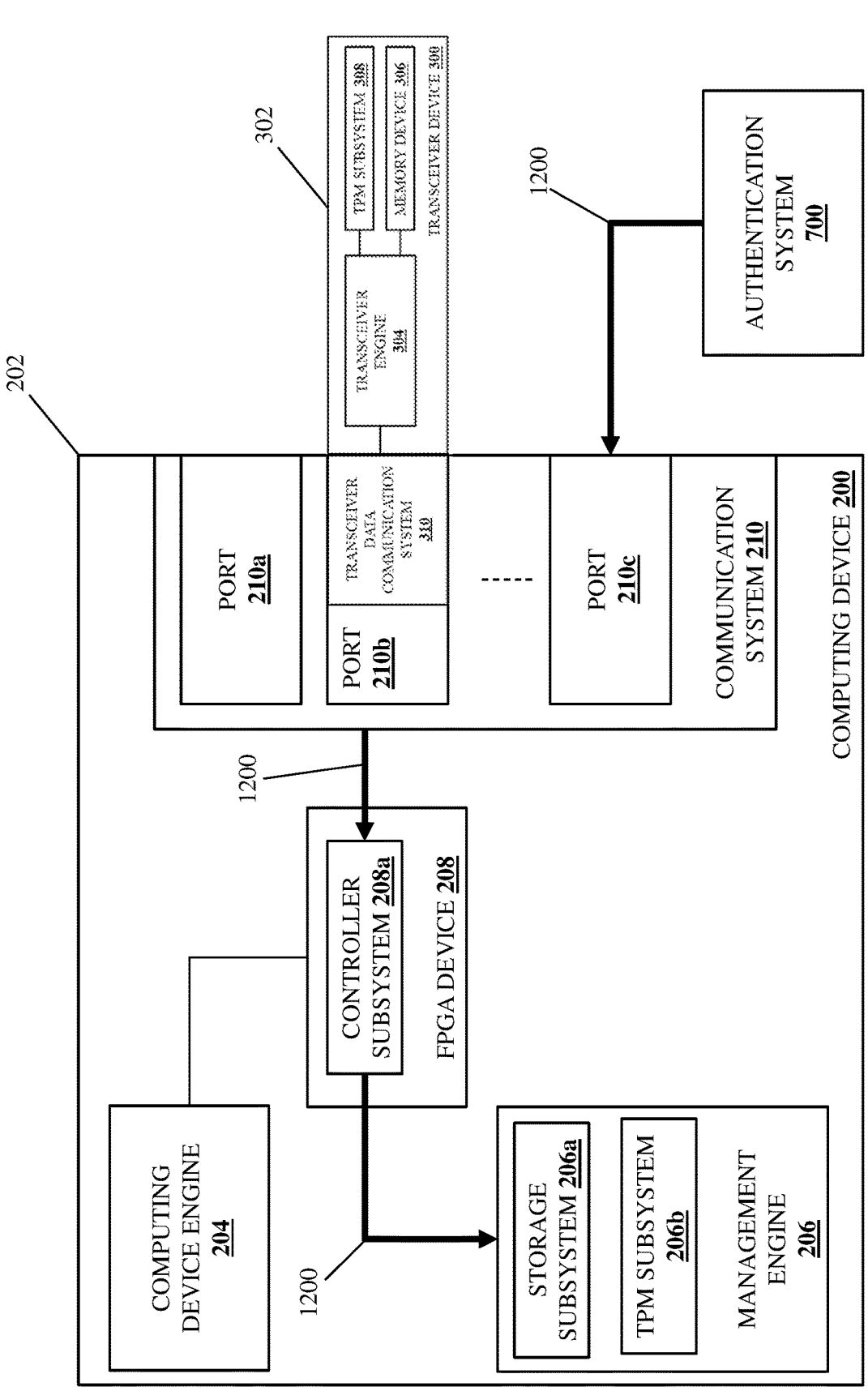
FIG. 12 is a schematic view illustrating an embodiment of the transceiver device security system of FIG. 7 performing the communications of FIG. 11 during the method of FIG. 10.

The method 1000 begins at block 1002 where an authentication system generates first transceiver device use group information and transmits the first transceiver device use group information to a computing device. With reference to FIG. 11, a swim lane diagram is provided that illustrates communications between the management engine 206 in the computing device 200 and the authentication system 700 during the method 1000, and will be referenced below to discuss those communications. With reference to FIGS. 11 and 12, at block 1002 the authentication system 700 may perform transceiver device use group information provisioning operations 1200 that include generating transceiver device use group information and transmitting that transceiver device use group information via the port 210*c* in the communication system 210, the controller subsystem 208*a* in the FPGA device 208, and to the management engine 206 in the computing device 200. For example, at block 1002, the computing device 200 may not be currently associated with a transceiver device use group, and as part of an initialization process for the computing device 200, the authentication system 700 may identify any transceiver device use group(s) to which the computing device 200 belongs (e.g., as assigned by the organization as described above), and provide the computing device 200 with transceiver device user group information for those transceiver device use group(s).

As illustrated in FIG. 11, the generation of the transceiver device use group information at block 1002 may include the authentication system 700 identifying the public-private key pairs for transceiver device use groups assigned to the computing device 200 $(Groups[p]_{pub}, Groups[p]_{priv})_{p \in G}$, and signing them with the organization private key $ORG_{priv}$ in an X.509 format to generate X.509 organization-private-key-signed transceiver device use group public-private key pairs $\{X509_{ORGpriv}(Groups[p]_{pub}, Groups[p]_{priv})\}_{p \in G}$. The authentication system 700 may then use the platform public key Platform$_{pub}$ for the computing device to encrypt a "BIND" instruction and the X.509 organization-private-key-signed transceiver device use group public-private key pairs $\{X509_{ORGpriv}(Groups[p]_{pub}, Groups[p]_{priv})\}_{p \in G}$ to provide the transceiver device use group information $E_{Platformpub}$ (BIND, $\{X.509_{ORGpriv}(Groups[p]_{pub}, Groups[p]_{priv})\}_{p \in G}$), and may transmit that transceiver device use group information $E_{Platformpub}$(BIND, $\{X.509_{ORGpriv}(Groups[p]_{pub}, Groups[p]_{priv})\}_{p \in G}$) to the management engine 206 via the port 210*b* in the communication system 210 and the controller subsystem 208*a* in the FPGA device 208.

The method 1000 then proceeds to decision block 1004 where the computing device determines whether the transceiver device use group information is valid. In an embodiment, at decision block 1004, the management engine 206 may use its platform private key Platform$_{priv}$ (which is stored in its TPM subsystem 206*b* as discussed above) to attempt to decrypt the transceiver device use group information $E_{Platformpub}$(BIND, $\{X.509_{ORGpriv}(Groups[p]_{pub}, Groups[p]_{priv})\}_{p \in G}$) and, if so, may use the X.509 organization public key certificate $X.509_{ORGpub}$ (which is stored in its storage subsystem 206*a* as discussed above) to attempt to verify the public-private key pairs for transceiver device use groups $(Groups[p]_{pub}, Groups[p]_{priv})_{p \in G}$ in the X.509 organization-private-key-signed transceiver device use group public-private key pairs $\{X.509_{ORGpriv}(Groups[p]_{pub}, Groups[p]_{priv})\}_{p \in G}$.

As such, one of skill in the art in possession of the present disclosure will appreciate how decision block 1004 involves the management engine 206 determining whether the transceiver device use group information is for the computing device 200/platform, and whether the public-private key pairs for transceiver device use groups $(Groups[p]_{pub}, Groups[p]_{priv})_{p \in G}$ are from the organization and, thus, whether the transceiver device use group information is valid. If, at decision block 1004, the management engine 206 determines that the transceiver device use group information is not valid, the method 1000 proceeds to block 1006 where the computing device is not associated with a transceiver device use group. In an embodiment, at block 1006 and in response to determining that the transceiver device use group information received from the authentication system 700 is not valid, the management engine 206 may not subsequently use the public-private key pairs for the transceiver device use groups $(Groups[p]_{pub}, Groups[p]_{priv})_{p \in G}$, that were received from the authentication system 700.

If, at decision block 1004, the management engine 206 determines that the transceiver device use group information is valid, the method 1000 proceeds to block 1008 where the computing device 200 is associated with a transceiver device use group. With reference to FIG. 11, in an embodiment of block 1008 and in response to determining that the transceiver device use group information received from the authentication system 700 is valid, the management engine 206 may set the transceiver device use groups to which it belongs to $\{Groups[p]_{pub}\}_{p \in G}$, and may subsequently use the public-private key pairs for the transceiver device use groups $(Groups[p]_{pub}, Groups[p]_{priv})_{p \in G}$, that were received from the authentication system 700 as described below.

As discussed above, blocks 1002-1008 of the method 1000 provide for the association of the computing device 200 with transceiver device use group in situations where the computing device 200 was not previously associated with those transceiver device use groups. However, one of skill in the art in possession of the present disclosure will appreciate how the computing device 200 may have been associated with transceiver device use groups similarly as discussed above prior to the method 400, and thus in some embodiments blocks 1002-1008 of the method 1000 may be skipped.

Figure 13:
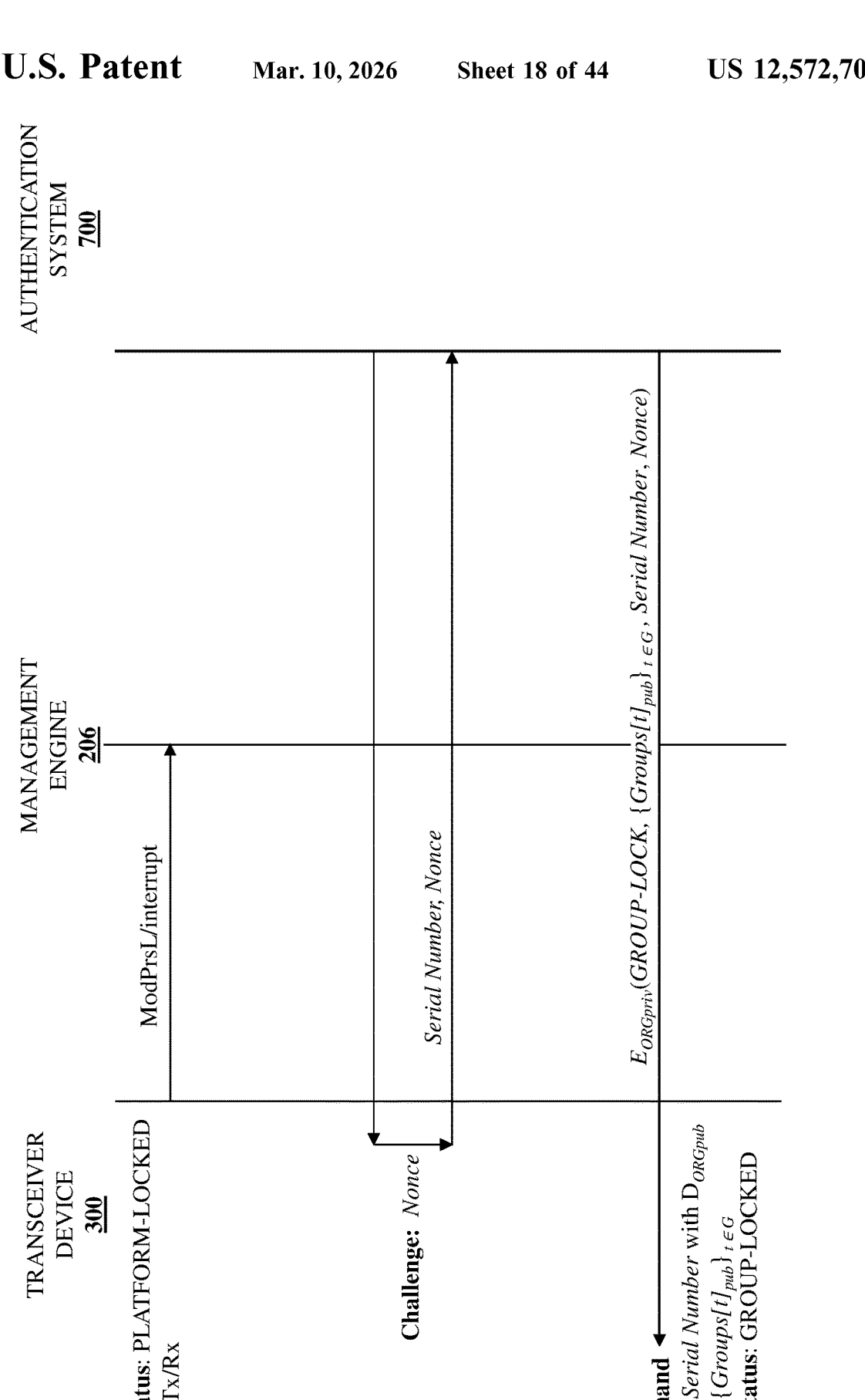
FIG. 13 is a swim lane diagram illustrating an embodiment of communications between the transceiver device and the authentication system via the computing device of FIG. 7 during the method of FIG. 10.

The method 1000 then proceeds to block 1010 where the transceiver device generates challenge information 1010. With reference to FIG. 13, a swim lane diagram is provided that illustrates communications between the transceiver device 300 and the authentication system 700 (via the management engine 206 in the computing device 200) during the remainder of the method 1000, and will be referenced below to discuss those communications. Furthermore, as illustrated in FIG. 13, the transceiver device 300 may have been locked for use with the computing device 200 (e.g., as per the "PLATFORM-LOCKED" lock status in the lock status field in the memory device 306 of the transceiver device 300 as described above), with "line-side" data communications enabled with the computing device 200.

Figure 14A:
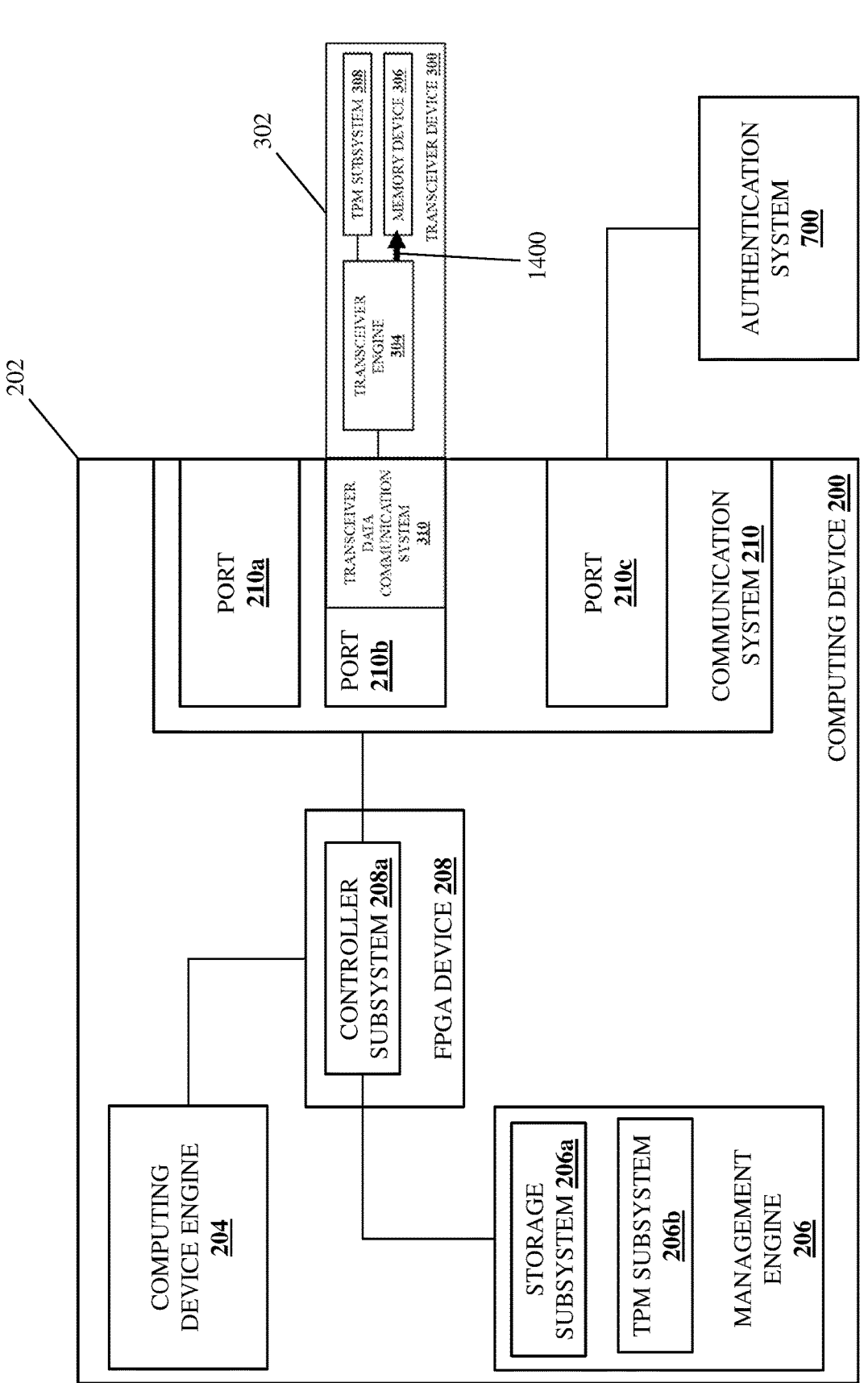
FIG. 14A is a schematic view illustrating an embodiment of the transceiver device security system of FIG. 7 performing the communications of FIG. 13 during the method of FIG. 10.

With continued reference to FIGS. 13 and 14A, at block 1010 the transceiver engine 304 may perform memory device access operations 1400 that may include the transceiver engine 304 randomly generating a nonce or other challenge information that would be apparent to one of skill in the art in possession of the present disclosure, and providing that challenge information in the memory device 306 (e.g., in the user-defined page of the EEPROM device discussed above) of the transceiver device 300. For example, after being "PLATFORM-LOCKED" to the computing device 200 via the method 400, the transceiver engine 304 may generate a "new" nonce or other challenge information (i.e., a nonce that is different than the nonce generated at block 408 of the method 400).

Figure 14B:
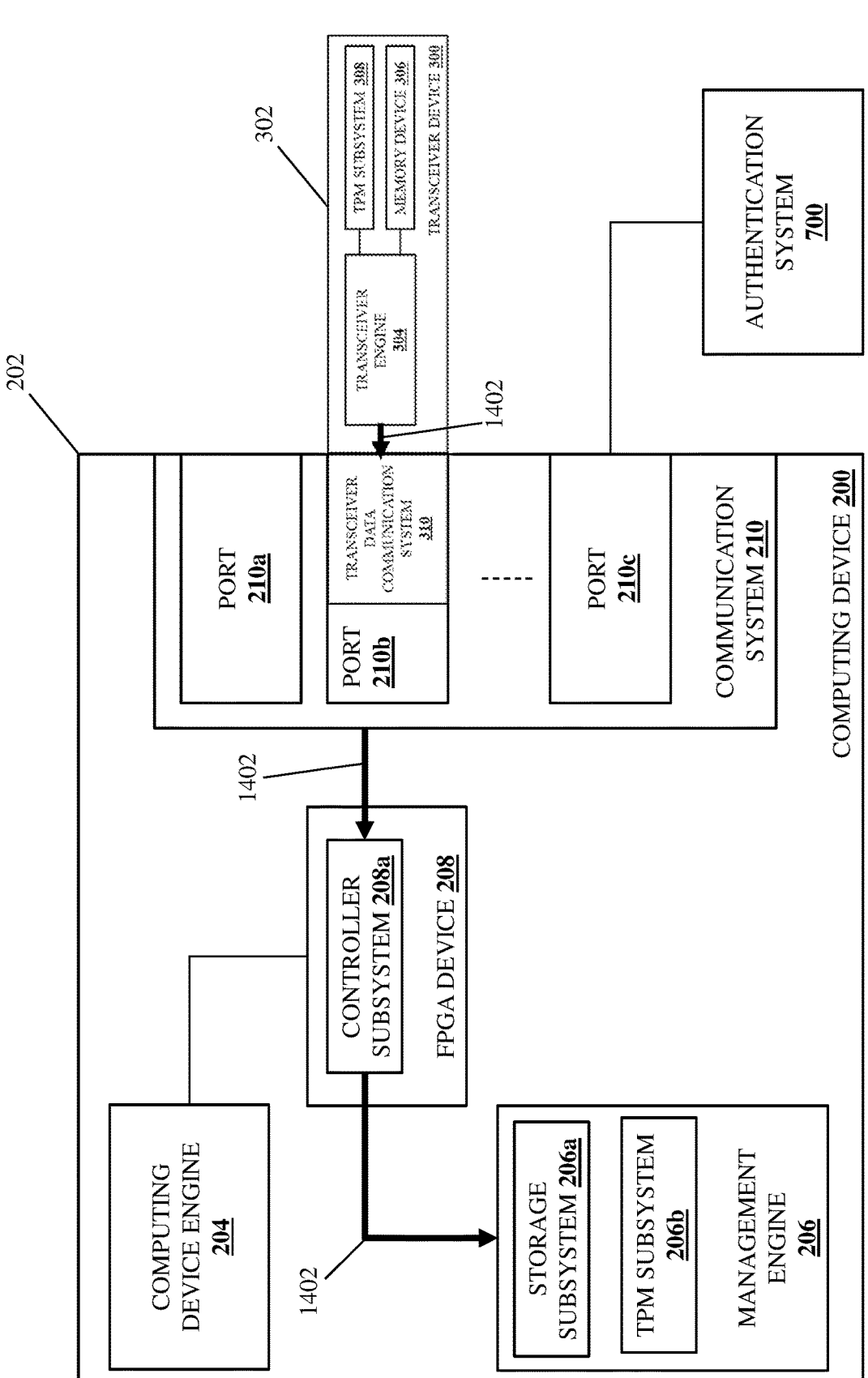
FIG. 14B is a schematic view illustrating an embodiment of the transceiver device security system of FIG. 7 performing the communications of FIG. 13 during the method of FIG. 10.

With reference to FIGS. 13 and 14B, at block 1010 and similarly as discussed above, the controller subsystem 208*a* in the FPGA device 208 may perform interrupt operations 1402 that may include detecting the ModulePresentLow (ModPrsL) signal or other interrupt signal (i.e., that generated by the transceiver engine 304 as discussed above) via the port 210*b* in the communication system 210 and, in response, transmitting an interrupt to the management engine 206 in the computing device 200. As will be appreciated by one of skill in the art in possession of the present disclosure, once generated by the transceiver engine 304 (e.g., at block 408 of the method 400), the ModPrsL signal or other interrupt signal may be polled by the management engine 206 via the controller subsystem 208a in the FPGA device 208 to determine whether the transceiver device 300 is still connected to the port 210b, resulting in the management engine 206 receiving the interrupt as illustrated in FIG. 14B.

Figure 14C:
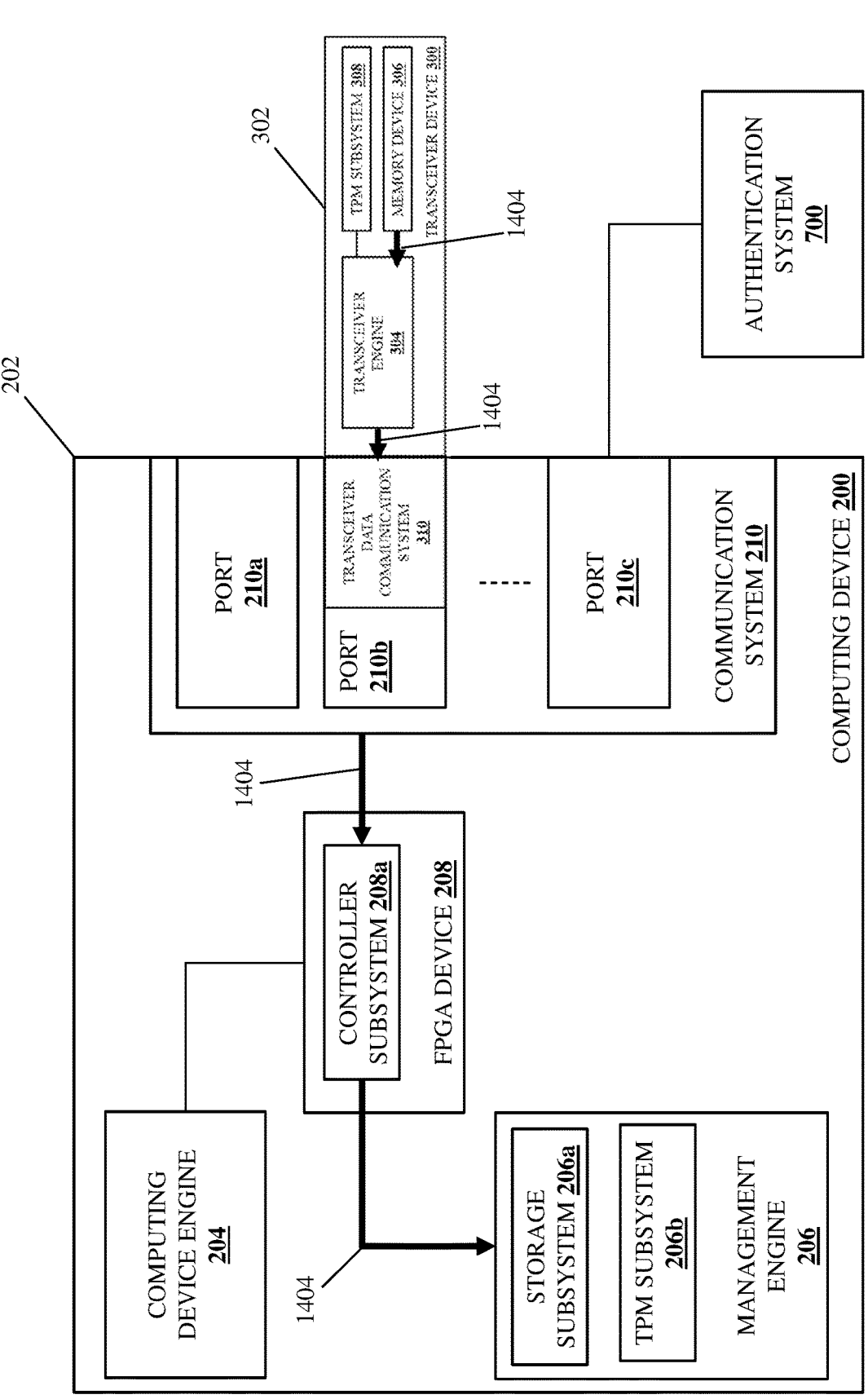
FIG. 14C is a schematic view illustrating an embodiment of the transceiver device security system of FIG. 7 performing the communications of FIG. 13 during the method of FIG. 10.
Figure 14D:
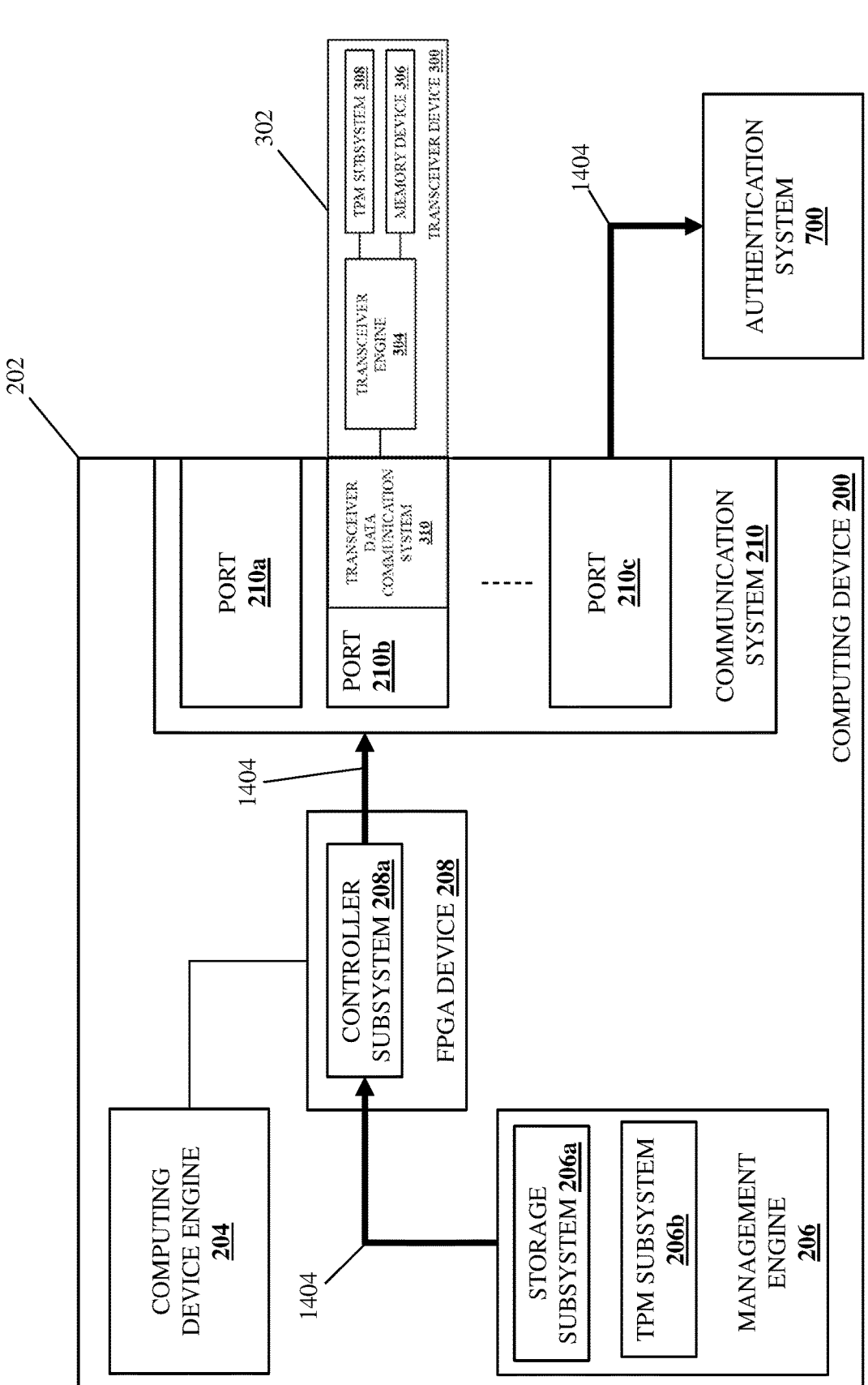
FIG. 14D is a schematic view illustrating an embodiment of the transceiver device security system of FIG. 7 performing the communications of FIG. 13 during the method of FIG. 10.

The method 1000 then proceeds to block 1012 where the authentication device retrieves challenge information, generates second transceiver device use group information and response information, and provides the second transceiver device use group information and the response information to the transceiver device. With reference to FIGS. 14C and 14D, in an embodiment of block 1012 and in response to the computing device 200 receiving the interrupt at block 1010, the authentication system 700 and the management engine 206 in the computing device 200 may perform challenge information retrieval operations 1404 by, for example, the management engine 206 accessing the memory device 306 in the transceiver device 300 via the port 210b in the communication system 210 and the controller subsystem 208a in the FPGA device 208 (e.g., accessing the user-defined page in the EEPROM device discussed above using any of a variety of transceiver device EEPROM access techniques that would be apparent to one of skill in the art in possession of the present disclosure) and reading the challenge information (e.g., the randomly generated nonce) provided in the memory device 306 by the transceiver engine 304, as well as a serial number of the transceiver device 300 and/or any other transceiver device information included in the memory device 306 by the transceiver engine 304, and providing that challenge information, serial number, and/or other transceiver device information to the authentication system 700 via the port 210c in the communication system 210 and the controller subsystem 208a in the FPGA device 208. However, while a specific sequence of the authentication system 700 retrieving the challenge information, serial number, and/or other transceiver device information from the transceiver device 300 via the computing device 200 has been described, one of skill in the art in possession of the present disclosure will appreciate how the authentication system 700 may retrieve the challenge information, serial number, and/or other transceiver device information from the transceiver device 300 in a variety of manners that will fall within the scope of the present disclosure as well.

In response to retrieving the challenge information, serial number, and/or other transceiver device information, at block 1012 the authentication system 700 may generate a "GROUP-LOCK" command that includes the challenge information as response information. In the specific example illustrated in FIG. 13, at block 1012 the authentication system 700 may use the serial number retrieved from the transceiver device 300 in order to identify (e.g., in an authentication device database that is accessible to the authentication system 700) the transceiver device use groups to which the transceiver device 300 belongs and retrieve the transceiver device user group public keys $\{Groups[t]_{pub}\}_{t \in G}$ of those transceiver device use groups, and then may encrypt a "GROUP-LOCK" instruction, the transceiver device user group public keys $\{Groups[t]_{pub}\}_{t \in G}$ of transceiver device use groups that are assigned to the transceiver device 300, the serial number retrieved from the transceiver device 300, and the nonce that provides the response information, with organization private key $ORG_{priv}$ to provide a "GROUP-LOCK" command $E_{ORGpriv}$(GROUP-LOCK, $\{Groups[t]_{pub}\}_{t \in G}$, Serial Number, Nonce).

Figure 14E:
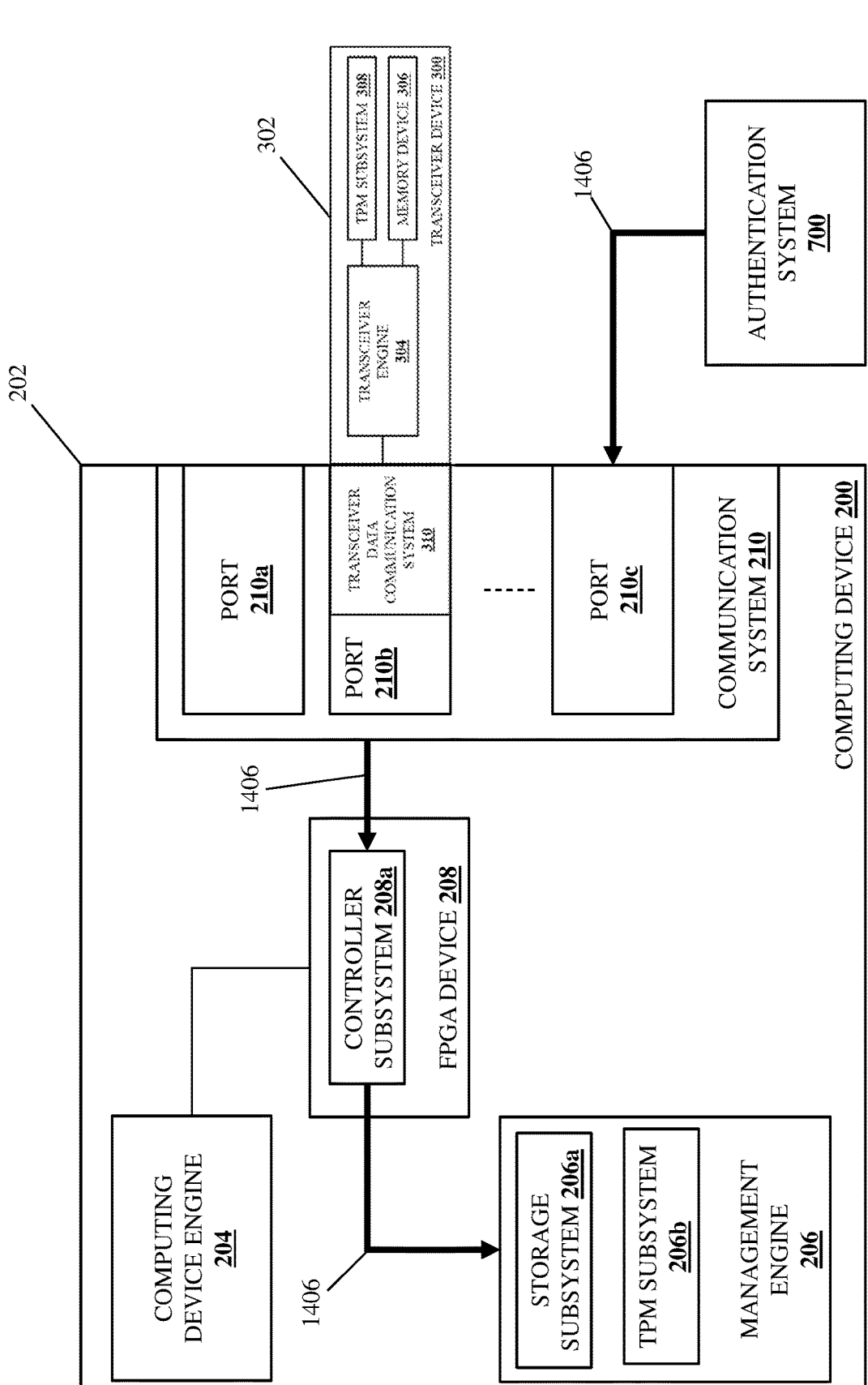
FIG. 14E is a schematic view illustrating an embodiment of the transceiver device security system of FIG. 7 performing the communications of FIG. 13 during the method of FIG. 10.
Figure 14F:
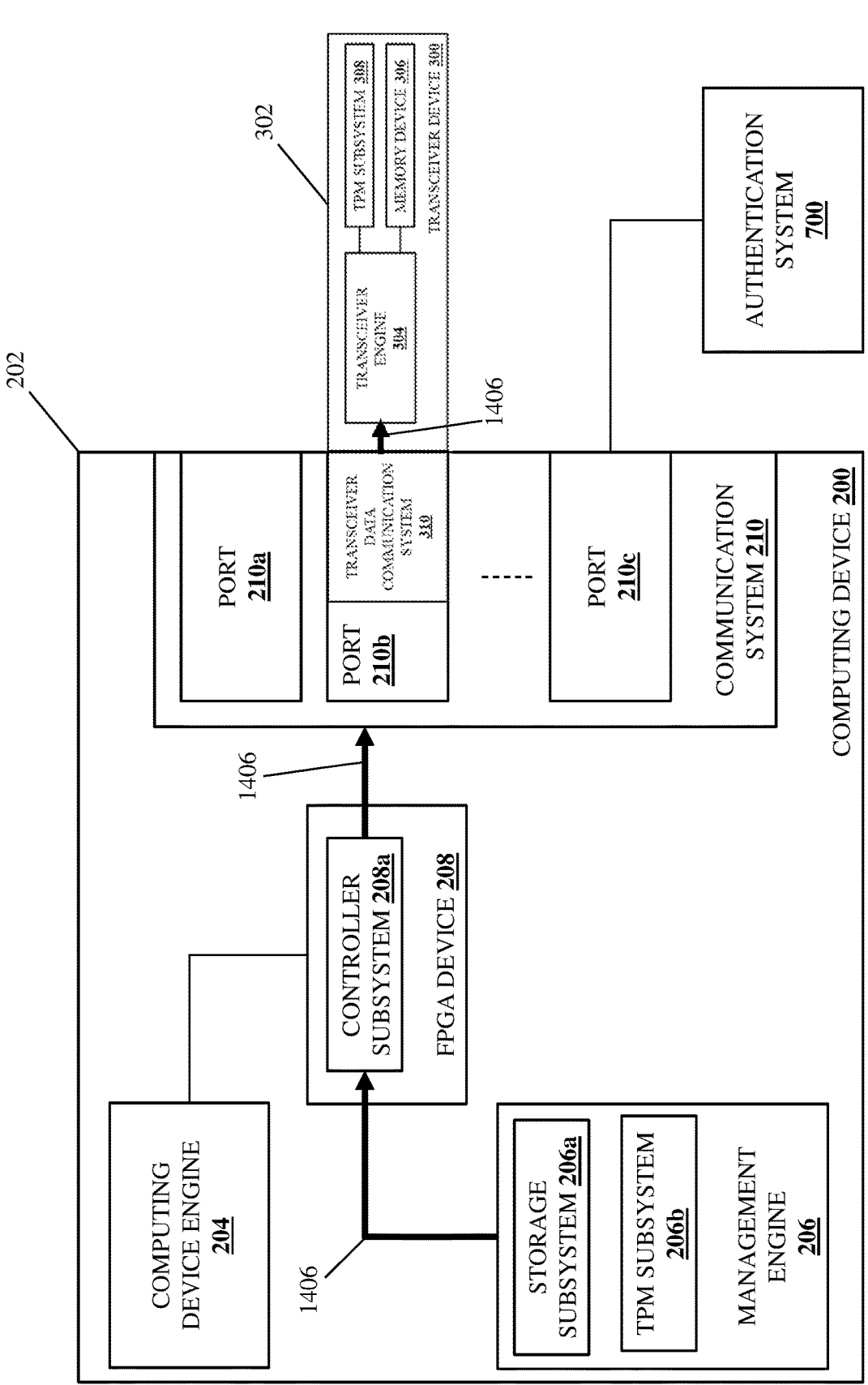
FIG. 14F is a schematic view illustrating an embodiment of the transceiver device security system of FIG. 7 performing the communications of FIG. 13 during the method of FIG. 10.

With reference to FIGS. 13, 14E, and 14F, the authentication system 700 and the management engine 206 in the computing device 200 may then perform group-lock command provisioning operations 1406 that include the authentication system 7000 providing the "GROUP-LOCK" command via the port 210c in the communication system 210, the controller subsystem 208a in the FPGA device 208, and to the management engine 206 in the computing device 200, and the management engine 206 writing that the "GROUP-LOCK" command in a command field in the memory device 306 in the transceiver device 300 via the port 210b in the communication system 210 and the controller subsystem 208a in the FPGA device 208 (e.g., by accessing the user-defined page in the EEPROM device discussed above using any of a variety of transceiver device EEPROM access techniques that would be apparent to one of skill in the art in possession of the present disclosure).

Figure 14G:
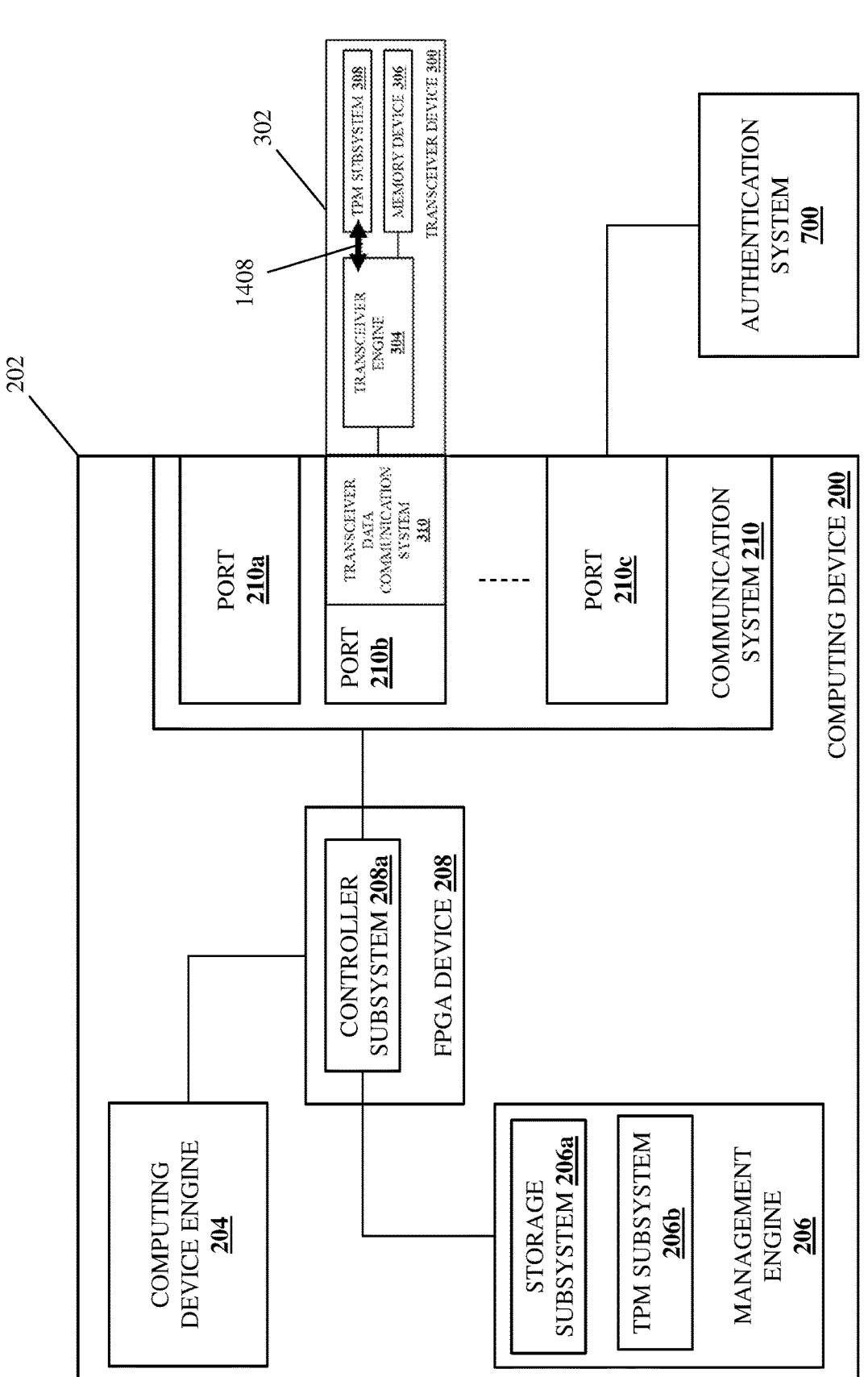
FIG. 14G is a schematic view illustrating an embodiment of the transceiver device security system of FIG. 7 performing the communications of FIG. 13 during the method of FIG. 10.

The method 1000 then proceeds to decision block 1014 where the transceiver device determines whether the response information received from the authentication system is valid. With reference to FIGS. 13 and 14G, in an embodiment of block 1014 and in response to the "GROUP-LOCK" command being provided in a command field in the memory device 306, the transceiver engine 304 may perform group lock command verification operations 1408. For example, at decision block 1014, the transceiver engine 304 may use the X.509 organization public key certificate $X.509_{ORGpub}$ (which is stored in its TPM subsystem 308 as discussed above) to verify that the "GROUP-LOCK" instruction, the transceiver device user group public keys of transceiver device use groups that are assigned to the transceiver device 300 $\{Groups[t]_{pub}\}_{t \in G}$, the serial number, and the nonce are from the organization, and if so, the transceiver engine 304 may determine whether that nonce (i.e., the response information) matches the nonce it generated at block 1010 (i.e., the challenge information).

As will be appreciated by one of skill in the art in possession of the present disclosure, the serial number of the transceiver device 300 is not required in the "GROUP-LOCK" command, as the nonce/response information may be used by the transceiver engine 304 to validate the "GROUP-LOCK" command. However, the inclusion of the serial number of the transceiver device 300 in the "GROUP-LOCK" command may be used for auditing/tracking the behavior of the authentication system 700 (i.e., as the nonce/challenge information is ephemeral on the transceiver device 300).

As such, one of skill in the art in possession of the present disclosure will appreciate how decision block 1014 involves the transceiver device 300 verifying that the "GROUP-LOCK" command is from the organization and includes the challenge information it generated at block 1010 and, thus, whether the response information in the "GROUP-LOCK" command is valid. If, at decision block 1014, the transceiver device determines that the response information is not valid, the method 1000 proceeds to block 1016 where the transceiver device is not locked for use with the transceiver device use group(s) whose transceiver device use group public key(s) are included in the "GROUP-LOCK" command.

Figure 14H:
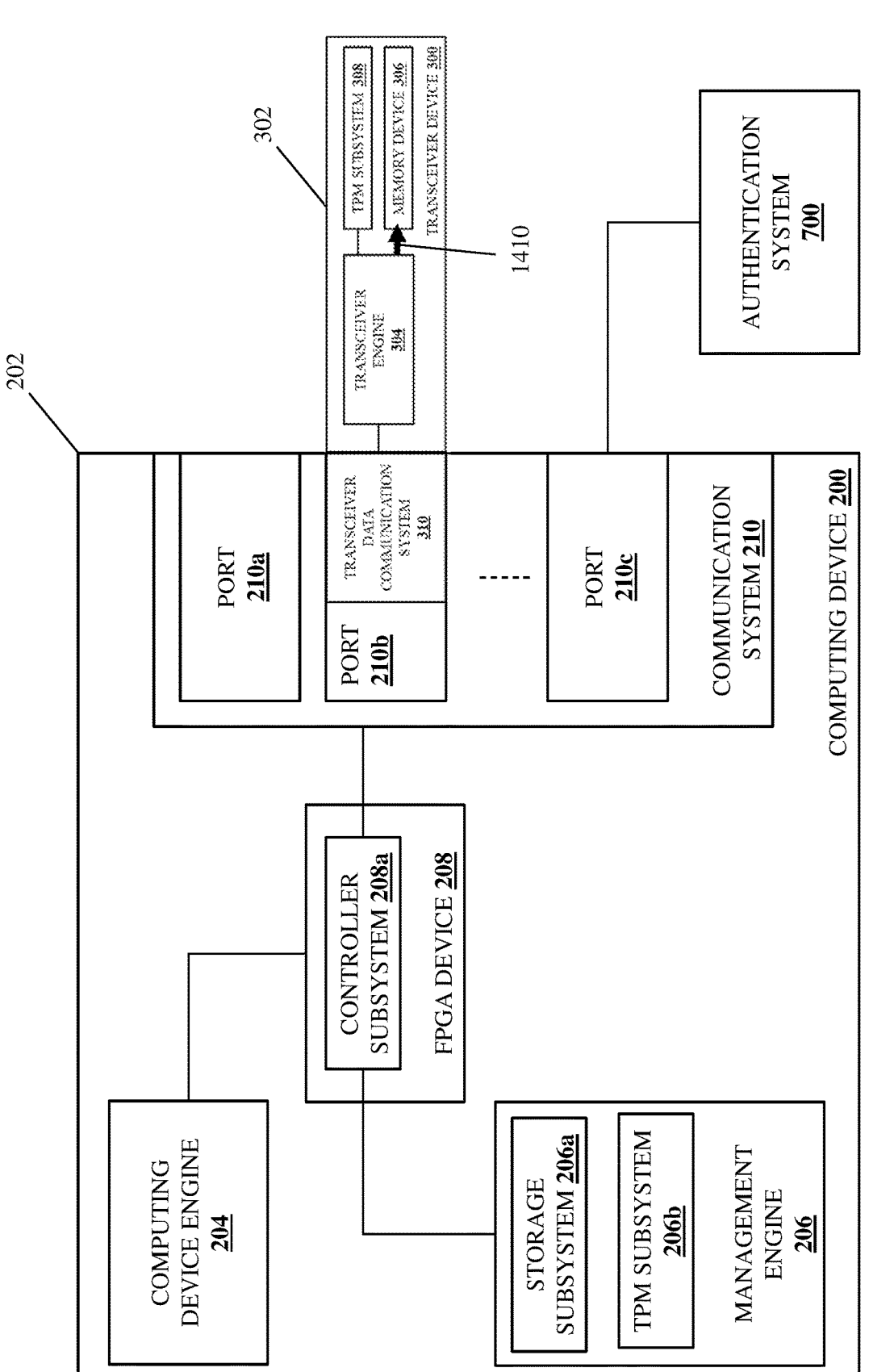
FIG. 14H is a schematic view illustrating an embodiment of the transceiver device security system of FIG. 7 performing the communications of FIG. 13 during the method of FIG. 10.

If, at decision block 1010, the transceiver device determines that the response information is valid, the method 1000 proceeds to block 1018 where the transceiver device is locked for use with the transceiver device use group. With reference to FIG. 14H, at block 1018 the transceiver engine 304 may perform memory device access operations 1410 that include accessing the memory device 306 and providing a "GROUP-LOCKED" lock status in a lock status field in the memory device 306 (e.g., in the user-defined page of the EEPROM device discussed above) of the transceiver device 300 and a "$\{Groups[t]_{pub}\}_{t \in G}$" locks indicator in a locks field in the memory device 306 (e.g., in the user-defined page of the EEPROM device discussed above) of the transceiver device 300 in order to indicate that the transceiver device 300 is locked for use to transceiver device use groups identified by the transceiver device use group public keys $\{Groups[t]_{pub}\}_{t \in G}$. Following block 1018, the transceiver device 300 is locked for use with computing devices associated with the transceiver device use groups to which it belongs for "line-side" data communications.

As such, one of skill in the art in possession of the present disclosure will appreciate how the methods 400 and 1000 allow a transceiver device to be locked to transceiver device use groups from a factory device state (e.g., from "LOCK-WAIT" to "PLATFORM-LOCKED" to "GROUP-LOCKED" as described above) in a completely automated production network. However, in other embodiments, the transceiver devices may be configured to be locked to transceiver device use groups (e.g., by the organization) out-of-band and prior to onboarding those transceiver devices into production by, for example, connecting the transceiver device to a "test"/non-production computing device/platform that has access to the authentication system 700 and that operates substantially similarly to the computing device 200 discussed above in order to provide for the platform locking and group locking of the transceiver device. Similarly, the transceiver devices may be configured to be locked to transceiver device use groups (e.g., by the organization) out-of-band, prior to onboarding those transceiver devices into production, and without even the need to connect the transceiver device to a "test"/non-production computing device/platform using a handheld computing device (e.g., a mobile phone, tablet computing device, etc.) that has access to the authentication system 700 and that may connect to the transceiver device (e.g., wirelessly) to operate substantially similarly to the computing device 200 discussed above in order to provide for the platform locking and group locking of the transceiver device.

Figure 15:
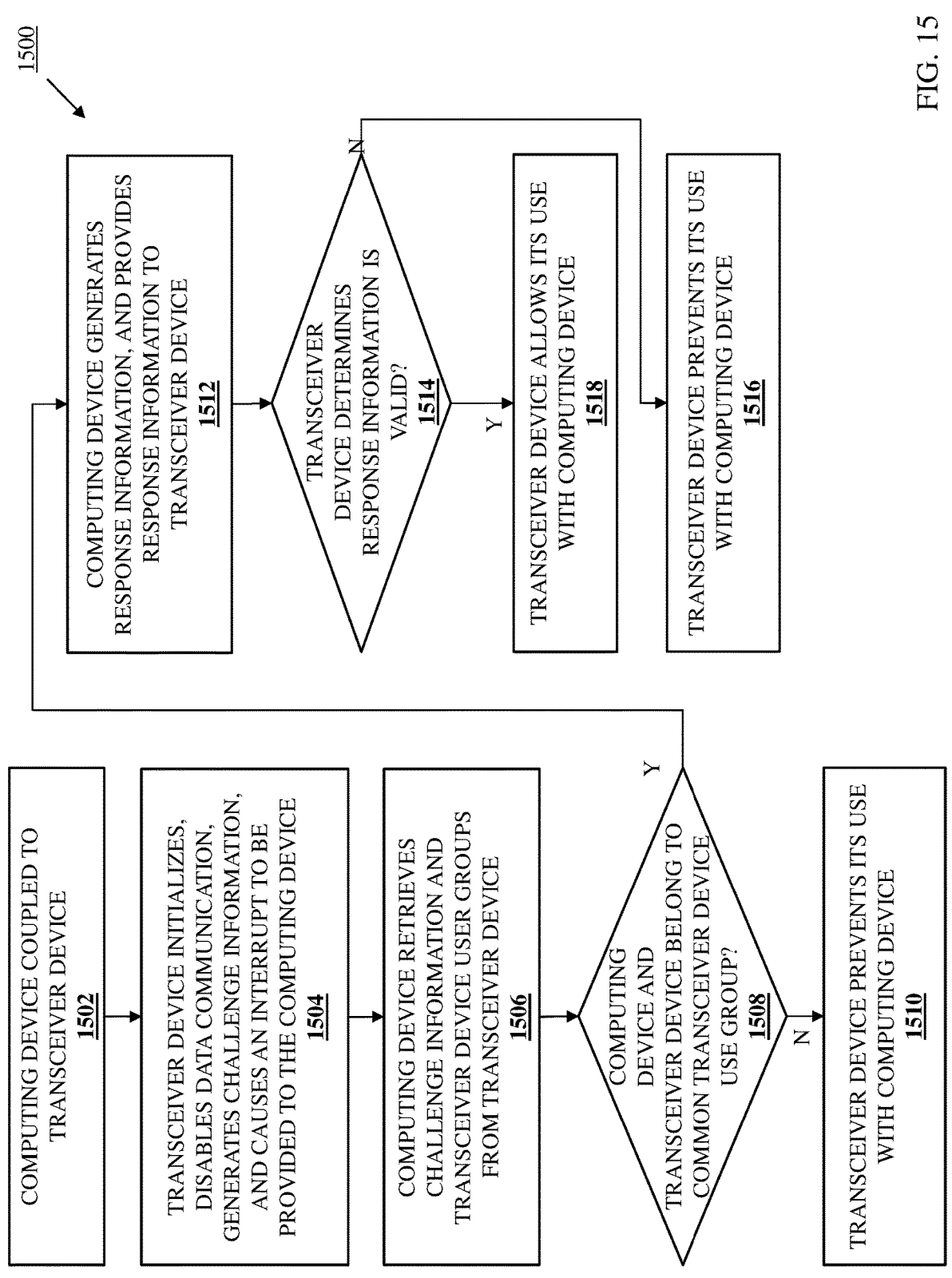
FIG. 15 is a flow chart illustrating an embodiment of a method for providing transceiver device security.

Referring now to FIG. 15, an embodiment of a method 1500 for providing transceiver device security by allowing a transceiver device to be used with a computing device is illustrated. As discussed below, the systems and methods of the present disclosure provide for the locking of a transceiver device for use only with one or more transceiver device use groups, and the method 1500 may be performed to allow the use of such a transceiver device with a computing device that is included in a transceiver device use group to which the transceiver device belongs. The method 1500 begins at block 1502 where a computing device is coupled to a transceiver device. In an embodiment, at block 1502, the transceiver device 300 may be connected to the computing device 200 similarly as described above with reference to FIG. 7. As such, in a specific example, the transceiver device 300 discussed above that has been locked for use with transceiver device use groups as per the methods 400 and 1000 may be disconnected from the computing device 200 and then reconnected to that computing device 200, or connected to another computing device 200.

Figure 16:
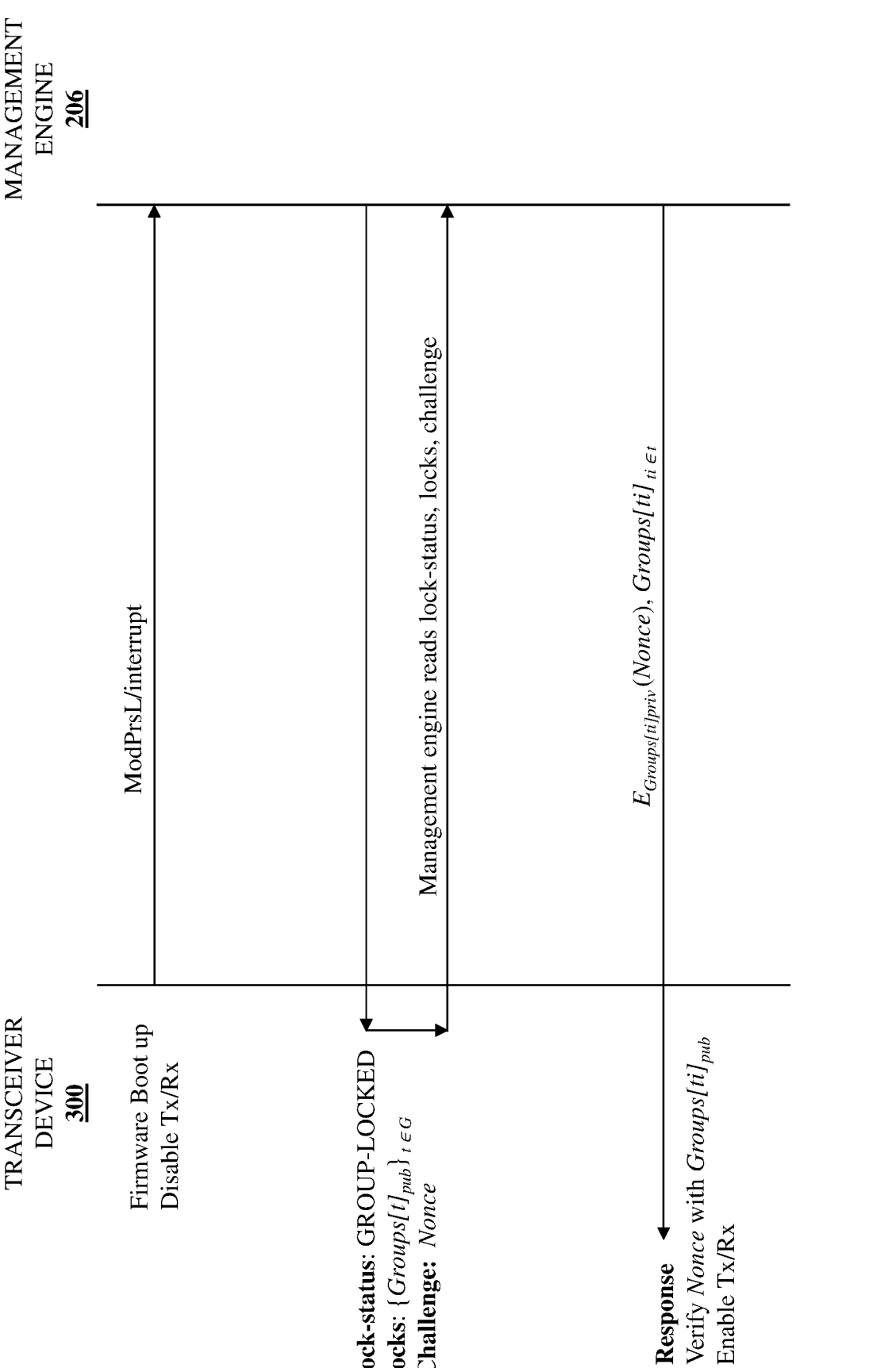
FIG. 16 is a swim lane diagram illustrating an embodiment of communications between the transceiver device and the computing device of FIG. 7 during the method of FIG. 15.

The method 1500 then proceeds to block 1504 where the transceiver device initializes, disables data communication, generates challenge information, and causes an interrupt to be provided to the computing device. In an embodiment, at block 1504, the computing device 200 may be powered on or otherwise initialized and, in response, the transceiver device 300 will initialize as well. With reference to FIG. 16, a swim lane diagram is provided that illustrates communications between the transceiver device 300 and the management engine 206 in the computing device 200 during the remainder of the method 1500, and will be referenced below to discuss those communications. In an embodiment, and as illustrated in FIG. 15, the transceiver engine 304 (e.g., provided by firmware loaded on the transceiver device 300 by the device manufacturer as described above) may initialize and, in response, may disable data communications by, for example, disabling SERDES device(s) and/or any other transceiver data communication components in the transceiver data communication system 310 or that transceiver device 300 that one of skill in the art in possession of the present disclosure would recognize as preventing "line-side" data communications via the transceiver device 300 by the computing device engine 204 in the computing device 200 (but while allowing the "management" data communications with the management engine 206 in the computing device 200 described below via, for example, the 12C couplings and the controller subsystem 208a in the FPGA device 208).

Furthermore, as will be appreciated by one of skill in the art in possession of the present disclosure, the "GROUP-LOCKED" lock status provided in the lock status field in the memory device 306 (e.g., in the user-defined page of the EEPROM device discussed above) of the transceiver device 300 during the method 1000, and the "$\{Groups[t]_{pub}\}_{t \in G}$" locks indicator provided in a locks field in the memory device 306 (e.g., in the user-defined page of the EEPROM device discussed above) of the transceiver device 300 during the method 1000, may remain in the memory device 306 across different initializations of the transceiver device 300 that occur after the transceiver device 300 has been locked for use with transceiver device use groups identified by the transceiver device use group public keys $\{Groups[t]_{pub}\}_{t \in G}$, and operate to indicate that the transceiver device 300 is locked to those transceiver device use groups.

Figure 17A:
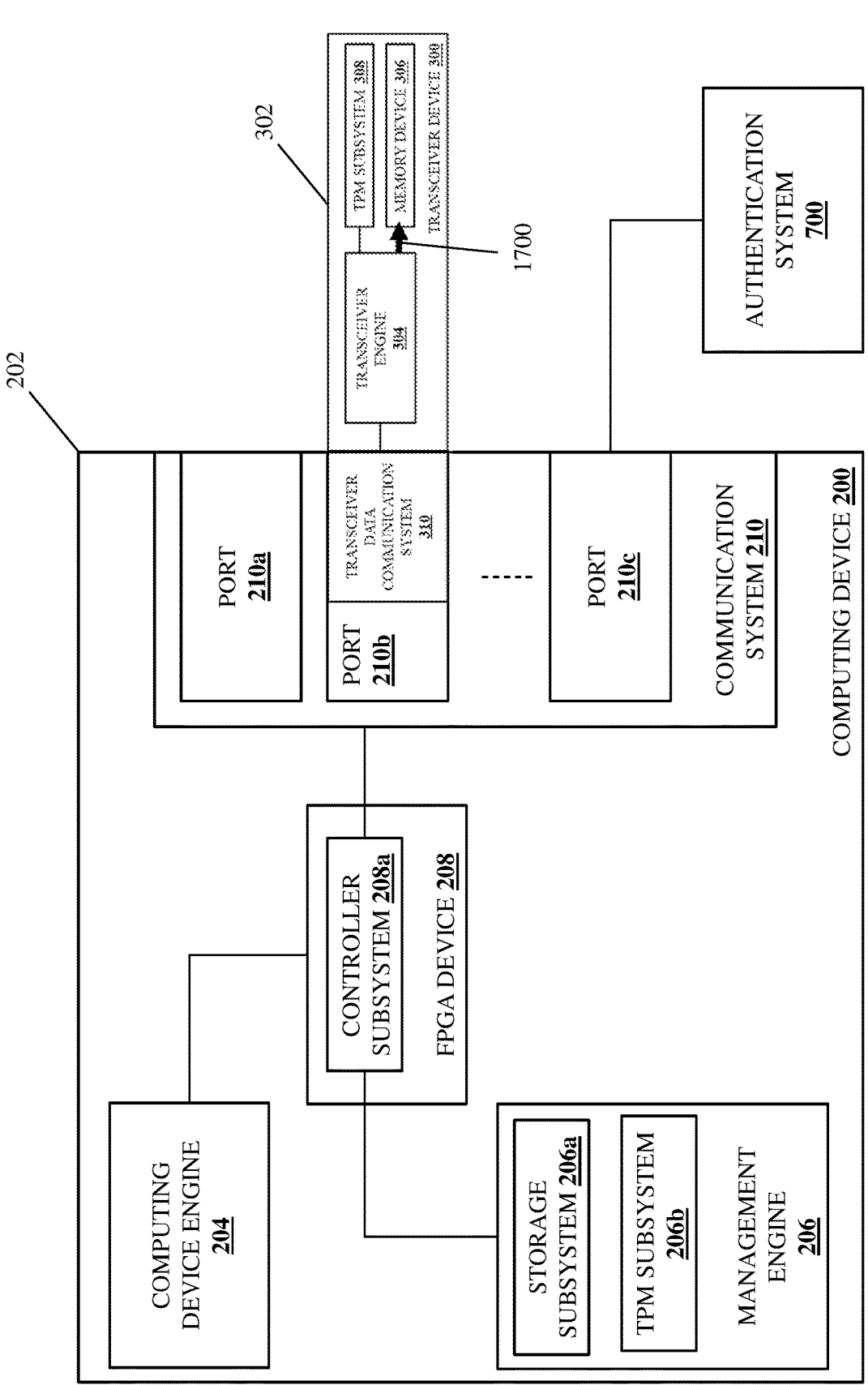
FIG. 17A is a schematic view illustrating an embodiment of the transceiver device security system of FIG. 7 performing the communications of FIG. 16 during the method of FIG. 15.

With continued reference to FIGS. 16 and 17A, the transceiver engine 304 may perform memory device access operations 1700 that may include randomly generating a nonce or other challenge information that would be apparent to one of skill in the art in possession of the present disclosure, and providing that challenge information in the memory device 306 (e.g., in the user-defined page of the EEPROM device discussed above) of the transceiver device 300. For example, after being "GROUP-LOCKED" to the transceiver device use groups via the method 1000, the transceiver engine 304 may generate a "new" nonce or other challenge information (i.e., a nonce that is different than the nonce generated at block 1010 of the method 1000).

Figure 17B:
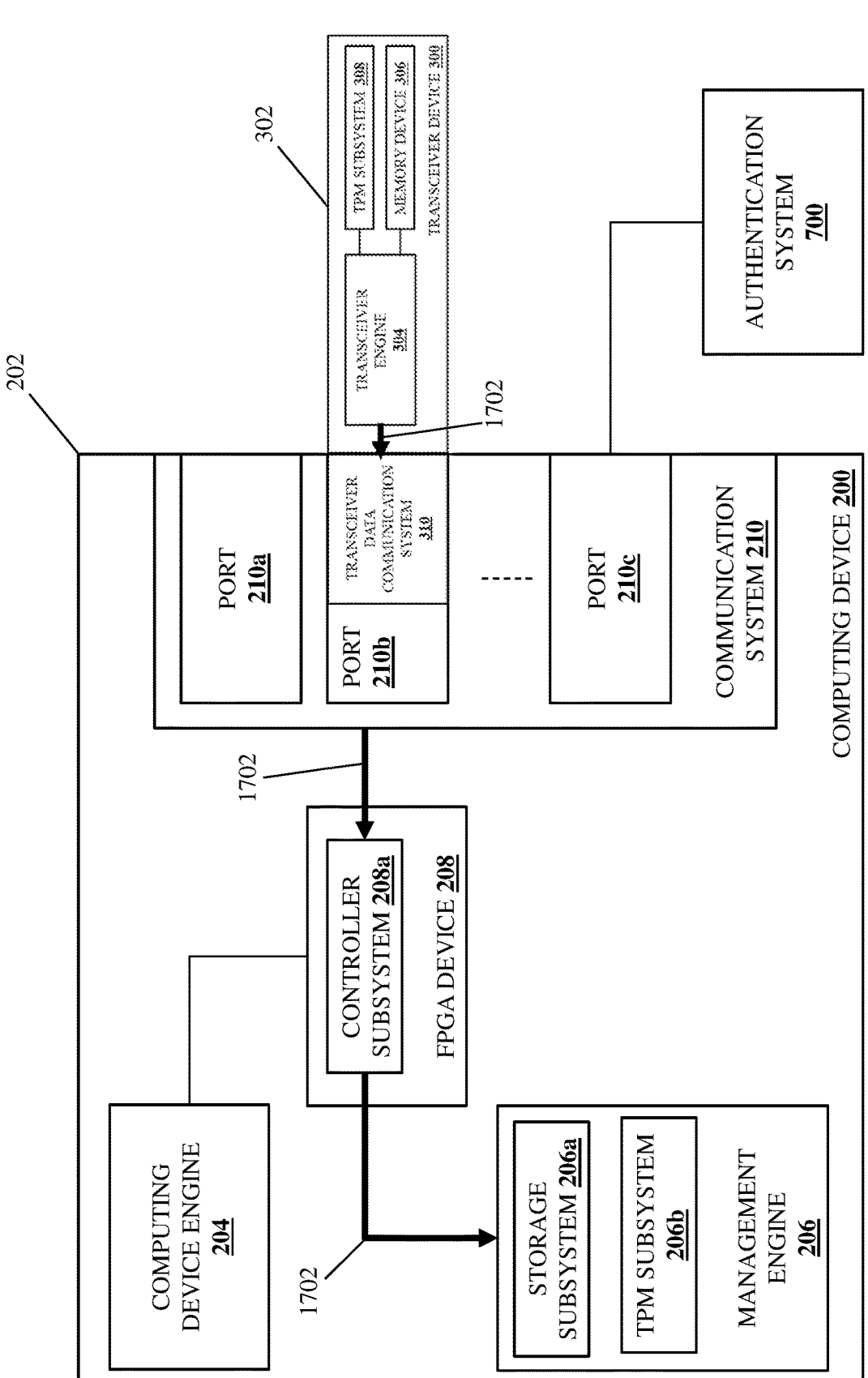
FIG. 17B is a schematic view illustrating an embodiment of the transceiver device security system of FIG. 7 performing the communications of FIG. 16 during the method of FIG. 15.

With reference to FIGS. 16 and 17B, at block 1504 and similarly as discussed above, the controller subsystem 208a in the FPGA device 208 may also perform interrupt operations 1702 that may include detecting the ModulePresent-Low (ModPrsL) signal or other interrupt signal generated by the transceiver engine 304 as discussed above via the port 210b in the communication system 210 and, in response, transmitting an interrupt to the management engine 206 in the computing device 200. As discussed above, once generated by the transceiver engine 304 (e.g., at block 408 of the method 400), the ModPrsL signal or other interrupt signal may be polled by the management engine 206 via the controller subsystem 208*a* in the FPGA device 208 to determine whether the transceiver device 300 is still connected to the port 210*b*, resulting in the management engine 206 receiving the interrupt as illustrated in FIG. 17B.

Figure 17C:
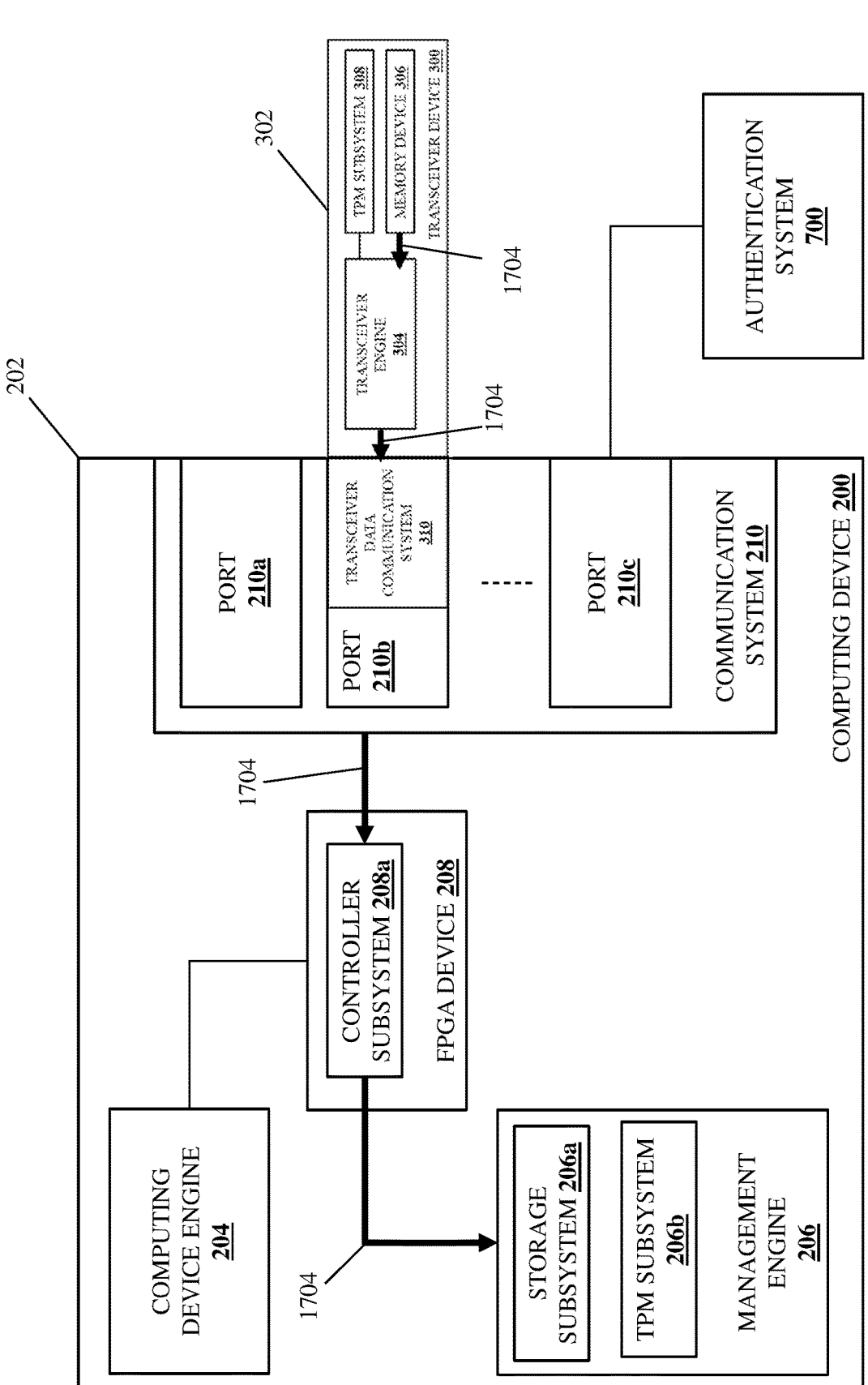
FIG. 17C is a schematic view illustrating an embodiment of the transceiver device security system of FIG. 7 performing the communications of FIG. 16 during the method of FIG. 15.

The method 1500 then proceeds to block 1506 where the computing device retrieves challenge information and transceiver device use groups from the transceiver device. With reference to FIG. 17C, in an embodiment of block 1506 and in response to receiving the interrupt at block 1504, the management engine 206 in the computing device 200 may perform challenge information/transceiver device use groups retrieval operations 1704 by, for example, accessing the memory device 306 in the transceiver device 300 via the port 210*b* in the communication system 210 and the controller subsystem 208*a* in the FPGA device 208 (e.g., accessing the user-defined page in the EEPROM device discussed above using any of a variety of transceiver device EEPROM access techniques that would be apparent to one of skill in the art in possession of the present disclosure), identifying the "GROUP-LOCKED" lock status of the transceiver device 300 in the lock status field, the challenge information (e.g., the randomly generated nonce), and the "$\{Groups[t]_{pub}\}_{t \in G}$" locks indicator in the locks field in the memory device 306 of the transceiver engine 304.

The method 1000 then proceeds to decision block 1508 where the computing device determines whether the computing device and the transceiver device belong to a common transceiver device use group. In an embodiment, at decision block 1508, the management engine 206 may compare the "$\{Groups[t]_{pub}\}_{t \in G}$" locks indicator retrieved from the transceiver device 300 to the transceiver device use groups (identified by the transceiver device use group public keys $\{Groups[p]_{pub}\}_{p \in G}$) to which it belongs (as set at block 1008 of the method 1000 described above) to determine whether the transceiver device 300 is associated with a transceiver device use group that includes the computing device 200 (i.e., to determine whether both the transceiver device 300 and the computing device 200 belong to transceiver device use groups with a common transceiver device use group public key).

If, at decision block 1508, the computing device 200 determines that the computing device 200 and the transceiver device 300 do not belong to a common transceiver device use group, the method 1500 proceeds to block 1510 where the transceiver device prevents its use with the computing device 200. For example, in response to determining that the computing device 200 and the transceiver device 300 do not belong to a common transceiver device use group, the management engine 206 will not perform the operations of block 1512 discussed below, and thus the transceiver engine 304 will not enable the data communications that were disabled at block 1504, thus preventing the computing device engine 204 in the computing device 200 from performing "line-side" data communications using the transceiver device 300.

If, at decision block 1508, the computing device 200 determines that the computing device 200 and the transceiver device 300 belong to a common transceiver device use group, the method 1500 proceeds to block 1510 where the computing device generates response information, and provides the response information to the transceiver device. In an embodiment, at block 1510, the management engine 206 may generate a challenge response that includes the challenge information as response information. In the specific example illustrated in FIG. 16, the management engine

206 may encrypt the nonce that provides the response information with a group private key $Groups[ti]_{priv}$ for the transceiver device use group to which both the transceiver device 300 and the computing device 200 belong in order to generate a transceiver-device-use-group private-key-encrypted nonce $E_{Groups[ti]priv}(Nonce)$. The management engine 206 may then provide the transceiver-device-use-group private-key-encrypted nonce $E_{Groups[ti]priv}(Nonce)$ and a transceiver device use group identifier $Groups[ti]_{ti \in t}$ (that identifies the transceiver device use group whose transceiver device use group private key was used to encrypt the nonce) in a challenge response $E_{Groups[ti]priv}(Nonce)$, $Groups[ti]_{ti \in t}$.

Figure 17D:
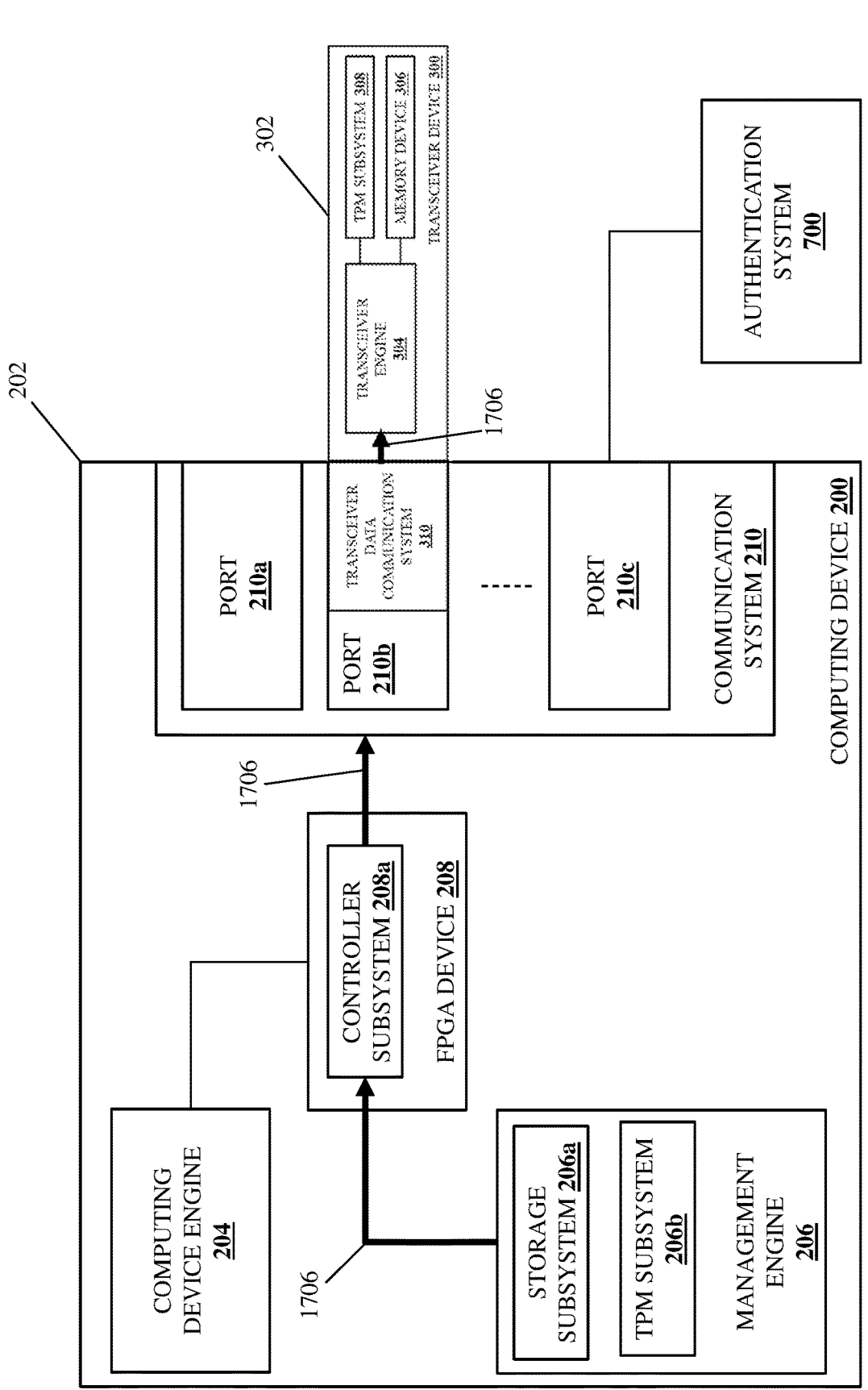
FIG. 17D is a schematic view illustrating an embodiment of the transceiver device security system of FIG. 7 performing the communications of FIG. 16 during the method of FIG. 15.

With reference to FIGS. 16 and 17D, the management engine 206 may then perform challenge response provisioning operations 1706 that include providing the challenge response to the transceiver device 300 by writing that challenge response in the memory device 306 in the transceiver device 300 via the port 210*b* in the communication system 210 and the controller subsystem 208*a* in the FPGA device 208 (e.g., by accessing the user-defined page in the EEPROM device discussed above using any of a variety of transceiver device EEPROM access techniques that would be apparent to one of skill in the art in possession of the present disclosure).

Figure 17E:
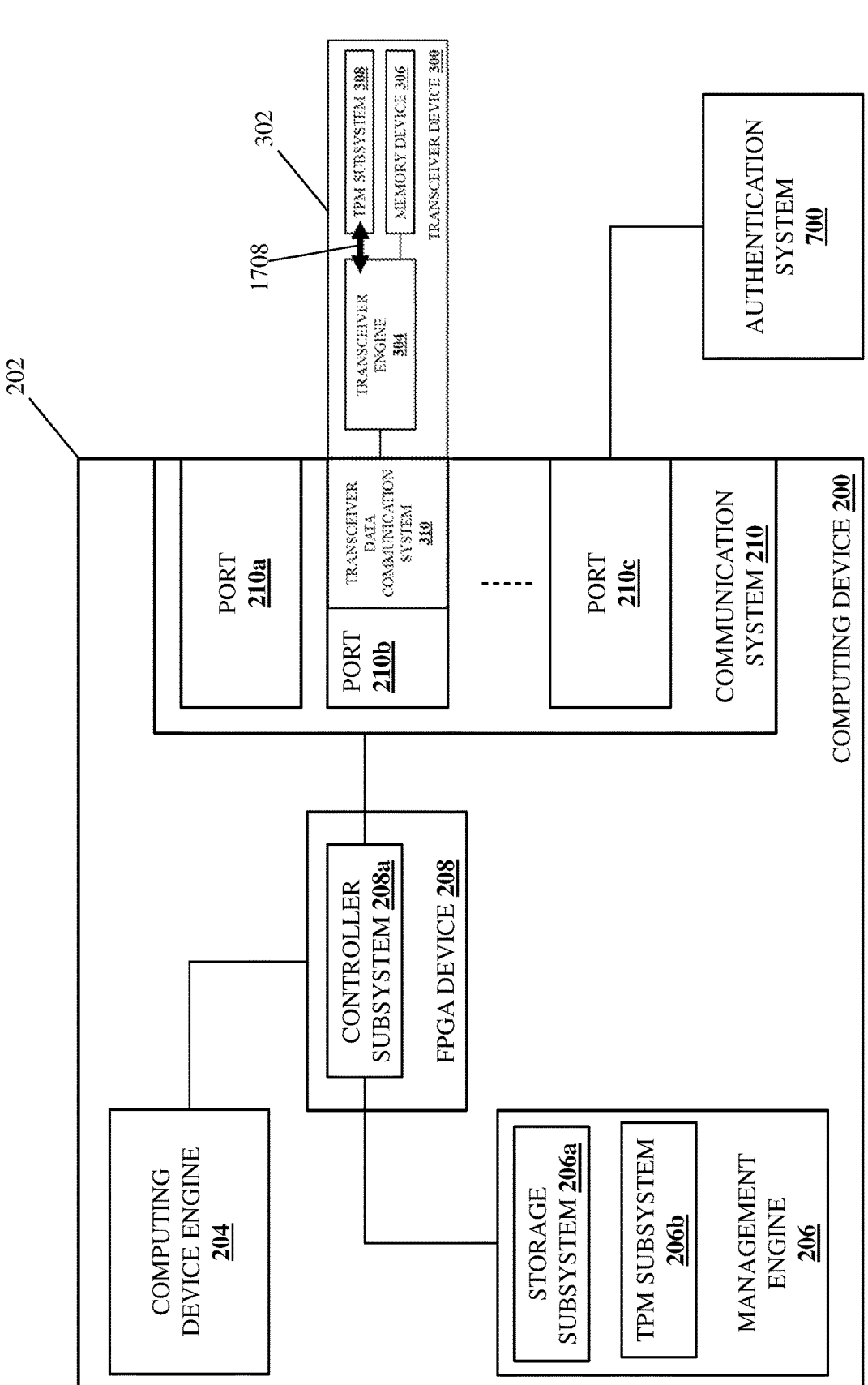
FIG. 17E is a schematic view illustrating an embodiment of the transceiver device security system of FIG. 7 performing the communications of FIG. 16 during the method of FIG. 15.

The method 1500 then proceeds to decision block 1514 where the transceiver device determines whether the response information received from the computing device is valid. With reference to FIGS. 16 and 17E, in an embodiment of block 1514 and in response to the management engine 206 providing the challenge response in the memory device 306, the transceiver engine 304 may perform challenge response verification operations 1708. For example, at decision block 1514, the transceiver engine 304 may identify the transceiver device use group public key $Groups[ti]_{pub}$ for the transceiver device use group in the transceiver device use group identifier $Groups[ti]_{ti \in t}$ included in the challenge response $E_{Groups[ti]priv}(Nonce)$, $Groups[ti]_{ti \in t}$, use that transceiver device use group public key $Groups[ti]_{pub}$ to decrypt the transceiver-device-use-group private-key-encrypted nonce $E_{Groups[ti]priv}(Nonce)$, and then determine whether that nonce (i.e., the response information) matches the nonce it generated at block 1504 (i.e., the challenge information).

As such, one of skill in the art in possession of the present disclosure will appreciate how decision block 1514 involves the transceiver device 300 verifying that the challenge response includes the challenge information it generated at block 1504 encrypted with a transceiver device use group private key of a transceiver device use group to which it belongs and, thus, whether the response information in the challenge response is valid. If, at decision block 1514, the transceiver device determines that the response information is not valid, the method 1500 proceeds to block 1516 where the transceiver device prevents its use with the computing device. In an embodiment, at block 1516 and in response to determining that the response information in the challenge response is not valid, the transceiver engine 304 may not enable the data communications that were disabled at block 1504, thus preventing the computing device engine 204 in the computing device 200 from performing "line-side" data communications using the transceiver device 300.

If, at decision block 1514, the transceiver device determines that the response information is valid, the method 1500 proceeds to block 1518 where the transceiver device allows its use with the computing device. In an embodiment, at block 1518 and in response to determining that the response information in the challenge response is valid, the transceiver engine 304 may enable the data communications that were disabled at block 1504 by, for example, enabling SERDES device(s) and/or any other transceiver data communication components in the transceiver data communication system 310 or that transceiver device 300 that were disabled at block 1504 in order to allow "line-side" data communications via the transceiver device 300 by the computing device engine 204 in the computing device 200.

Thus, systems and methods have been described that provide for the locking of a transceiver device for use only with computing devices included in transceiver device use group(s) to which the transceiver device belongs. For example, the transceiver device security system of the present disclosure may include a first computing device and a transceiver device that is locked for use with computing device(s) in transceiver device use group(s). The transceiver device generates challenge information in response to connecting to the first computing device, and causes an interrupt to be transmitted to the first computing device to cause it to retrieve the challenge information. Subsequently, the transceiver device receives an encrypted response communication from the first computing device that is encrypted with a transceiver device use group private key associated with one of the transceiver device use group(s), and decrypts it with a transceiver device use group public key associated with the one of the transceiver device use group(s) to generate a decrypted response communication. If the transceiver device determines that response information in the decrypted response communication matches the challenge information, it unlocks the transceiver device for use with the first computing device. As such, transceiver devices may be rendered inoperable with non-authorized computing devices, disincentivizing the theft of those transceiver devices.

Figure 18:
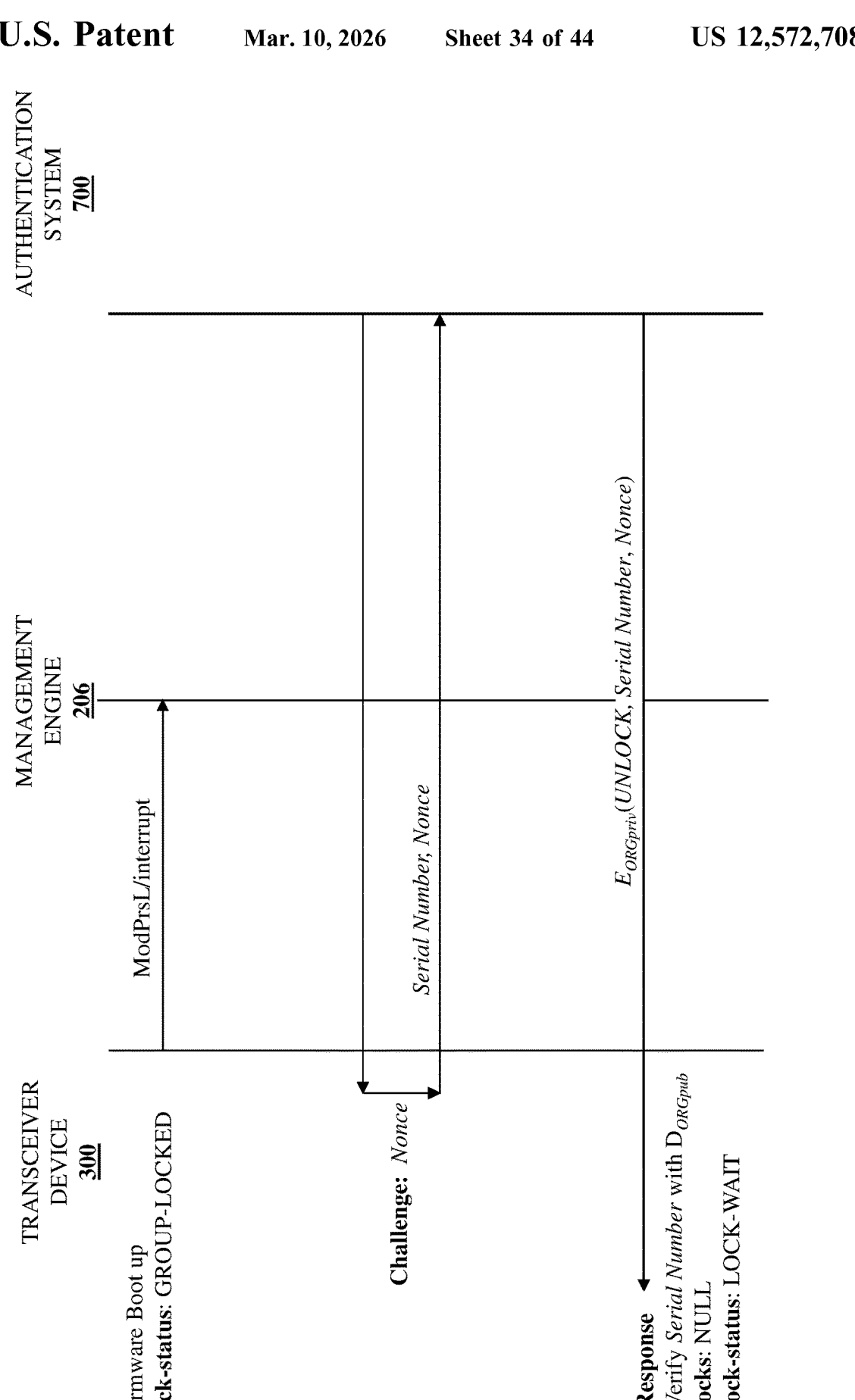
FIG. 18 is a swim lane diagram illustrating an embodiment of communications between the transceiver device and the authentication system via the computing device of FIG. 7 to provide for unlocking of a transceiver device of the present disclosure from transceiver device use groups.

Furthermore, the transceiver devices of the present disclosure may be unlocked from the transceiver device use groups to which they were locked during the method 1000. With reference to FIG. 18, a swim lane diagram is provided that illustrates communications between the transceiver device 300 and the authentication system 700 (via the management engine 206 in the computing device 200) that provide for the unlocking of a transceiver device from the transceiver device use groups to which it was locked during the method 1000, and will be referenced below to discuss those communications. In an embodiment, and as illustrated in FIG. 18, the transceiver device 300 may have been locked for use with transceiver device use group(s) (e.g., as per the "GROUP-LOCKED" lock status in the lock status field in the memory device 306 of the transceiver device 300 as described above).

Figure 19A:
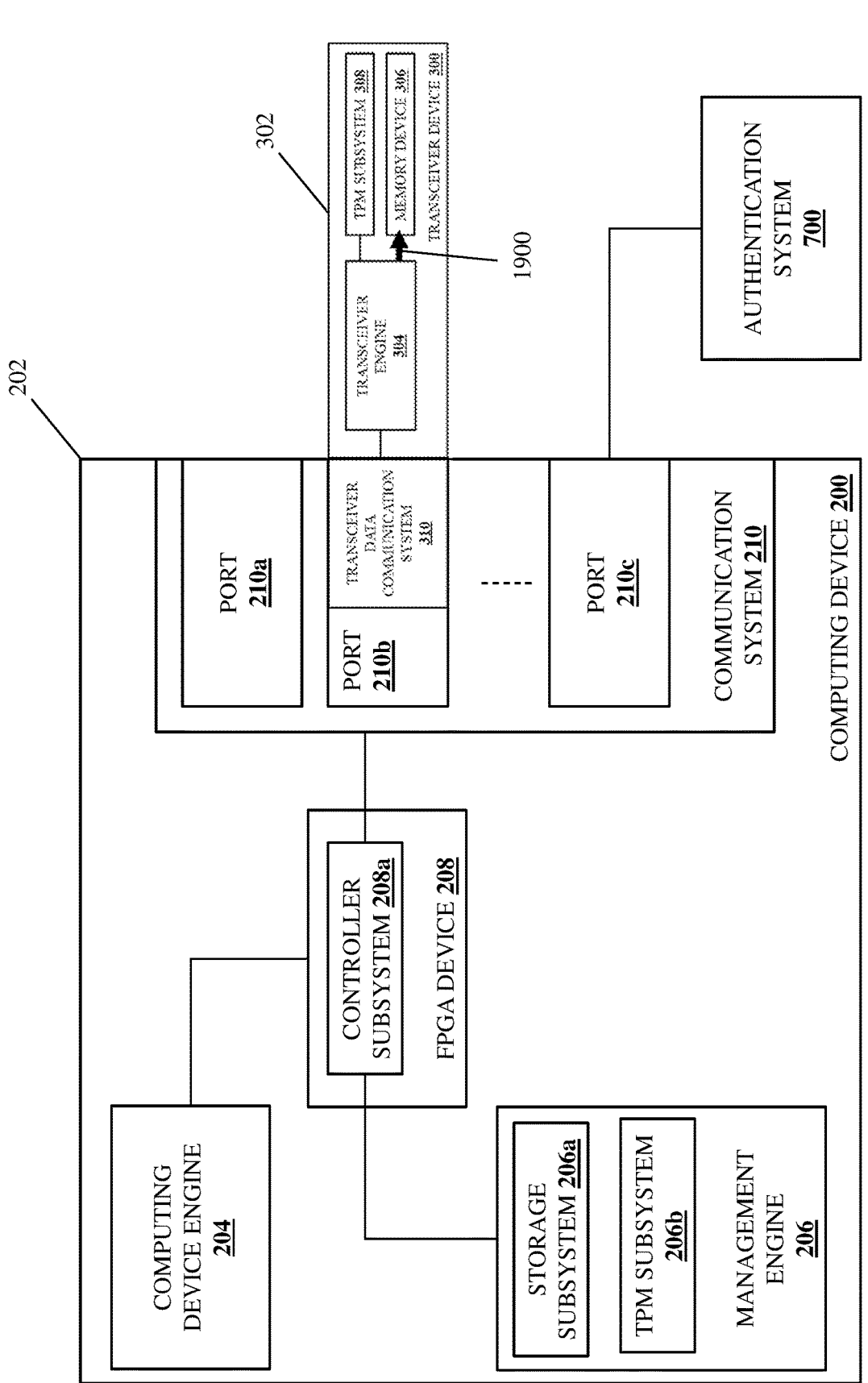
FIG. 19A is a schematic view illustrating an embodiment of the transceiver device security system of FIG. 7 performing the communications of FIG. 18.
Figure 19B:
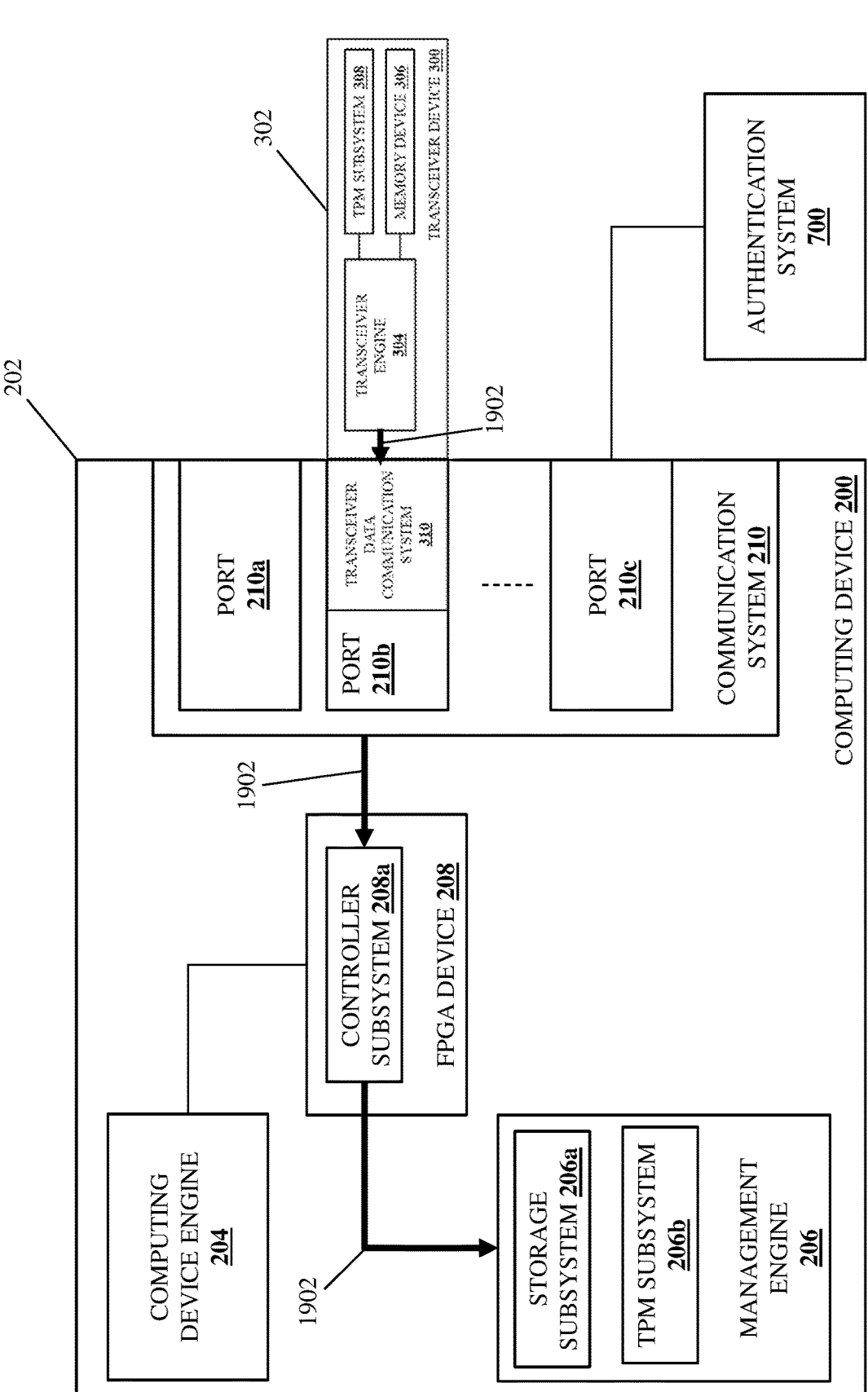
FIG. 19B is a schematic view illustrating an embodiment of the transceiver device security system of FIG. 7 performing the communications of FIG. 18.

With continued reference to FIGS. 18 and 19A, the transceiver engine 304 may perform memory device access operations 1900 that may include the transceiver engine 304 randomly generating a nonce or other challenge information that would be apparent to one of skill in the art in possession of the present disclosure, and providing that challenge information in the memory device 306 (e.g., in the user-defined page of the EEPROM device discussed above) of the transceiver device 300. With reference to FIGS. 18 and 19B, the transceiver engine 304 may also operate with the FPGA device 208 to perform interrupt operations 1902 that may include the transceiver engine 304 generating a ModulePresentLow (ModPrsL) signal or other interrupt signal that would be apparent to one of skill in the art in possession of the present disclosure and, in response to detecting the interrupt signal via the port 210b in the communication system 210, the controller subsystem 208a in the FPGA device 208 transmitting an interrupt to the management engine 206 in the computing device 200 to indicate the presence of the transceiver device 300 in the port 210b.

Figure 19C:
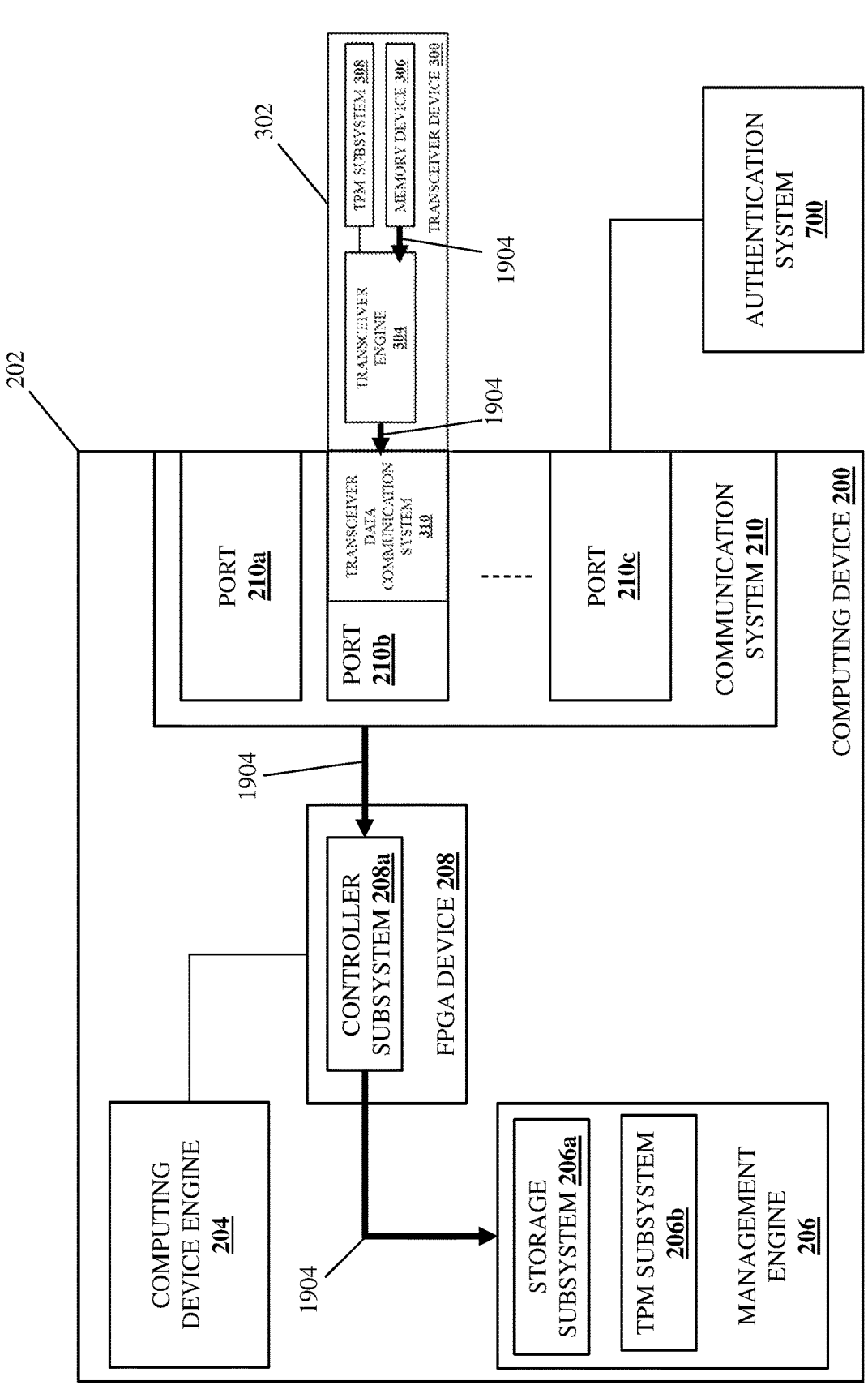
FIG. 19C is a schematic view illustrating an embodiment of the transceiver device security system of FIG. 7 performing the communications of FIG. 18.
Figure 19D:
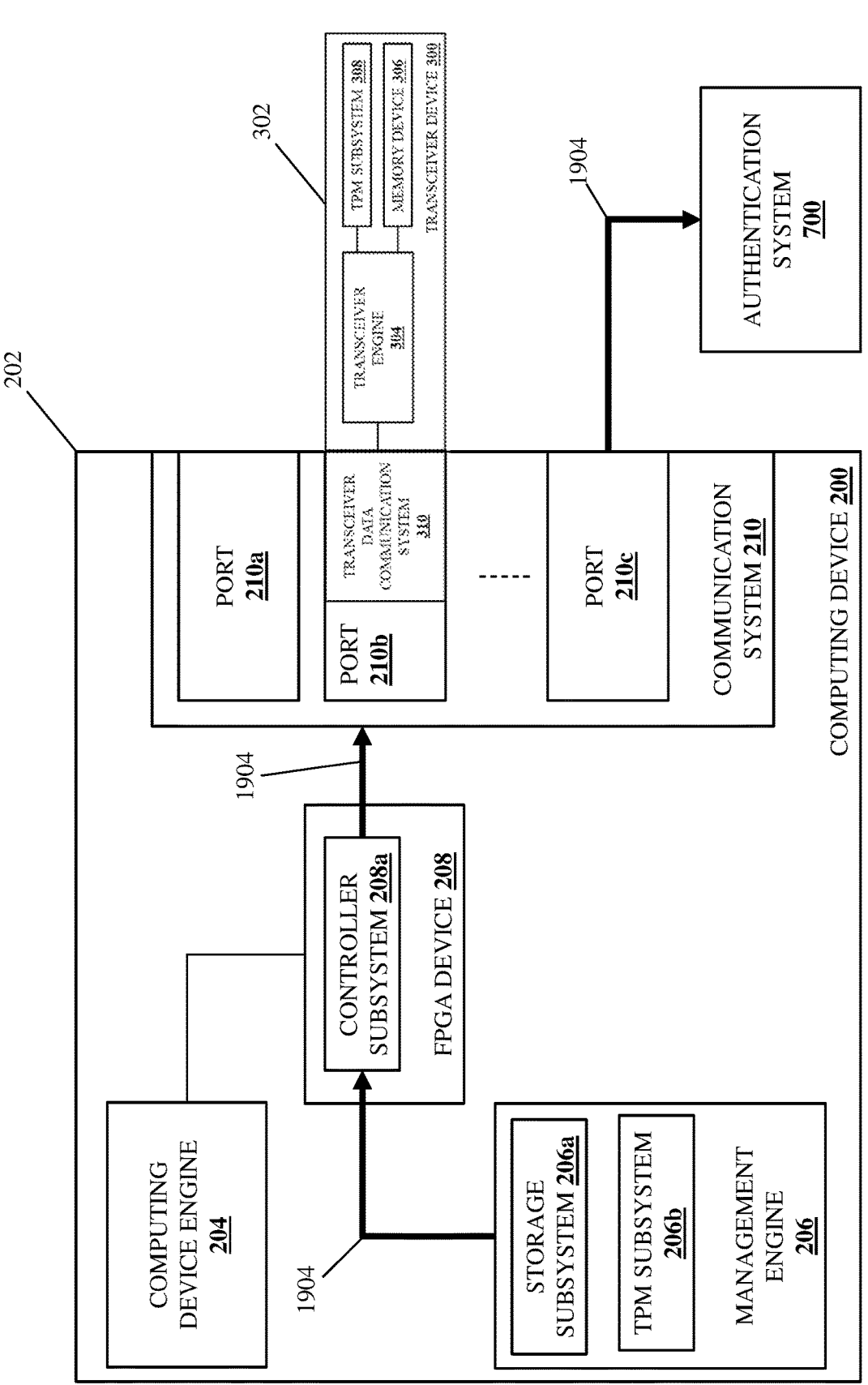
FIG. 19D is a schematic view illustrating an embodiment of the transceiver device security system of FIG. 7 performing the communications of FIG. 18.

With reference to FIGS. 19C and 19D, in response to the computing device 200 receiving the interrupt, the authentication system 700 and the management engine 206 in the computing device 200 may perform challenge information retrieval operations 1904 by, for example, the management engine 206 accessing the memory device 306 in the transceiver device 300 via the port 210b in the communication system 210 and the controller subsystem 208a in the FPGA device 208 (e.g., accessing the user-defined page in the EEPROM device discussed above using any of a variety of transceiver device EEPROM access techniques that would be apparent to one of skill in the art in possession of the present disclosure) and reading the challenge information (e.g., the randomly generated nonce) provided in the memory device 306 by the transceiver engine 304, as well as a serial number of the transceiver device 300 and/or any other transceiver device information included in the memory device 306 by the transceiver engine 304, and providing that challenge information, serial number, and/or other transceiver device information to the authentication system 700 via the port 210c in the communication system 210 and the controller subsystem 208a in the FPGA device 208. However, while a specific sequence of the authentication system 700 retrieving the challenge information, serial number, and/or other transceiver device information from the transceiver device 300 via the computing device 200 has been described, one of skill in the art in possession of the present disclosure will appreciate how the authentication system 700 may retrieve the challenge information, serial number, and/or other transceiver device information from the transceiver device 300 in a variety of manners that will fall within the scope of the present disclosure as well.

In response to retrieving the challenge information, serial number, and/or other transceiver device information, the authentication system 700 may use the serial number retrieved from the transceiver device 300 in order to identify (e.g., in an authentication device database that is accessible to the authentication system 700) that the transceiver device 300 should be unlocked from its transceiver device use groups, and then may generate an "UNLOCK" command that includes the challenge information as response information. In the specific example illustrated in FIG. 18, the authentication system 700 may encrypt an "UNLOCK" instruction, the serial number retrieved from the transceiver device 300, and the nonce that provides the response information, with organization private key $ORG_{priv}$ to provide an "UNLOCK" command $E_{ORGpriv}$(UNLOCK, Serial Number, Nonce).

Figure 19E:
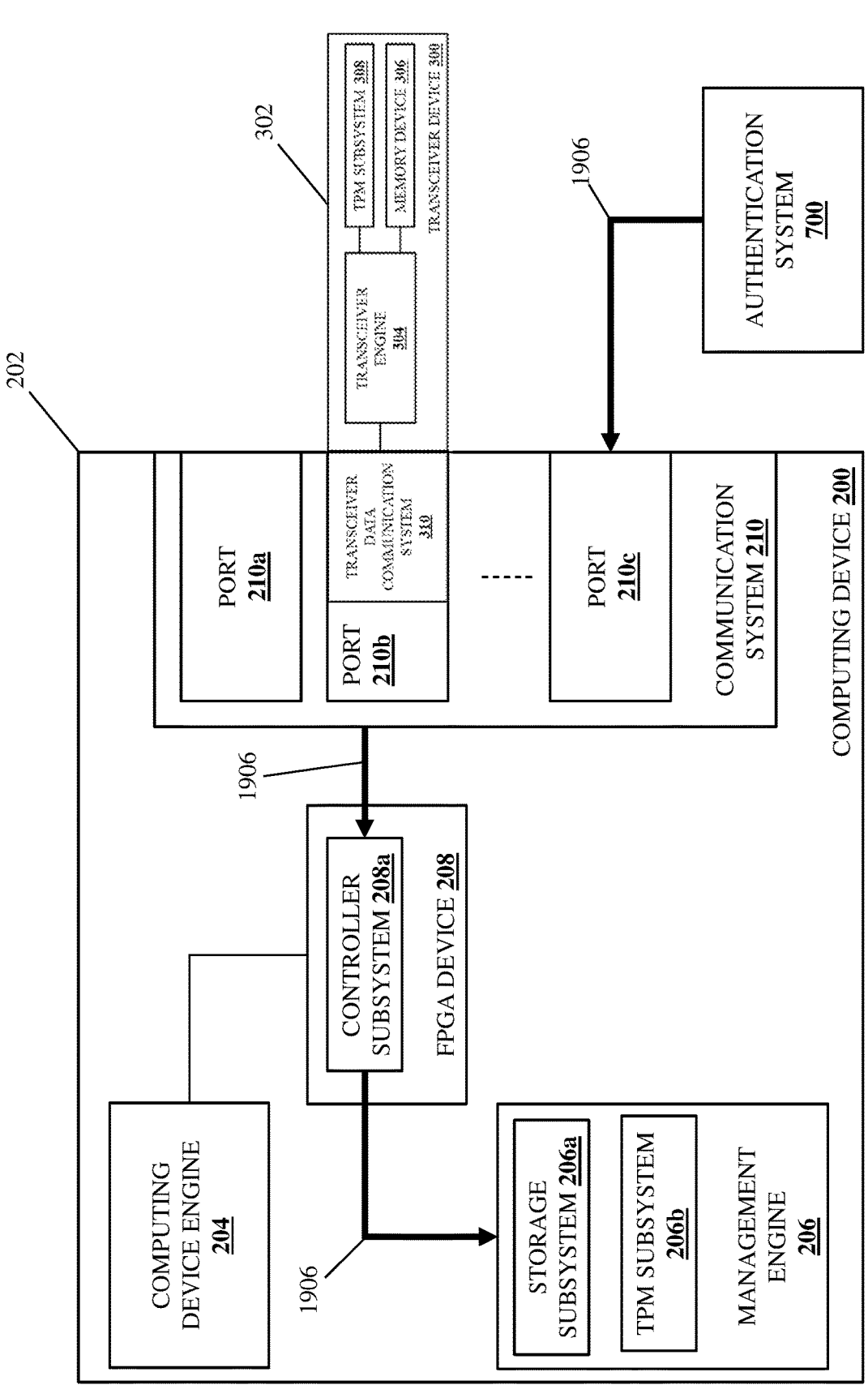
FIG. 19E is a schematic view illustrating an embodiment of the transceiver device security system of FIG. 7 performing the communications of FIG. 18.
Figure 19F:
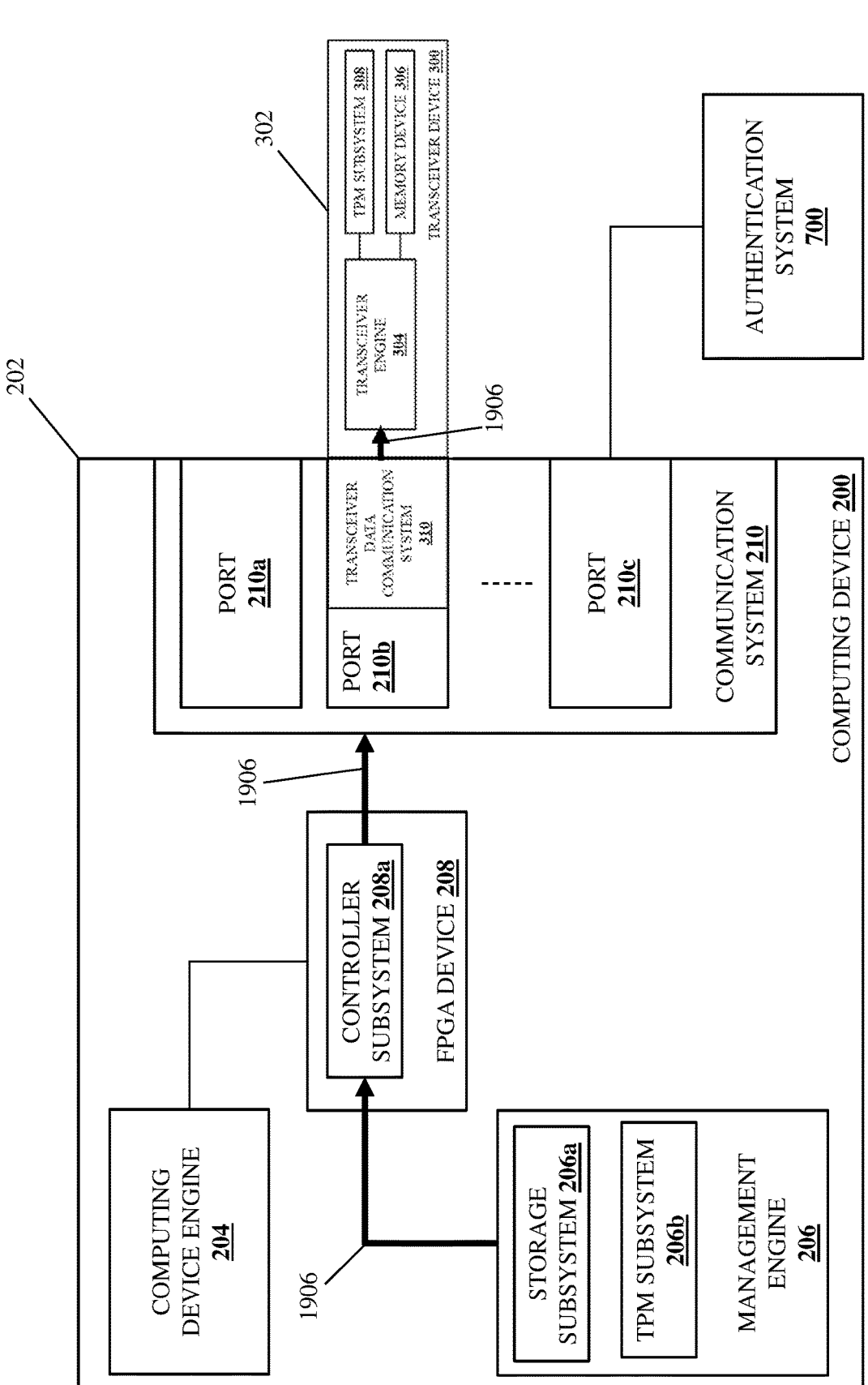
FIG. 19F is a schematic view illustrating an embodiment of the transceiver device security system of FIG. 7 performing the communications of FIG. 18.

With reference to FIGS. 18, 19E, and 19F, the authentication system 700 and the management engine 206 in the computing device 200 may then perform unlock command provisioning operations 1906 that include the authentication system 7000 providing the "UNLOCK" command via the port 210c in the communication system 210, the controller subsystem 208a in the FPGA device 208, and to the management engine 206 in the computing device 200, and the management engine 206 writing that the "UNLOCK" command in a command field in the memory device 306 in the transceiver device 300 via the port 210b in the communication system 210 and the controller subsystem 208a in the FPGA device 208 (e.g., by accessing the user-defined page in the EEPROM device discussed above using any of a variety of transceiver device EEPROM access techniques that would be apparent to one of skill in the art in possession of the present disclosure).

Figure 19G:
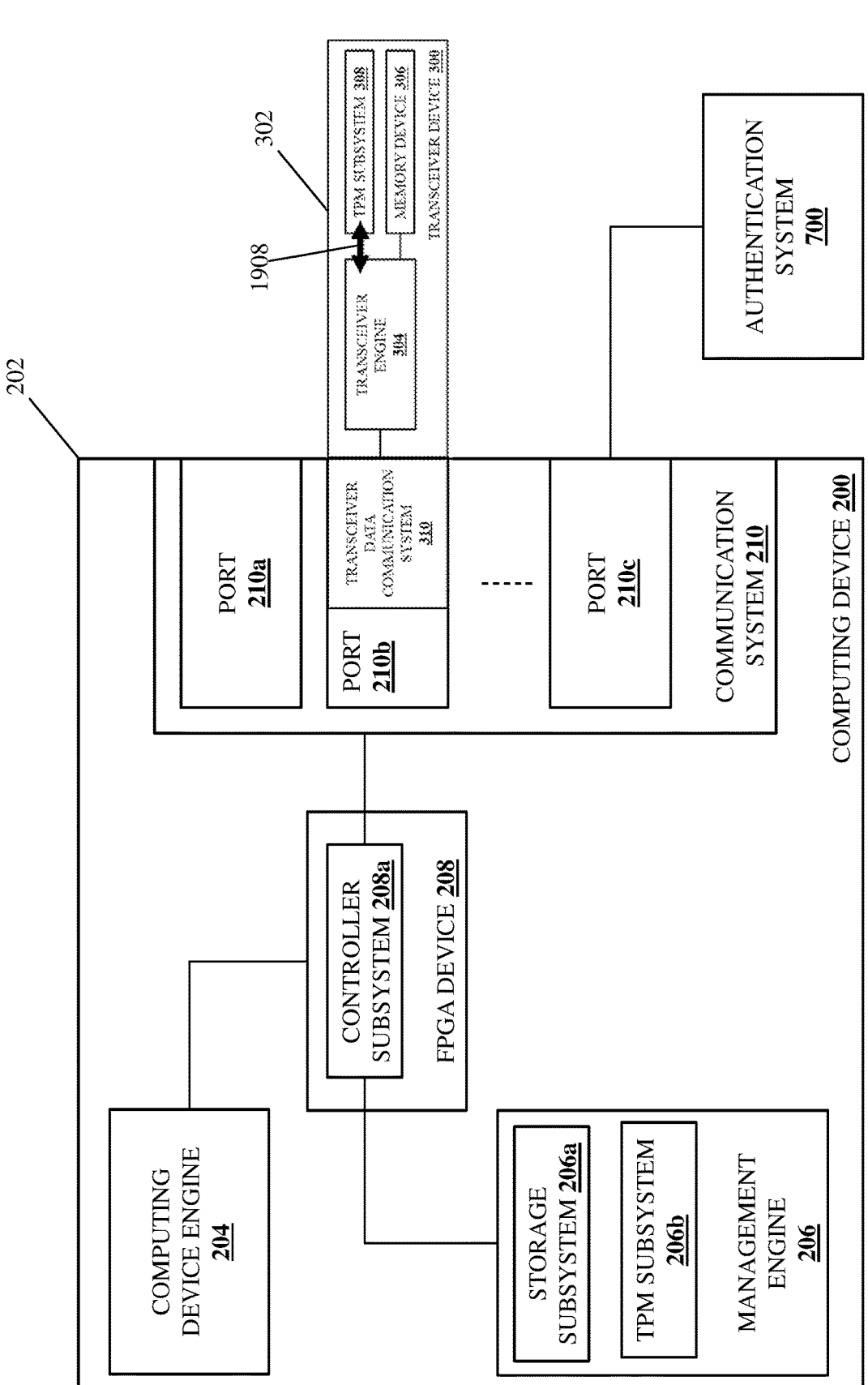
FIG. 19G is a schematic view illustrating an embodiment of the transceiver device security system of FIG. 7 performing the communications of FIG. 18.

With reference to FIGS. 18 and 19G, in response to the "UNLOCK" command being provided in a command field in the memory device 306, the transceiver engine 304 may perform unlock command verification operations 1908. For example, the transceiver engine 304 may use the X.509 organization public key certificate X.509$_{ORGpub}$ (which is stored in its TPM subsystem 308 as discussed above) to verify that the "UNLOCK" instruction, serial number, and the nonce are from the organization, and if so, the transceiver engine 304 may determine whether that nonce that is included in the "UNLOCK" command (i.e., the response information) matches the nonce it generated previously. Similarly as described above, the serial number of the transceiver device 300 is not required in the "UNLOCK" command, as the nonce/response information may be used by the transceiver engine 304 to validate the "UNLOCK" command. However, the inclusion of the serial number of the transceiver device 300 in the "UNLOCK" command may be used for auditing/tracking the behavior of the authentication system 700 (i.e., as the nonce/challenge information is ephemeral on the transceiver device 300).

As such, one of skill in the art in possession of the present disclosure will appreciate how the transceiver device 300 will verify that the "UNLOCK" command is from the organization and includes the challenge information it previously generated and, thus, whether the response information in the "UNLOCK" command is valid. If the transceiver device determines that the response information is not valid, the transceiver device 300 is not unlocked from its current transceiver device use group(s).

Figure 19H:
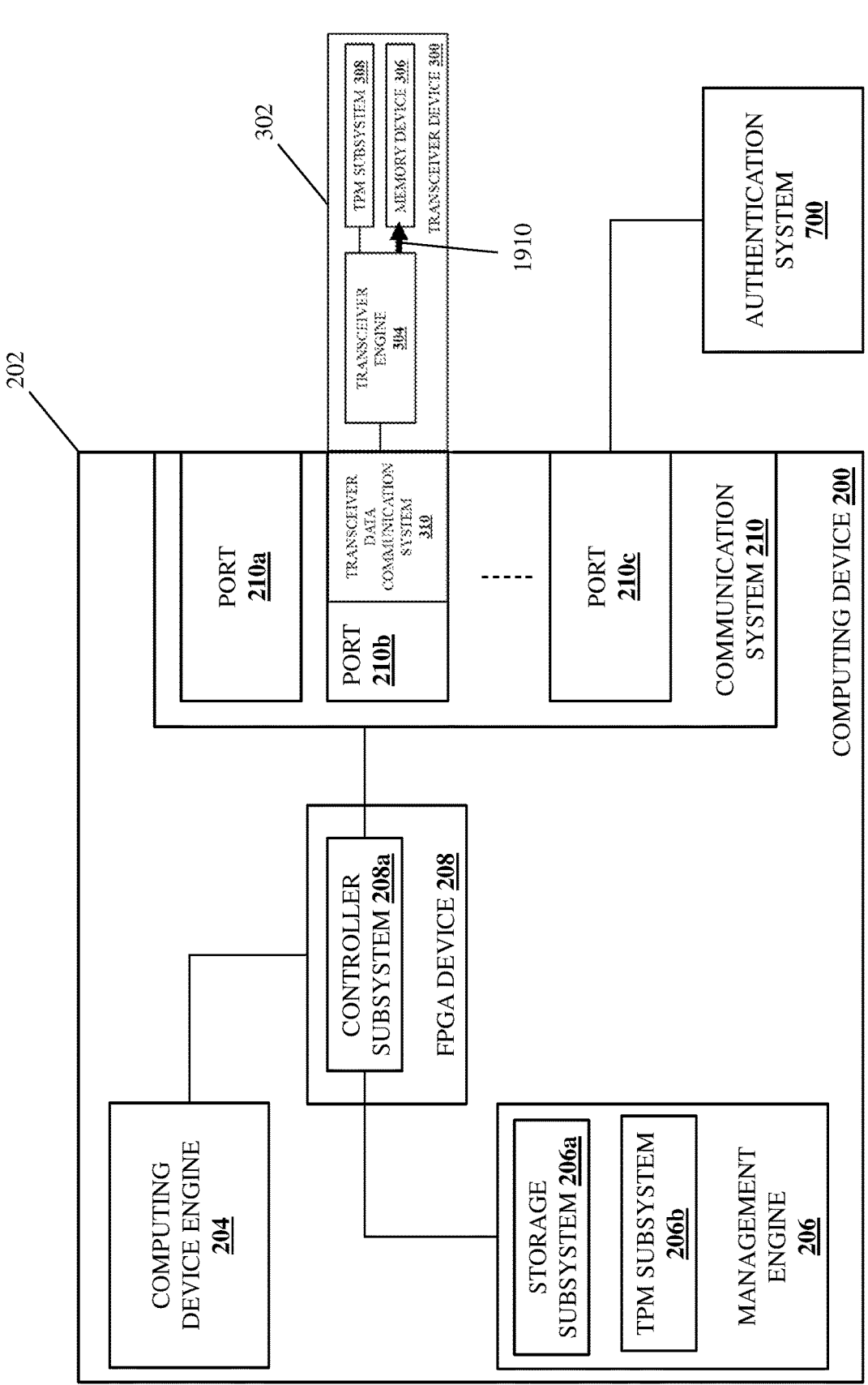
FIG. 19H is a schematic view illustrating an embodiment of the transceiver device security system of FIG. 7 performing the communications of FIG. 18.

With reference to FIG. 19H, if the transceiver device 300 determines that the response information is valid, the transceiver engine 304 may perform memory device access operations 1910 that include accessing the memory device 306 and providing a "LOCK-WAIT" lock status in a lock status field in the memory device 306 (e.g., in the user-defined page of the EEPROM device discussed above) of the transceiver device 300 and a "NULL" locks indicator in a locks field in the memory device 306 (e.g., in the user-defined page of the EEPROM device discussed above) of the transceiver device 300 in order to indicate that the transceiver device 300 is unlocked and in a factory default state similarly as described above prior to the method 400.

Figure 20:
FIG. 20 is a swim lane diagram illustrating an embodiment of communications between the computing device and the authentication system of FIG. 7 to disassociate the computing device from transceiver device use groups.
Figure 21:
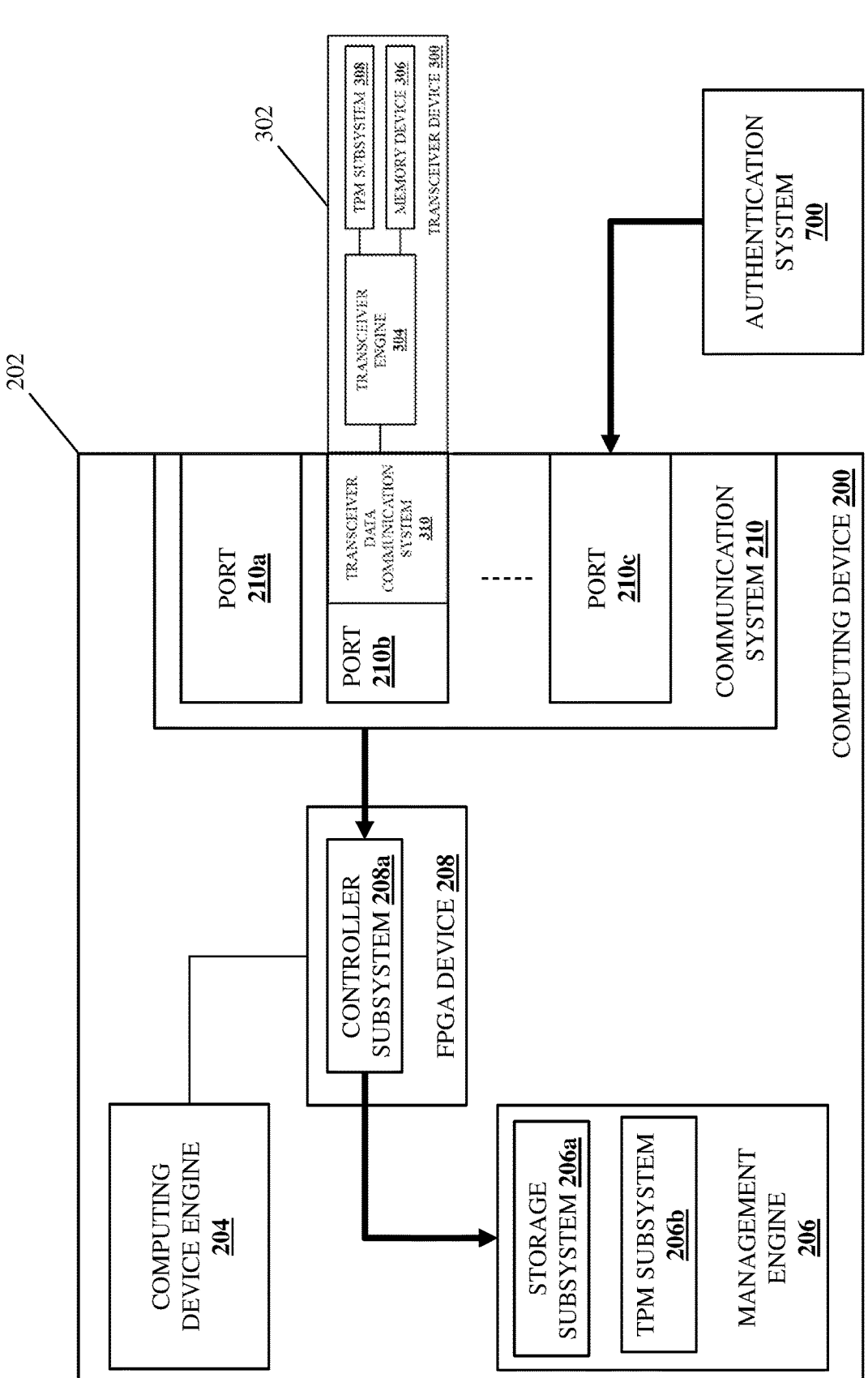
FIG. 21 is a schematic view illustrating an embodiment of the transceiver device security system of FIG. 7 performing the communications of FIG. 20.

In addition to the unlocking of the transceiver devices of the present disclosure from the transceiver device use groups to which they were locked during the method 1000, the computing devices of the present disclosure may be disassociated with those transceiver device use groups as well. With reference to FIG. 20, a swim lane diagram is provided that illustrates communications between the management engine 206 in the computing device 200 and the authentication system 700 that provide for the disassociation of a computing device from the transceiver device use group to which it is associated, and will be referenced below to discuss those communications. As illustrated in FIG. 20, the authentication system 700 may use the platform public key Platform$_{pub}$ for the computing device to encrypt an "UNBIND" instruction and a transceiver device use group identifier {Groups[p]$_{p \in G}$} (that identifies the transceiver device use groups to which the computing device 200/platform belongs) to provide an encrypted unbind command E$_{Platformpub}$(UNBIND, {Groups[p]$_{p \in G}$}), and may transmit that encrypted unbind command E$_{Platformpub}$(UNBIND, {Groups[p]$_{p \in G}$}) to the management engine 206 in the computing system 200. The management engine 206 may then use its platform private key Platform$_{priv}$ (which is stored in its TPM subsystem 206b as discussed above) to decrypt the "UNBIND" instruction and the transceiver device use group identifier {Groups[p]$_{p \in G}$} and, in response, set the transceiver device use groups to which it belongs to "NULL", which one of skill in the art in possession of the present disclosure will recognize may "decommission" the computing device 200 or return the computing device 200 to a factory default state.

Thus, the systems and methods of the present disclosure allow an organization to define a set of customized administrative transceiver device use groups, create public/private key pairs for every transceiver device use group and bind each computing device/platform to one or more of those transceiver device use groups (e.g., based on a per-computing-device/platform policy) by initializing that computing device/platform with corresponding public/private key pairs. The systems and methods of the present disclosure also independently lock (e.g., based on transceiver device policies) each transceiver device to a subset of the transceiver device groups such that when any of those transceiver devices is connected to a computing device/platform, the transceiver device firmware authenticates its use with that computing device/platform before enabling data communications. The systems and methods of the present disclosure also provide for the unbinding of computing devices/platforms from transceiver device use groups, as well as unlocking transceiver devices from transceiver device use groups.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A transceiver device security system, comprising:

a first computing device; and a transceiver device that is locked for use only with at least one transceiver device use group that includes at least one computing device, wherein the transceiver device is configured to:

generate, in response to being directly connected to a first transceiver device port on the first computing device, first challenge information;

cause a first interrupt to be transmitted directly to the first computing device via the first transceiver device port that is configured to cause the first computing device to retrieve the first challenge information directly from the transceiver device via the first transceiver device port;

receive, subsequent to causing the first interrupt to be directly transmitted to the first computing device via the first transceiver device port, a first encrypted response communication directly from the first computing device via the first transceiver device port that is encrypted with a first transceiver device use group private key that is associated with a first transceiver device use group that is included in the at least one transceiver device use group;

decrypt the first encrypted response communication with a first transceiver device use group public key that is associated with the first transceiver device use group to generate a first decrypted response communication;

27 determine that first response information in the first decrypted response communication matches the first challenge information; and allow, in response to determining that the first response information matches the first challenge information, the transceiver device to be used with the first computing device.

2. The system of claim 1, wherein the first challenge information includes a nonce that is randomly generated by the transceiver device in response to being directly connected to the first computing device via the first transceiver device port.

3. The system of claim 1, wherein the transceiver device is configured to store the first challenge information directly in a memory subsystem in the transceiver device via the first transceiver device port, and the first computing device is configured to retrieve the first challenge information directly from the memory subsystem in the transceiver device via the first transceiver device port and provide the first response communication directly in the memory subsystem in the transceiver device via the first transceiver device port.

4. The system of claim 1, further comprising:

a second computing device, wherein the transceiver device is configured to:

generate, in response to being directly connected to a second transceiver device port on the second computing device, second challenge information;

cause a second interrupt to be transmitted directly to the second computing device via the second transceiver device port that is configured to cause the second computing device to retrieve the second challenge information directly from the transceiver device via the second transceiver device port;

receive, subsequent to causing the second interrupt to be directly transmitted to the second computing device via the second transceiver device port, a second encrypted response communication directly from the second computing device via the second transceiver device port that is encrypted with a second transceiver device use group private key that is associated with a second transceiver device use group that is included in the at least one transceiver device use group;

decrypt the second encrypted response communication with a second transceiver device use group public key that is associated with the second transceiver device use group to generate a second decrypted response communication;

determine that second response information in the second decrypted response communication matches the second challenge information; and allow, in response to determining that the second response information matches the second challenge information, the transceiver device to be used with the second computing device.

5. The system of claim 1, wherein the first encrypted response communication includes a first transceiver use group identifier that identifies the first transceiver use group, and wherein the transceiver device is configured to use the first transceiver user group identifier to retrieve the first transceiver device use group public key for use in decrypting the first encrypted response communication.

6. The system of claim 1, further comprising:

a second computing device, wherein the transceiver device is configured to:

allow, prior to being locked for use only with at least one transceiver device use group, the transceiver device to be used with the second computing device; and receive, subsequent to allowing the transceiver device to be used with the second computing device, the first transceiver use group public key from an authentication system via the second computing device.

7. A transceiver device, comprising:

a transceiver data communication system that is locked for use only with at least one transceiver device use group that includes at least one computing device;

a transceiver processing system that is coupled to the transceiver data transmission system; and a transceiver memory system that is coupled to the transceiver processing system and that includes instructions that, when executed by the transceiver processing system, cause the transceiver processing system to provide a transceiver engine that is configured to:

generate, in response to being directly connected to a first transceiver device port on a first computing device, first challenge information;

cause a first interrupt to be transmitted directly to the first computing device via the first transceiver device port that is configured to cause the first computing device to directly retrieve the first challenge information via the first transceiver device port;

receive, subsequent to causing the first interrupt to be directly transmitted to the first computing device via the first transceiver device port, a first encrypted response communication directly from the first computing device via the first transceiver device port that is encrypted with a first transceiver device use group private key that is associated with a first transceiver device use group that is included in the at least one transceiver device use group;

decrypt the first encrypted response communication with a first transceiver device use group public key that is associated with the first transceiver device use group to generate a first decrypted response communication;

determine that first response information in the first decrypted response communication matches the first challenge information; and allow, in response to determining that the first response information matches the first challenge information, the transceiver data communication system to be used with the first computing device.

8. The transceiver device of claim 7, wherein the first challenge information includes a nonce that is randomly generated by the transceiver engine in response to being directly connected to the first computing device via the first transceiver device port.

9. The transceiver device of claim 7, wherein the transceiver engine is configured to store the first challenge information in an Electronically Erasable Programmable Read-Only Memory (EEPROM) device that is coupled to the transceiver processing system, and the first computing device is configured to directly retrieve the first challenge information from the EEPROM device via the first transceiver device port and directly provide the first response communication in the EEPROM device via the first transceiver device port.

10. The transceiver device of claim 7, wherein the transceiver engine is configured to:

generate, in response to being directly connected to a second transceiver device port on a second computing device, second challenge information;

cause a second interrupt to be directly transmitted to the second computing device via the second transceiver device port that is configured to cause the second computing device to directly retrieve the second challenge information via the second transceiver device port;

receive, subsequent to causing the second interrupt to be directly transmitted to the second computing device via the second transceiver device port, a second encrypted response communication directly from the second computing device via the second transceiver device port that is encrypted with a second transceiver device use group private key that is associated with a second transceiver device use group that is included in the at least one transceiver device use group;

decrypt the second encrypted response communication with a second transceiver device use group public key that is associated with the second transceiver device use group to generate a second decrypted response communication;

determine that second response information in the second decrypted response communication matches the second challenge information; and allow, in response to determining that the second response information matches the second challenge information, the transceiver data communication system to be used the second computing device.

11. The transceiver device of claim 7, wherein the first encrypted response communication includes a first transceiver use group identifier that identifies the first transceiver use group, and wherein the transceiver engine is configured to use the first transceiver user group identifier to retrieve the first transceiver device use group public key for use in decrypting the first encrypted response communication.

12. The transceiver device of claim 7, wherein the transceiver engine is configured to:

allow, prior to being locked for use only with at least one transceiver device use group, the transceiver data communication system to be used with a second computing device; and receive, in response to allowing the transceiver data communication system to be used with the second computing device, the first transceiver use group public key from an authentication system via the second computing device.

13. The transceiver device of claim 12, wherein the allowing the transceiver data communication system to be used with the second computing device includes:

generating, in response to being directly connected to a second transceiver device port on the second computing device, second challenge information;

causing a second interrupt to be transmitted directly to the second computing device via the second transceiver device port that is configured to cause the second computing device to directly retrieve the second challenge information via the second transceiver device port;

receiving, subsequent to causing the second interrupt to be directly transmitted to the second computing device via the second transceiver device port, a second response communication directly from the second computing device via the second transceiver device port that includes:

a second computing device public key that is associated with the second computing device and that is signed with an organization private key;

second encrypted response information that is encrypted with a second computing device private key that is associated with the second computing device;

validating the second computing device public key with an organization public key to generate a validated second computing device public key;

decrypting the second encrypted response information with the validated second computing device public key to generate second decrypted response information;

determining that second decrypted response information includes the second challenge information; and allowing, in response to determining that the second decrypted response information includes the second challenge information, the transceiver data communication system to be used with the second computing device.

14. A method for providing transceiver device security, comprising:

generating, by a transceiver device that is locked for use only with at least one transceiver device use group that includes at least one computing device, first challenge information in response to being directly connected to a first transceiver device port on a first computing device;

causing, by the transceiver device, a first interrupt to be transmitted directly to the first computing device via the first transceiver device port that is configured to cause the first computing device to directly retrieve the first challenge information via the first transceiver device port;

receiving, by the transceiver device subsequent to causing the first interrupt to be directly transmitted to the first computing device via the first transceiver device port, a first encrypted response communication directly from the first computing device via the first transceiver device port that is encrypted with a first transceiver device use group private key that is associated with a first transceiver device use group that is included in the at least one transceiver device use group;

decrypting, by the transceiver device, the first encrypted response communication with a first transceiver device use group public key that is associated with the first transceiver device use group to generate a first decrypted response communication;

determining, by the transceiver device, that first response information in the first decrypted response communication matches the first challenge information; and allowing, by the transceiver device in response to determining that the first response information matches the first challenge information, the transceiver device to be used with the first computing device.

15. The method of claim 14, further comprising:

randomly generating, by the transceiver device in response to being directly connected to the first computing device via the first transceiver device port, a nonce that provides the first challenge information.

16. The method of claim 14, further comprising:

storing, by the transceiver device, the first challenge information in a memory subsystem that is included in the transceiver device;

retrieving, by the first computing device, the first challenge information directly from the memory subsystem in the transceiver device via the first transceiver device port; and providing, by the first computing device, the first response communication directly in the memory subsystem in the transceiver device via the first transceiver device port.

17. The method of claim 14, further comprising:

generating, by the transceiver device, second challenge information in response to being directly connected to a second transceiver device port on a second computing device;

causing, by the transceiver device, a second interrupt to be transmitted directly to the second computing device via the second transceiver device port that is configured to cause the second computing device to directly retrieve the second challenge information via the second transceiver device port;

receiving, by the transceiver device subsequent to causing the second interrupt to be directly transmitted to the second computing device via the second transceiver device port, a second encrypted response communication directly from the second computing device via the second transceiver device port that is encrypted with a second transceiver device use group private key that is associated with a second transceiver device use group that is included in the at least one transceiver device use group;

decrypting, by the transceiver device, the second encrypted response communication with a second transceiver device use group public key that is associated with the second transceiver device use group to generate a second decrypted response communication;

determining, by the transceiver device, that second response information in the first decrypted response communication matches the second challenge information; and allowing, by the transceiver device in response to determining that the second response information matches the second challenge information, the transceiver device to be used with the second computing device.

18. The method of claim 14, wherein the first encrypted response communication includes a first transceiver use group identifier that identifies the first transceiver use group, and wherein the method further comprises:

using, by the transceiver device, the first transceiver user group identifier to retrieve the first transceiver device use group public key for use in decrypting the first encrypted response communication.

19. The method of claim 14, further comprising:

allowing, by the transceiver device prior to being locked for use only with at least one transceiver device use group, the transceiver device to be used with a second computing device; and receiving, by the transceiver device in response to allowing the transceiver device to be used with the second computing device, the first transceiver use group public key from an authentication system via the second computing device.

20. The method of claim 14, wherein the allowing the transceiver device to be used with the second computing device includes:

generating, by the transceiver device in response to being directly connected to a second transceiver device port on the second computing device, second challenge information;

causing, by the transceiver device, a second interrupt to be transmitted directly to the second computing device via the second transceiver device port that is configured to cause the second computing device to directly retrieve the second challenge information via the second transceiver device port;

receiving, by the transceiver device subsequent to causing the second interrupt to be directly transmitted to the second computing device via the second transceiver device port, a second response communication directly from the second computing device via the second transceiver device port that includes:

a second computing device public key that is associated with the second computing device and that is signed with an organization private key;

second encrypted response information that is encrypted with a second computing device private key that is associated with the second computing device;

validating, by the transceiver device, the second computing device public key with an organization public key to generate a validated second computing device public key;

decrypting, by the transceiver device, the second encrypted response information with the validated second computing device public key to generate second decrypted response information;

determining, by the transceiver device, that second decrypted response information includes the second challenge information; and allowing, by the transceiver device in response to determining that the second decrypted response information includes the second challenge information, the transceiver device to be used with the second computing device.

* * * * *